(12) United States Patent
DeSimone et al.

(10) Patent No.: US 11,390,062 B2
(45) Date of Patent: Jul. 19, 2022

(54) THREE-DIMENSIONAL PRINTING WITH SUPPORTED BUILD PLATES

(71) Applicant: Carbon3D, Inc., Redwood City, CA (US)

(72) Inventors: Joseph M. DeSimone, Los Gatos, CA (US); Alexander Ermoshkin, Chapel Hill, NC (US); Edward T. Samulski, Chapel Hill, NC (US); Jason P. Rolland, Pleasanton, CA (US)

(73) Assignee: Carbon, Inc., Redwood City, CA (US)

( * ) Notice: Subject to any disclaimer, the term of this patent is extended or adjusted under 35 U.S.C. 154(b) by 1156 days.

(21) Appl. No.: 14/824,713

(22) Filed: Aug. 12, 2015

(65) Prior Publication Data
US 2016/0046075 A1    Feb. 18, 2016

Related U.S. Application Data

(60) Provisional application No. 62/036,371, filed on Aug. 12, 2014, provisional application No. 62/036,359, filed on Aug. 12, 2014.

(51) Int. Cl.
*B33Y 30/00* (2015.01)
*B33Y 10/00* (2015.01)
(Continued)

(52) U.S. Cl.
CPC ............ *B33Y 30/00* (2014.12); *B29C 64/112* (2017.08); *B29C 64/124* (2017.08);
(Continued)

(58) Field of Classification Search
CPC ... B29C 64/124; B29C 64/129; B29C 64/135; B29C 64/245
See application file for complete search history.

(56) References Cited

U.S. PATENT DOCUMENTS 5,122,441 A * 6/1992 Lawton ................. B29C 64/129
156/58
5,447,822 A 9/1995 Hull et al.
(Continued)

FOREIGN PATENT DOCUMENTS

EP 0 484 086 A1 5/1992
EP 1 134 068 A2 9/2001

OTHER PUBLICATIONS

Yoon, Youngsam, Dong-Weon Lee, and Jeong-Bong Lee. "Fabrication of optically transparent PDMS artificial lotus leaf film using underexposed and underbaked photoresist mold." Journal of microelectromechanical systems 22.5 (2013): 1073-1080. (Year: 2013 ).*

(Continued)

*Primary Examiner* — Galen H Hauth
(74) *Attorney, Agent, or Firm* — Myers Bigel, P.A.

(57) ABSTRACT

A method of forming a three-dimensional object includes: providing a carrier and an optically transparent member having a build surface, the carrier and the build surface defining a build region therebetween; filling the build region with a polymerizable liquid, irradiating the build region with light through the optically transparent member to form a solid polymer from the polymerizable liquid, and advancing said carrier away from said build surface to form said three-dimensional object from said solid polymer. The irradiating step includes projecting focused light at the build region, and the advancing step is carried out at a rate that is dependent on an average light intensity of the focused light.

13 Claims, 34 Drawing Sheets

(51) Int. Cl.
  *B29C 64/124* (2017.01)
  *B29C 64/129* (2017.01)
  *B29C 64/245* (2017.01)
  *B29C 64/112* (2017.01)
  *B33Y 80/00* (2015.01)

(52) U.S. Cl.
  CPC .......... *B29C 64/129* (2017.08); *B29C 64/245* (2017.08); *B33Y 10/00* (2014.12); *B33Y 80/00* (2014.12)

(56) References Cited

U.S. PATENT DOCUMENTS

| | | | |
|---|---|---|---|
| 5,506,607 A * | 4/1996 | Sanders, Jr | G06K 15/22 347/1 |
| 5,529,473 A | 6/1996 | Lawton et al. | |
| 5,545,367 A | 8/1996 | Bae et al. | |
| 8,534,797 B2 | 9/2013 | Zhao et al. | |
| 8,636,826 B2 | 1/2014 | Curello et al. | |
| 9,120,270 B2 | 9/2015 | Chen et al. | |
| 9,636,873 B2 | 5/2017 | Joyce | |
| 9,782,934 B2 | 10/2017 | Willis et al. | |
| 2007/0063389 A1 | 3/2007 | John | |
| 2008/0170112 A1* | 7/2008 | Hull | B29C 64/124 347/127 |
| 2011/0089610 A1 | 4/2011 | El-Siblani et al. | |
| 2013/0037993 A1 | 2/2013 | Chen et al. | |
| 2013/0089744 A1 | 4/2013 | McKnight et al. | |
| 2013/0292862 A1* | 11/2013 | Joyce | B29C 64/307 264/40.1 |
| 2014/0339741 A1* | 11/2014 | Aghababaie | B33Y 30/00 264/401 |
| 2014/0361463 A1 | 12/2014 | Desimone et al. | |
| 2015/0102532 A1 | 4/2015 | Desimone et al. | |
| 2016/0193786 A1 | 7/2016 | Moore et al. | |

OTHER PUBLICATIONS

Lee BL et al. Wetting transition characteristics on microstructured hydrophobic surfaces. Materials Transactions. Jul. 2010; 51(9): 1709-1711.
International Search Report and Written Opinion Corresponding to International Application No. PCT/US2015/044826; dated Nov. 4, 2015; 10 Pages.
Protest to Canadian Patent Application No. 2898098; Dated: Dec. 31, 2015; 19 Pages.

* cited by examiner

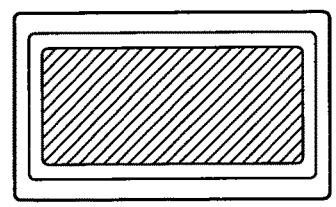
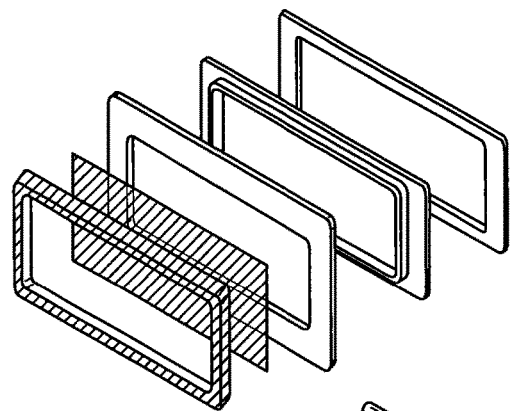
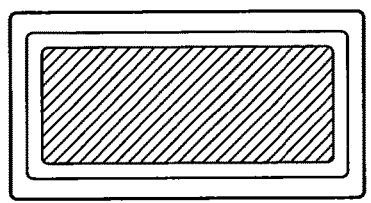
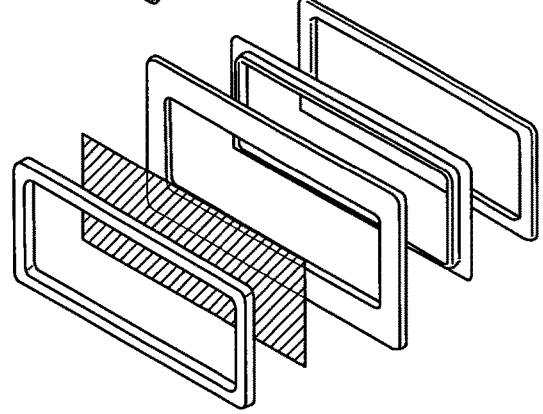
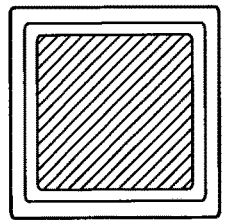
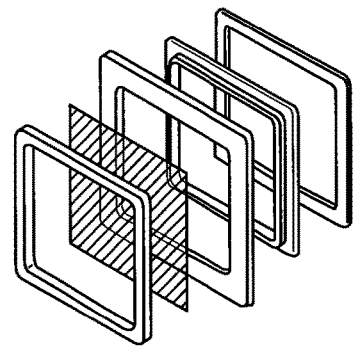
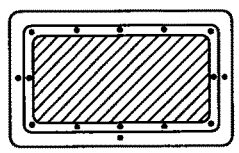
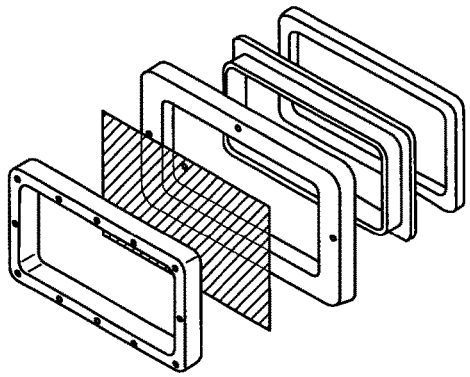
FIG. 11

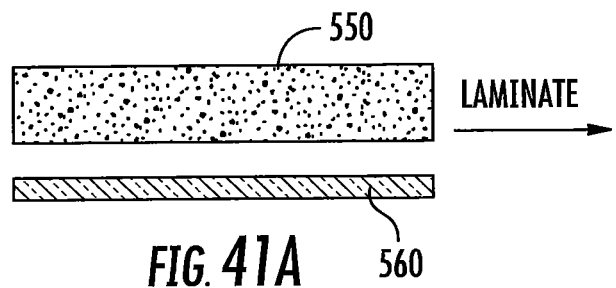
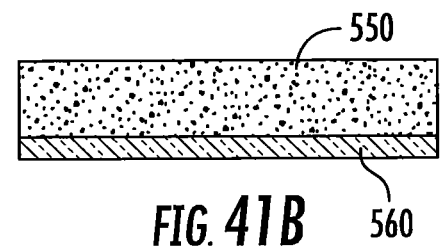
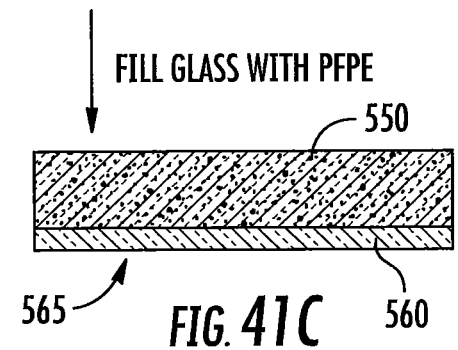
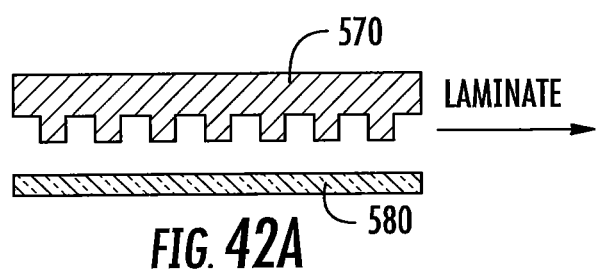
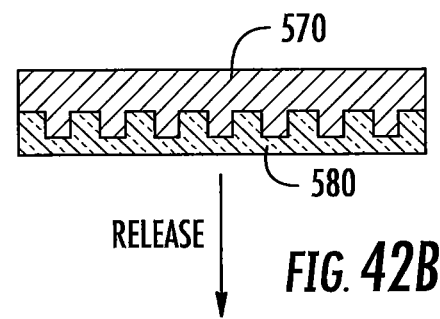
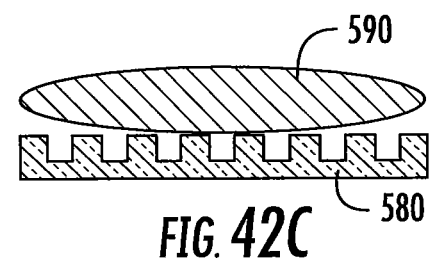

THREE-DIMENSIONAL PRINTING WITH SUPPORTED BUILD PLATES

RELATED APPLICATIONS

This application claims the benefit of U.S. Provisional Patent Application Ser. Nos. 62/036,371, filed Aug. 12, 2014, and 62/036,359, filed Aug. 12, 2014, the disclosures of which are incorporated by reference herein in their entirety.

FIELD OF THE INVENTION

The present invention concerns methods and apparatus for the fabrication of solid three-dimensional objects from liquid materials.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4. While such "bottom up" techniques hold the potential to eliminate the need for a deep well in which the object is submerged by instead lifting the object out of a relatively shallow well or pool, a problem with such "bottom up" fabrication techniques, as commercially implemented, is that extreme care must be taken, and additional mechanical elements employed, when separating the solidified layer from the bottom plate due to physical and chemical interactions therebetween. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, S. Dak., USA, employ a sliding build plate. See, e.g., M. Joyce, US Patent App. 2013/0292862 and Y. Chen et al., US Patent App. 2013/0295212 (both Nov. 7, 2013); see also Y. Pan et al., *J Manufacturing Sci. and Eng.* 134, 051011-1 (October 2012). Such approaches introduce a mechanical step that may complicate the apparatus, slow the method, and/or potentially distort the end product.

Continuous processes for producing a three-dimensional object are suggested at some length with respect to "top down" techniques in U.S. Pat. No. 7,892,474, but this reference does not explain how they may be implemented in "bottom up" systems in a manner non-destructive to the article being produced. Accordingly, there is a need for alternate methods and apparatus for three-dimensional fabrication that can obviate the need for mechanical separation steps in "bottom-up" fabrication.

SUMMARY OF THE INVENTION

Described herein are methods, systems and apparatus (including associated control methods, systems and apparatus), for the production of a three-dimensional object by additive manufacturing. In preferred (but not necessarily limiting) embodiments, the method is carried out continuously. In preferred (but not necessarily limiting) embodiments, the three-dimensional object is produced from a liquid interface. Hence they are sometimes referred to, for convenience and not for purposes of limitation, as continuous liquid interface (or interphase) production (or printing), that is, "CLIP" herein (the various phrasings being used interchangeably). A schematic representation of one embodiment thereof is given in FIG. 1 herein.

In some embodiments, an apparatus for forming a three-dimensional object from a polymerizable liquid, includes (a) a support; (b) a carrier operatively associated with said support on which carrier said three-dimensional object is formed; (c) an optically transparent member having a build surface, with said build surface and said carrier defining a build region therebetween, said optically transparent member comprising at least one polymeric portion and at least one support enhancing portion; and (d) a liquid polymer supply operatively associated with said build surface and configured to supply liquid polymer into said build region for solidification polymerization.

In some embodiments, the apparatus further includes (e) at least one light engine configured to irradiate said build region through said optically transparent member to form a solid polymer from said polymerizable liquid, the at least one light engine configured to project an image comprising an array of projected pixels into said build region; (f) at least one controller operatively associated with said carrier and said plurality of light engines for advancing said carrier away from said build surface to form said three-dimensional object from said solid polymer.

In some embodiments, said support enhancing portion comprises a material has a Young's modulus that is greater than a Young's modulus of the polymeric portion.

In some embodiments, said polymeric portion comprises a substantially planar polymeric layer.

In some embodiments, said support enhancing portion comprises an optically transparent support enhancing layer on the generally planar layer.

In some embodiments, said substantially planar polymeric layer comprises a first substantially planar polymeric layer on a first side of said support enhancing layer and said polymeric portion further comprises a second substantially planar polymeric layer on a second side of said support enhancing layer that is opposite the first side of said support enhancing layer.

In some embodiments, the apparatus includes a plurality of apertures in said support enhancing layer configured to increase a gas-permeability of said optically transparent member.

In some embodiments, said support enhancing layer has a variable thickness.

In some embodiments, said support enhancing portion comprises a rigid, opaque frame configured to support at least an edge portion of said polymeric portion of said optically transparent member. An optically transparent support may be in a center region of said optically transparent member, and said optically transparent support may be separated from said optically transparent member by a gap. The substantially planar polymeric layer may include first and second substantially planar polymeric layers having an optically transparent fluid therebetween. The optically transparent fluid may have an index of refraction within between 5, 10 to 20 or 30 percent of an index of refraction of said first and second substantially planar polymeric layers. The optically transparent fluid may be gas permeable.

In some embodiments, the support enhancing portion includes one or more stiffening support members between said first and second substantially planar polymeric layers. The one or more stiffening support members may include a stiffening plate having apertures therein. The optically transparent fluid may be in the apertures of said stiffening plate. The one or more stiffening support members may connect the first and second substantially polymeric layers. The one or more stiffening support members may include a plurality of stiffening support members between the first and second substantially polymeric layers and the optically transparent fluid may be between the plurality of stiffening support members. The optically transparent fluid may include oxygen-carrying perfluorochemicals, oxygen-carrying perfluoro-oils, perfluoropolyether, silicon oil, and/or water.

In some embodiments, said support enhancing portion comprises glass, quartz, and/or UV-transparent polymers.

In some embodiments, said build surface has an area of at least 0.01, 0.05, 0.1, 0.5, 1 or 5 square meters.

In some embodiments, the at least one controller is operatively associated with said carrier and said plurality of radiation sources for advancing said carrier away from said build surface to form said three-dimensional object from said solid polymer, while also concurrently: (i) continuously maintaining a dead zone of polymerizable liquid in contact with said build surface; and (ii) continuously maintaining a gradient of polymerization zone between said dead zone and said solid polymer and in contact with each thereof, said gradient of polymerization zone comprising said polymerizable liquid in partially cured form.

In some embodiments, said optically transparent member comprises a fixed semipermeable member, said semipermeable member comprising a feed surface separate from the build surface, the apparatus further comprising a polymerization inhibitor source in fluid communication with said feed surface.

In some embodiments, the build plate is substantially fixed or stationary.

In some embodiments, a heater is operatively associated with said build plate and/or said liquid polymer supply, said heater and configured to heat polymerizable liquid in or supplied to said build region.

In some embodiments, a cooler is operatively associated with said build plate and configured to cool polymerizable liquid in said build region.

In some embodiments, a pressure source is operatively associated with said liquid polymer supply.

In some embodiments, said carrier comprises a plate, post, web, film, reel, or combination thereof operatively associated with at least one actuator.

In some embodiments, said carrier comprises a drive, said drive and said controller configured to advance said carrier unidirectionally away from said build surface.

In some embodiments, said carrier has a soluble sacrificial layer thereon, and said three-dimensional object is formed on said soluble sacrificial layer.

According to some embodiments, a method of forming a three-dimensional object includes providing a carrier and an optically transparent member having a build surface, said carrier and said build surface defining a build region therebetween; filling said build region with a polymerizable liquid; irradiating said build region through said optically transparent member to form a solid polymer from said polymerizable liquid while concurrently advancing said carrier away from said build surface to form said three-dimensional object from said solid polymer, wherein said optically transparent member comprises at least one polymeric layer and at least one support enhancing layer.

In some embodiments, said support enhancing portion comprises a material having a Young's modulus that is greater than a Young's modulus of the polymeric portion.

In some embodiments, said polymeric portion comprises a substantially planar polymeric layer.

In some embodiments, said support enhancing portion comprises an optically transparent support enhancing layer on the generally planar layer.

In some embodiments, said substantially planar polymeric layer comprises a first substantially planar polymeric layer on a first side of said support enhancing layer and said polymeric portion further comprises a second substantially planar polymeric layer on a second side of said support enhancing layer that is opposite the first side of said support enhancing layer.

In some embodiments, a plurality of apertures are in said support enhancing layer configured to increase a gas-permeability of said optically transparent member.

In some embodiments, said support enhancing layer has a variable thickness.

In some embodiments, said support enhancing portion comprises a rigid, opaque frame configured to support at least an edge portion of said polymeric portion of said optically transparent member.

In some embodiments, said substantially planar polymeric layer comprises first and second substantially planar polymeric layers having an optically transparent fluid therebetween.

In some embodiments, the optically transparent fluid has an index of refraction within between 5, 10 to 20 or 30 percent of an index of refraction of said first and second substantially planar polymeric layers.

In some embodiments, the optically transparent fluid is gas permeable.

In some embodiments, said support enhancing portion further comprises one or more stiffening support members between said first and second substantially polymeric layers.

In some embodiments, said one or more stiffening support members comprises a stiffening plate having apertures therein.

In some embodiments, said optically transparent fluid is in the apertures of said stiffening plate.

In some embodiments, said one or more stiffening support members connect the first and second substantially polymeric layers.

In some embodiments, said one or more stiffening support members comprises a plurality of stiffening support members between the first and second substantially polymeric layers and said optically transparent fluid is between the plurality of stiffening support members.

In some embodiments, said optically transparent fluid comprises oxygen-carrying perfluorochemicals, oxygen-carrying perfluoro-oils, perfluoropolyether, silicon oil, and/or water.

In some embodiments, said support enhancing portion comprises glass, quartz, UV-transparent polymers.

In some embodiments, the method further includes, concurrently with said irradiating and/or advancing step: continuously maintaining a dead zone of polymerizable liquid in contact with said build surface, and continuously maintaining a gradient of polymerization zone between said dead zone and said solid polymer and in contact with each thereof, said gradient of polymerization zone comprising said polymerizable liquid in partially cured form.

In some embodiments, said optically transparent member comprises a semipermeable member, and said continuously maintaining a dead zone is carried out by feeding an inhibitor of polymerization through said optically transparent member, thereby creating a gradient of inhibitor in said dead zone and optionally in at least a portion of said gradient of polymerization zone.

In some embodiments, said optically transparent member is comprised of a semipermeable fluoropolymer, a rigid gas-permeable polymer, porous glass, or a combination thereof.

In some embodiments, said gradient of polymerization zone and said dead zone together have a thickness of from 1 to 1000 microns.

In some embodiments, said gradient of polymerization zone is maintained for a time of at least 5, 10, 20 or 30 seconds, or at least 1 or 2 minutes.

In some embodiments, the method further includes the step of heating said polymerizable liquid to reduce the viscosity thereof in said build region.

In some embodiments, said carrier has at least one channel formed therein, and said filling step is carried out by passing or forcing said polymerizable liquid into said build region through said at least one channel.

In some embodiments, said semipermeable member has a thickness of from 0.1 to 100 millimeters; and/or said semipermeable member has a permeability to oxygen of at least $7.5 \times 10^{-17}$ $m^2$ $s^{-1}$ $Pa^{-1}$ (10 Barrers); and/or said semipermeable member is formed of a semipermeable fluoropolymer, a rigid gas-permeable polymer, porous glass, or a combination thereof.

In some embodiments, said irradiating step is carried out with actinic radiation.

In some embodiments, said carrier has a soluble sacrificial layer thereon, and said three-dimensional object is formed on said soluble sacrificial layer.

In some embodiments, the total surface area of the build region occupies at least seventy percent of the total surface area of the build surface; and/or lateral movement of the carrier and object in any direction is not more than thirty percent of the width of said build region in the corresponding direction.

In some embodiments, said polymerizable liquid comprises a free radical polymerizable liquid and said inhibitor comprises oxygen.

In some embodiments, said polymerizable liquid comprises an acid-catalyzed or cationically polymerizable liquid, and said inhibitor comprises a base.

In some embodiments, the build surface is substantially fixed or stationary.

According to some embodiments, a build plate for use in an apparatus for forming a three-dimensional object from a polymerizable liquid includes an optically transparent member having a build surface, said optically transparent member comprising at least one polymeric portion and at least one support enhancing portion.

In some embodiments, said support enhancing portion comprises a material having a Young's modulus that is greater than a Young's modulus of the polymeric portion.

In some embodiments, said polymeric portion comprises a substantially planar polymeric layer.

In some embodiments, said support enhancing portion comprises an optically transparent support enhancing layer on the generally planar layer.

In some embodiments, said substantially planar polymeric layer comprises a first substantially planar polymeric layer on a first side of said support enhancing layer and said polymeric portion further comprises a second substantially planar polymeric layer on a second side of said support enhancing layer that is opposite the first side of said support enhancing layer.

In some embodiments, a plurality of apertures are in said support enhancing layer configured to increase a gas-permeability of said optically transparent member.

In some embodiments, said support enhancing layer has a variable thickness.

In some embodiments, said support enhancing portion comprises a rigid, opaque frame configured to support at least an edge portion of said polymeric portion of said optically transparent member.

In some embodiments, an optically transparent support is in a center region of said optically transparent member, and said optically transparent support is separated from said optically transparent member by a gap.

In some embodiments, said substantially planar polymeric layer comprises first and second substantially planar polymeric layers having an optically transparent fluid therebetween.

In some embodiments, the optically transparent fluid has an index of refraction within between 5, 10 to 20 or 30 percent of an index of refraction of said first and second substantially planar polymeric layers.

In some embodiments, the optically transparent fluid is gas permeable.

In some embodiments, said support enhancing portion further comprises one or more stiffening support members between said first and second substantially polymeric layers.

In some embodiments, said one or more stiffening support members comprises a stiffening plate having apertures therein.

In some embodiments, said optically transparent fluid is in the apertures of said stiffening plate.

In some embodiments, said one or more stiffening support members connect the first and second substantially polymeric layers.

In some embodiments, said one or more stiffening support members comprises a plurality of stiffening support members between the first and second substantially polymeric layers and said optically transparent fluid is between the plurality of stiffening support members.

In some embodiments, said optically transparent fluid comprises oxygen-carrying perfluorochemicals, oxygen-carrying perfluoro-oils, perfluoropolyether, silicon oil, and/or water.

In some embodiments, said support enhancing portion comprises glass, quartz, and/or UV-transparent polymers.

In some embodiments, said build surface has an area of at least 0.01, 0.05, 0.1, 0.5, 1 or 5 square meters.

Non-limiting examples and specific embodiments of the present invention are explained in greater detail in the drawings herein and the specification set forth below. The disclosure of all United States patent references cited herein are to be incorporated herein by reference in their entirety.

BRIEF DESCRIPTION OF THE DRAWINGS

FIG. 11 shows various alternate embodiments of the build plates of FIGS. 7-10.

FIGS. 41A-41C are schematic diagrams illustrating a formation of a transparent filled glass laminate for use as a build plate according to some embodiments.

FIGS. 42A-42C are schematic diagrams illustrating a formation of a patterned film for use as a build plate according to some embodiments.

DETAILED DESCRIPTION OF ILLUSTRATIVE EMBODIMENTS

Figure 1:
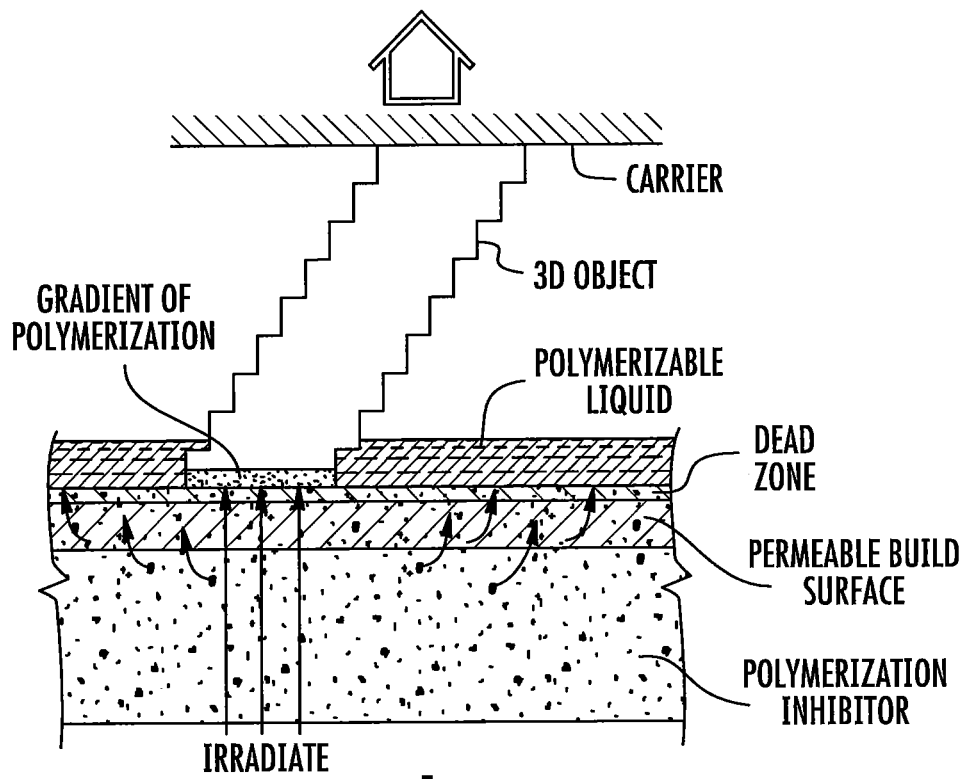
FIG. 1 is a schematic illustration of one embodiment of a method of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids.

Any suitable polymerizable liquid can be used to enable the present invention. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid Catalyzed Polymerizable Liquids.

While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also *Photoacid Generator Selection Guide for the electronics industry and energy curable coatings* (BASF 2010).

Hydrogels.

In some embodiments suitable resins includes photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable Silicone Resins.

A suitable resin includes photocurable silicones. UV cure silicone rubber, such as Silopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable Resins.

Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable Polyurethanes.

A particularly useful resin is photocurable polyurethanes. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High Performance Resins.

In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, amd fluoroenone initiators (including derivatives thereof), to initiate cross-linking on irradiation, as discussed further below.

Additional Example Resins.

Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. A particulary useful resin for investment casting applications includes EnvisionTEC's Easy Cast EC500.

Additional Resin Ingredients.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent or detectable compound as described below, though these may also be provided dissolved solubilized in the liquid resin as also discussed below. For example, magnetic or paramagnetic particles or nanoparticles can be employed. The resin or polymerizable material may contain a dispersing agent, such as an ionic surfactant, a non-ionic surfactant, a block copolymer, or the like.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Inhibitors of Polymerization.

Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable Liquids Carrying Live Cells.

In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

2. Apparatus.

Figure 2:
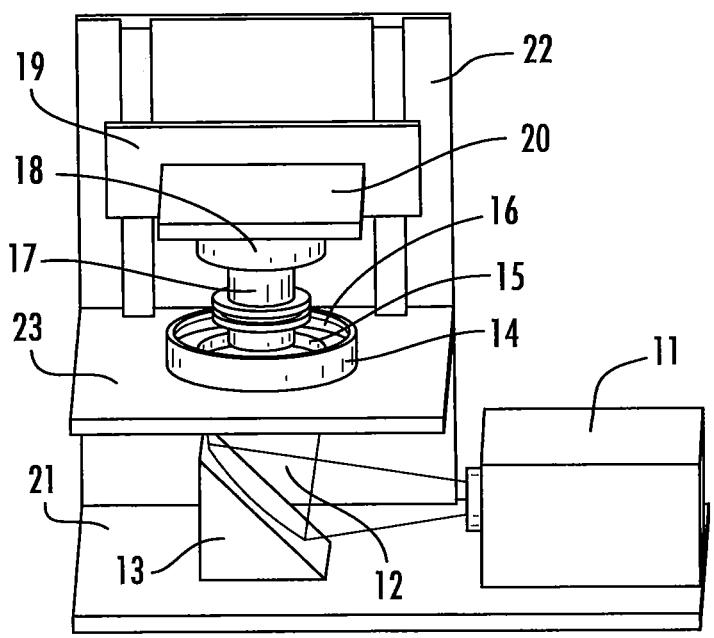
FIG. 2 is a perspective view of one embodiment of an apparatus of the present invention.

A non-limiting embodiment of an apparatus of the invention is shown in FIG. 2. It comprises a radiation source 11 such as a digital light processor (DLP) providing electromagnetic radiation 12 which though reflective mirror 13 illuminates a build chamber defined by wall 14 and a rigid build plate 15 forming the bottom of the build chamber, which build chamber is filled with liquid resin 16. The bottom of the chamber 15 is constructed of build plate comprising a semipermeable member as discussed further below. The top of the object under construction 17 is attached to a carrier 18. The carrier is driven in the vertical direction by linear stage 19, although alternate structures can be used as discussed below.

A liquid resin reservoir, tubing, pumps liquid level sensors and/or valves can be included to replenish the pool of liquid resin in the build chamber (not shown for clarity) though in some embodiments a simple gravity feed may be employed. Drives/actuators for the carrier or linear stage, along with associated wiring, can be included in accordance with known techniques (again not shown for clarity). The drives/actuators, radiation source, and in some embodiments pumps and liquid level sensors can all be operatively associated with a suitable controller, again in accordance with known techniques.

Build plates 15 used to carry out the present invention generally comprise or consist of a (typically rigid or solid, stationary, and/or fixed, but may also be flexible) semipermeable (or gas permeable) member, alone or in combination with one or more additional supporting substrates (e.g., clamps and tensioning members to rigidify an otherwise flexible semipermeable material). The semipermeable member can be made of any suitable material that is optically transparent at the relevant wavelengths (or otherwise transparent to the radiation source, whether or not it is visually transparent as perceived by the human eye—i.e., an optically transparent window may in some embodiments be visually opaque), including but not limited to porous or microporous glass, and the rigid gas permeable polymers used for the manufacture of rigid gas permeable contact lenses. See, e.g., Norman G. Gaylord, U.S. Pat. No. RE31,406; see also U.S. Pat. Nos. 7,862,176; 7,344,731; 7,097,302; 5,349,394; 5,310,571; 5,162,469; 5,141,665; 5,070,170; 4,923,906; and 4,845,089. Other suitable oxygen-permeable materials may be used, including polyester, e.g., Mylar® from Dupont Tejjin Films, Chester, V.A., polyurethane, polyethelene, polychlorophene, mercapto ester-based resins, e.g., Norland 60, from Norland Optical Products, Inc., New Brunswick, N.J., porous Tygon® tubing from Saint-Gobain Performance Plastics, Mickleton, N.J., or other materials. Still other Exemplary oxygen-permeable materials are described in U.S. Pat. No. 7,709,544, the disclosure of which is incorporated herein by reference.

In some embodiments, suitable oxygen-permeable materials are characterized as glassy and/or amorphous polymers and/or substantially crosslinked that they are essentially non-swellable. Preferably the semipermeable member is formed of a material that does not swell when contacted to the liquid resin or material to be polymerized (i.e., is "non-swellable"). Suitable materials for the semipermeable member include amorphous fluoropolymers, such as those described in U.S. Pat. Nos. 5,308,685 and 5,051,115. For example, such fluoropolymers are particularly useful over silicones that would potentially swell when used in conjunction with organic liquid resin inks to be polymerized. For some liquid resin inks, such as more aqueous-based monomeric systems and/or some polymeric resin ink systems that have low swelling tendencies, silicone based window materials maybe suitable. The solubility or permeability of organic liquid resin inks can be dramatically decreased by a number of known parameters including increasing the cross-link density of the window material or increasing the molecular weight of the liquid resin ink. In some embodiments the build plate may be formed from a thin film or sheet of material which is flexible when separated from the apparatus of the invention, but which is clamped and tensioned when installed in the apparatus (e.g., with a tensioning ring) so that it is rendered fixed or rigid in the apparatus. Particular materials include TEFLON AF® fluoropolymers, commercially available from DuPont. Additional materials include perfluoropolyether polymers such as described in U.S. Pat. Nos. 8,268,446; 8,263,129; 8,158,728; and 7,435,495.

It will be appreciated that essentially all solid materials, and most of those described above, have some inherent "flex" even though they may be considered "rigid," depending on factors such as the shape and thickness thereof and environmental factors such as the pressure and temperature to which they are subjected. In addition, the terms "stationary" or "fixed" with respect to the build plate is intended to mean that no mechanical interruption of the process occurs, or no mechanism or structure for mechanical interruption of the process (as in a layer-by-layer method or apparatus) is provided, even if a mechanism for incremental adjustment of the build plate (for example, adjustment that does not lead to or cause collapse of the gradient of polymerization zone) is provided), or if the build surface contributes to reciprocation to aid feeding of the polymerizable liquid, as described further below.

The semipermeable member typically comprises a top surface portion, a bottom surface portion, and an edge surface portion. The build surface is on the top surface portion; and the feed surface may be on one, two, or all three of the top surface portion, the bottom surface portion, and/or the edge surface portion. In the embodiment illustrated in FIG. 2 the feed surface is on the bottom surface portion, but alternate configurations where the feed surface is provided on an edge, and/or on the top surface portion (close to but separate or spaced away from the build surface) can be implemented with routine skill.

The semipermeable member has, in some embodiments, a thickness of from 0.01, 0.1 or 1 millimeters to 10 or 100 millimeters, or more (depending upon the size of the item being fabricated, whether or not it is laminated to or in contact with an additional supporting plate such as glass, etc., as discussed further below).

The permeability of the semipermeable member to the polymerization inhibitor will depend upon conditions such as the pressure of the atmosphere and/or inhibitor, the choice of inhibitor, the rate or speed of fabrication, etc. In general, when the inhibitor is oxygen, the permeability of the semipermeable member to oxygen may be from 10 or 20 Barrers, up to 1000 or 2000 Barrers, or more. For example, a semipermeable member with a permeability of 10 Barrers used with a pure oxygen, or highly enriched oxygen, atmosphere under a pressure of 150 PSI may perform substantially the same as a semipermeable member with a permeability of 500 Barrers when the oxygen is supplied from the ambient atmosphere under atmospheric conditions.

Thus, the semipermeable member may comprise a flexible polymer film (having any suitable thickness, e.g., from 0.001, 0.01, 0.05, 0.1 or 1 millimeters to 1, 5, 10, or 100 millimeters, or more), and the build plate may further comprise a tensioning member (e.g., a peripheral clamp and an operatively associated strain member or stretching member, as in a "drum head"; a plurality of peripheral clamps, etc., including combinations thereof) connected to the polymer film and to fix and rigidify the film (e.g., at least sufficiently so that the film does not stick to the object as the object is advanced and resiliently or elastically rebound therefrom). The film has a top surface and a bottom surface, with the build surface on the top surface and the feed surface preferably on the bottom surface. In other embodiments, the semipermeable member comprises: (i) a polymer film layer (having any suitable thickness, e.g., from 0.001, 0.01, 0.1 or 1 millimeters to 5, 10 or 100 millimeters, or more), having a top surface positioned for contacting said polymerizable liquid and a bottom surface, and (ii) a rigid, gas permeable, optically transparent supporting member (having any suitable thickness, e.g., from 0.01, 0.1 or 1 millimeters to 10, 100, or 200 millimeters, or more), contacting said film layer bottom surface. The supporting member has a top surface contacting the film layer bottom surface, and the supporting member has a bottom surface which may serve as the feed surface for the polymerization inhibitor. Any suitable materials that permit the polymerization inhibitor to pass to the build surface may be used, including materials that are semipermeable (that is, permeable to the polymerization inhibitor). For example, the polymer film or polymer film layer may, for example, be a fluoropolymer film, such as an amorphous thermoplastic fluoropolymer like TEFLON AF 1600™ or TEFLON AF 2400™ fluoropolymer films, or perfluoropolyether (PFPE), particularly a crosslinked PFPE film, or a crosslinked silicone polymer film. The supporting member comprises a silicone or crosslinked silicone polymer member such as a polydmiethylxiloxane member, a rigid gas permeable polymer member, or glass member, including porous or microporous glass. Films can be laminated or clamped directly to the rigid supporting member without adhesive (e.g., using PFPE and PDMS materials), or silane coupling agents that react with the upper surface of a PDMS layer can be utilized to adhere to the first polymer film layer. UV-curable, acrylate-functional silicones can also be used as a tie layer between UV-curable PFPEs and rigid PDMS supporting layers.

When configured for placement in the apparatus, the carrier defines a "build region" on the build surface, within the total area of the build surface. Because lateral "throw" (e.g., in the X and/or Y directions) is not required in the present invention to break adhesion between successive layers, as in the Joyce and Chen devices noted previously, the area of the build region within the build surface may be maximized (or conversely, the area of the build surface not devoted to the build region may be minimized). Hence in some embodiments, the total surface area of the build region can occupy at least fifty, sixty, seventy, eighty, or ninety percent of the total surface area of the build surface.

As shown in FIG. 2, the various components are mounted on a support or frame assembly 20. While the particular design of the support or frame assembly is not critical and can assume numerous configurations, in the illustrated embodiment it is comprised of a base 21 to which the radiation source 11 is securely or rigidly attached, a vertical member 22 to which the linear stage is operatively associated, and a horizontal table 23 to which wall 14 is removably or securely attached (or on which the wall is placed), and with the build plate rigidly fixed, either permanently or removably, to form the build chamber as described above.

As noted above, the build plate can consist of a single unitary and integral piece of a rigid semipermeable member, or can comprise additional materials. For example, glass can be laminated or fixed to a rigid semipermeable material. Or, a semipermeable member as an upper portion can be fixed to a transparent lower member having purging channels formed therein for feeding gas carrying the polymerization inhibitor to the semipermeable member (through which it passes to the build surface to facilitate the formation of a release layer of unpolymerized liquid material, as noted above and below). Such purge channels may extend fully or partially through the base plate: For example, the purge channels may extend partially into the base plate, but then end in the region directly underlying the build surface to avoid introduction of distortion. Specific geometries will depend upon whether the feed surface for the inhibitor into the semipermeable member is located on the same side or opposite side as the build surface, on an edge portion thereof, or a combination of several thereof.

Any suitable radiation source (or combination of sources) can be used, depending upon the particular resin employed, including electron beam and ionizing radiation sources. In a preferred embodiment the radiation source is an actinic radiation source, such as one or more light sources, and in particular one or more ultraviolet light sources. Any suitable light source can be used, such as incandescent lights, fluorescent lights, phosphorescent or luminescent lights, a laser, light-emitting diode, etc., including arrays thereof. The light source preferably includes a pattern-forming element operatively associated with a controller, as noted above. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526. Preferably the light source comprises a spatial light modulation array such as a liquid crystal light valve array or micromirror array or DMD (e.g., with an operatively associated digital light processor, typically in turn under the control of a suitable controller), configured to carry out exposure or irradiation of the polymerizable liquid without a mask, e.g., by maskless photolithography. See, e.g., U.S. Pat. Nos. 6,312,134; 6,248,509; 6,238,852; and 5,691,541.

In some embodiments, as discussed further below, there may be movement in the X and/or Y directions concurrently with movement in the Z direction, with the movement in the X and/or Y direction hence occurring during polymerization of the polymerizable liquid (this is in contrast to the movement described in Y. Chen et al., or M. Joyce, supra, which is movement between prior and subsequent polymerization steps for the purpose of replenishing polymerizable liquid). In the present invention such movement may be carried out for purposes such as reducing "burn in" or fouling in a particular zone of the build surface.

Because an advantage of some embodiments of the present invention is that the size of the build surface on the semipermeable member (i.e., the build plate or window) may be reduced due to the absence of a requirement for extensive lateral "throw" as in the Joyce or Chen devices noted above, in the methods, systems and apparatus of the present invention lateral movement (including movement in the X and/or Y direction or combination thereof) of the carrier and object (if such lateral movement is present) is preferably not more than, or less than, 80, 70, 60, 50, 40, 30, 20, or even 10 percent of the width (in the direction of that lateral movement) of the build region.

While in some embodiments the carrier is mounted on an elevator to advance up and away from a stationary build plate, on other embodiments the converse arrangement may be used: That is, the carrier may be fixed and the build plate lowered to thereby advance the carrier away therefrom. Numerous different mechanical configurations will be apparent to those skilled in the art to achieve the same result.

Depending on the choice of material from which the carrier is fabricated, and the choice of polymer or resin from which the article is made, adhesion of the article to the carrier may sometimes be insufficient to retain the article on the carrier through to completion of the finished article or "build." For example, an aluminum carrier may have lower adhesion than a poly(vinyl chloride) (or "PVC") carrier. Hence one solution is to employ a carrier comprising a PVC on the surface to which the article being fabricated is polymerized. If this promotes too great an adhesion to conveniently separate the finished part from the carrier, then any of a variety of techniques can be used to further secure the article to a less adhesive carrier, including but not limited to the application of adhesive tape such as "Greener Masking Tape for Basic Painting #2025 High adhesion" to further secure the article to the carrier during fabrication.

3. Controller and Process Control.

The methods and apparatus of the invention can include process steps and apparatus features to implement process control, including feedback and feed-forward control, to, for example, enhance the speed and/or reliability of the method.

A controller for use in carrying out the present invention may be implemented as hardware circuitry, software, or a combination thereof. In one embodiment, the controller is a general purpose computer that runs software, operatively associated with monitors, drives, pumps, and other components through suitable interface hardware and/or software. Suitable software for the control of a three-dimensional printing or fabrication method and apparatus as described herein includes, but is not limited to, the ReplicatorG open source 3d printing program, 3DPrint™ controller software from 3D systems, Slic3r, Skeinforge, KISSlicer, Repetier-Host, PrintRun, Cura, etc., including combinations thereof.

Process parameters to directly or indirectly monitor, continuously or intermittently, during the process (e.g., during one, some or all of said filling, irradiating and advancing steps) include, but are not limited to, irradiation intensity, temperature of carrier, polymerizable liquid in the build zone, temperature of growing product, temperature of build plate, pressure, speed of advance, pressure, force (e.g., exerted on the build plate through the carrier and product being fabricated), strain (e.g., exerted on the carrier by the growing product being fabricated), thickness of release layer, etc.

Known parameters that may be used in feedback and/or feed-forward control systems include, but are not limited to, expected consumption of polynierizable liquid (e.g., from the known geometry or volume of the article being fabricated), degradation temperature of the polymer being formed from the polymerizable liquid, etc.

Process conditions to directly or indirectly control, continuously or step-wise, in response to a monitored parameter, and/or known parameters (e.g., during any or all of the process steps noted above), include, but are not limited to, rate of supply of polymerizable liquid, temperature, pressure, rate or speed of advance of carrier, intensity of irradiation, duration of irradiation (e.g. for each "slice"), etc.

For example, the temperature of the polymerizable liquid in the build zone, or the temperature of the build plate, can be monitored, directly or indirectly with an appropriate thermocouple, non-contact temperature sensor (e.g., an infrared temperature sensor), or other suitable temperature sensor, to determine whether the temperature exceeds the degradation temperature of the polymerized product. If so, a process parameter may be adjusted through a controller to reduce the temperature in the build zone and/or of the build plate. Suitable process parameters for such adjustment may include: decreasing temperature with a cooler, decreasing the rate of advance of the carrier, decreasing intensity of the irradiation, decreasing duration of radiation exposure, etc.

In addition, the intensity of the irradiation source (e.g., an ultraviolet light source such as a mercury lamp) may be monitored with a photodetector to detect a decrease of intensity from the irriadiation source (e.g., through routine degradation thereof during use). If detected, a process parameter may be adjusted through a controller to accommodate the loss of intensity. Suitable process parameters for such adjustment may include: increasing temperature with a heater, decreasing the rate of advance of the carrier, increasing power to the light source, etc.

As another example, control of temperature and/or pressure to enhance fabrication time may be achieved with heaters and coolers (individually, or in combination with one another and separately responsive to a controller), and/or with a pressure supply (e.g., pump, pressure vessel, valves and combinations thereof) and/or a pressure release mechanism such as a controllable valve (individually, or in combination with one another and separately responsive to a controller).

In some embodiments the controller is configured to maintain the gradient of polymerization zone described herein (see, e.g., FIG. 1) throughout the fabrication of some or all of the final product. The specific configuration (e.g., times, rate or speed of advancing, radiation intensity, temperature, etc.) will depend upon factors such as the nature of the specific polymerizable liquid and the product being created. Configuration to maintain the gradient of polymerization zone may be carried out empirically, by entering a set of process parameters or instructions previously determined, or determined through a series of test runs or "trial and error"; configuration may be provided through pre-determined instructions; configuration may be achieved by suitable monitoring and feedback (as discussed above), combinations thereof, or in any other suitable manner.

Figure 3:
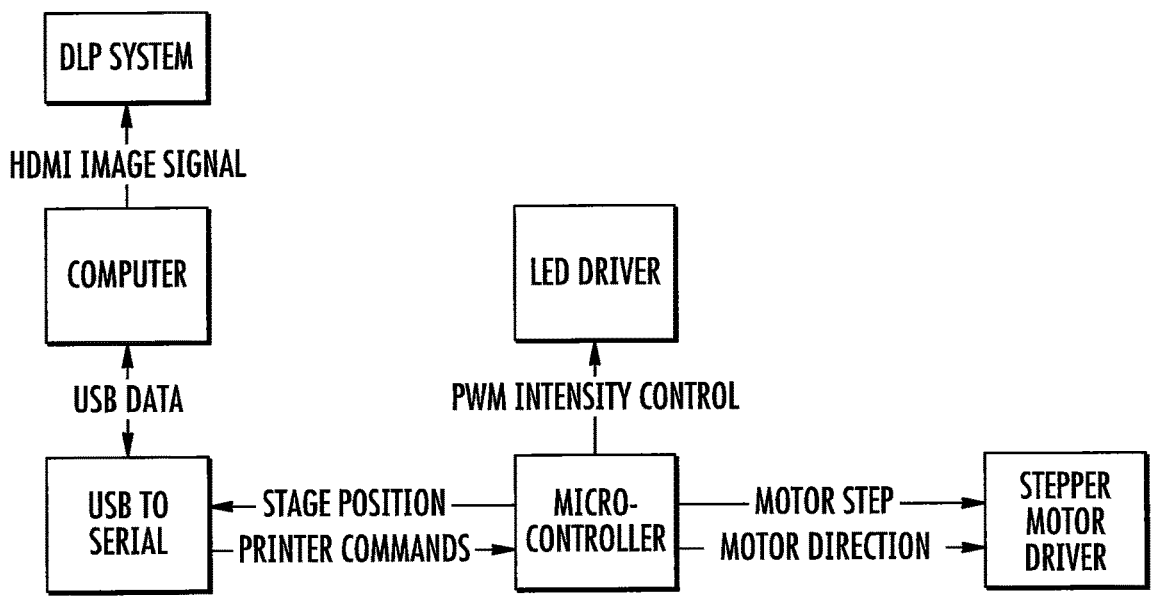
FIGS. 3 to 5 are flow charts illustrating control systems and methods for carrying out the present invention.
Figure 4:
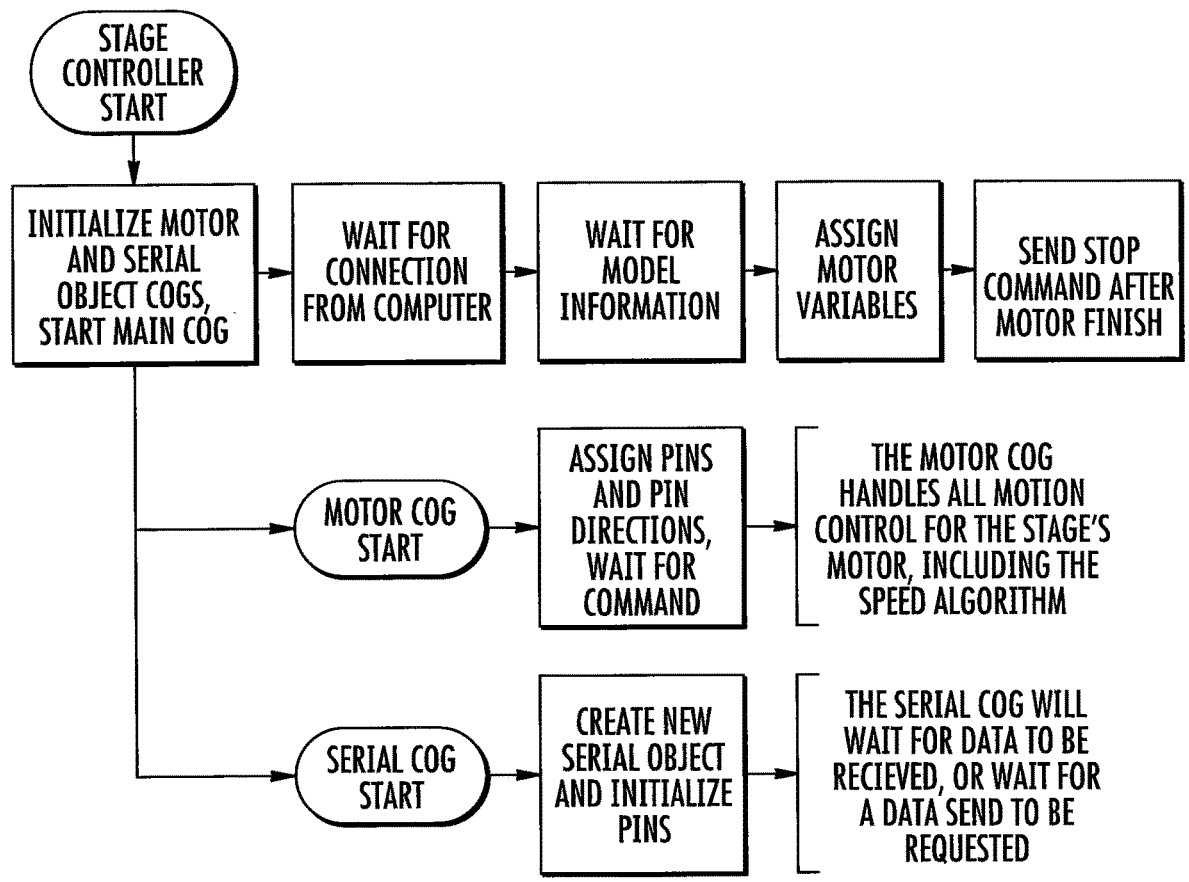
Figure 5:
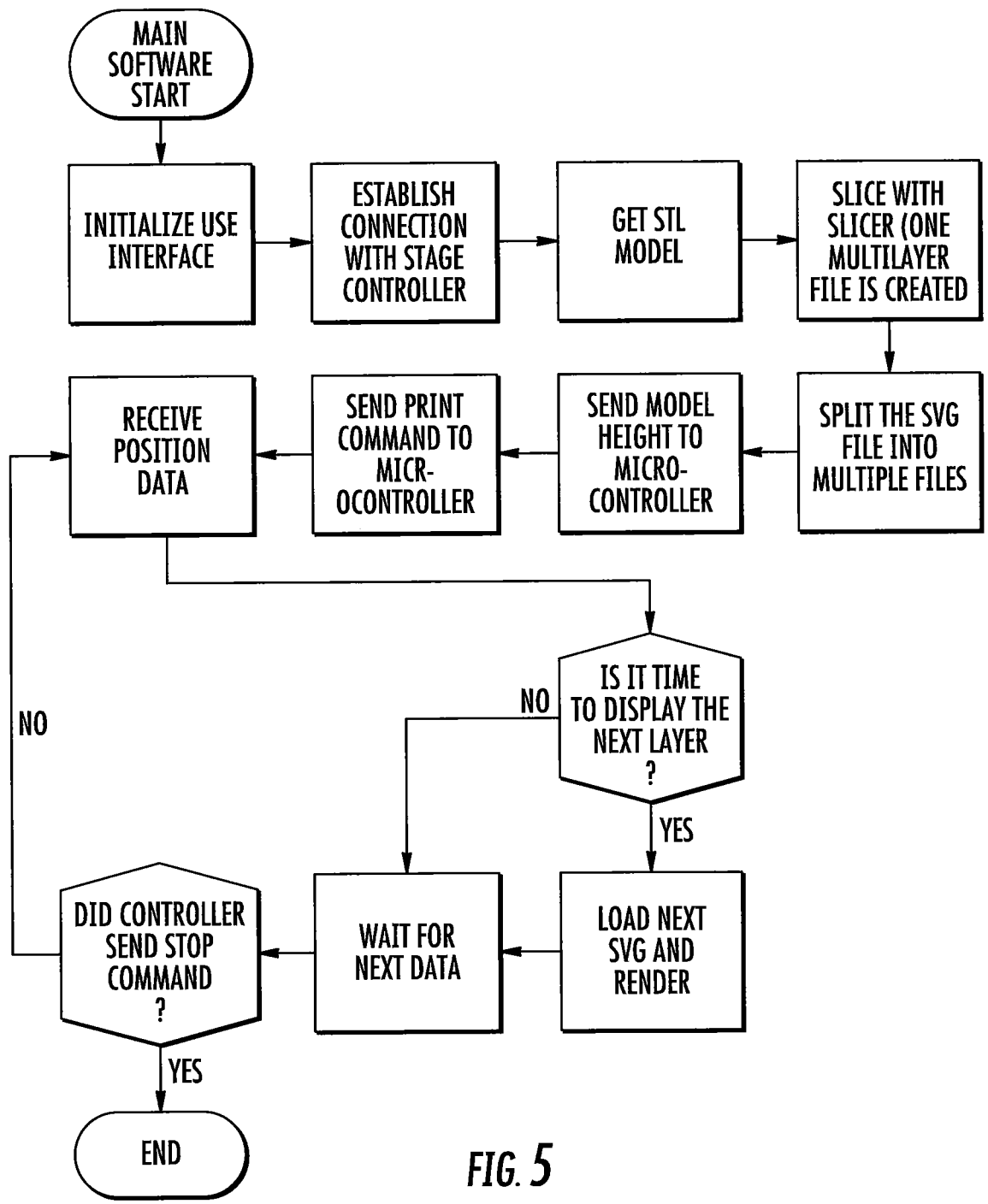

In some embodiments, a method and apparatus as described above may be controlled by a software program running in a general purpose computer with suitable interface hardware between that computer and the apparatus described above. Numerous alternatives are commercially available. Non-limiting examples of one combination of components is shown in FIGS. 3 to 5, where "Microcontroller" is Parallax Propeller, the Stepper Motor Driver is Sparkfun EasyDriver, the LED Driver is a Luxeon Single LED Driver, the USB to Serial is a Parallax USB to Serial converter, and the DLP System is a Texas Instruments LightCrafter system.

4. General Methods.

As noted above, the present invention provides a method of forming a three-dimensional object, comprising the steps of: (a) providing a carrier and a build plate, said build plate comprising a semipermeable member, said semipermeable member comprising a build surface and a feed surface separate from said build surface, with said build surface and said carrier defining a build region therebetween, and with said feed surface in fluid contact with a polymerization inhibitor; then (concurrently and/or sequentially) (b) filing said build region with a polymerizable liquid, said polymerizable liquid contacting said build segment, (c) irradiating said build region through said build plate to produce a solid polymerized region in said build region, with a liquid film release layer comprised of said polymerizable liquid formed between said solid polymerized region and said build surface, the polymerization of which liquid film is inhibited by said polymerization inhibitor; and (d) advancing said carrier with said polymerized region adhered thereto away from said build surface on said stationary build plate to create a subsequent build region between said polymerized region and said top zone. In general the method includes (e) continuing and/or repeating steps (b) through (d) to produce a subsequent polymerized region adhered to a previous polymerized region until the continued or repeated deposition of polymerized regions adhered to one another forms said three-dimensional object.

Since no mechanical release of a release layer is required, or no mechanical movement of a build surface to replenish oxygen is required, the method can be carried out in a continuous fashion, though it will be appreciated that the individual steps noted above may be carried out sequentially, concurrently, or a combination thereof. Indeed, the rate of steps can be varied over time depending upon factors such as the density and/or complexity of the region under fabrication.

Also, since mechanical release from a window or from a release layer generally requires that the carrier be advanced a greater distance from the build plate than desired for the next irradiation step, which enables the window to be recoated, and then return of the carrier back closer to the build plate (e.g., a "two steps forward one step back" operation), the present invention in some embodiments permits elimination of this "back-up" step and allows the carrier to be advanced unidirectionally, or in a single direction, without intervening movement of the window for re-coating, or "snapping" of a pre-formed elastic release-layer. However, in other embodiments of the invention, reciprocation is utilized not for the purpose of obtaining release, but for the purpose of more rapidly filling or pumping polymerizable liquid into the build region.

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.)

In other embodiments of the invention, the advancing step is carried out continuously, at a uniform or variable rate.

In some embodiments, the rate of advance (whether carried out sequentially or continuously) is from about 0.1 l, or 10 microns per second, up to about to 100, 1,000, or 10,000 microns per second, again depending again depending on factors such as temperature, pressure, structure of the article being produced, intensity of radiation, etc As described further below, in some embodiments the filling step is carried out by forcing said polymerizable liquid into said build region under pressure. In such a case, the advancing step or steps may be carried out at a rate or cumulative or average rate of at least 0.1, 1, 10, 50, 100, 500 or 1000 microns per second, or more. In general, the pressure may be whatever is sufficient to increase the rate of said advancing step(s) at least 2, 4, 6, 8 or 10 times as compared to the maximum rate of repetition of said advancing steps in the absence of said pressure. Where the pressure is provided by enclosing an apparatus such as described above in a pressure vessel and carrying the process out in a pressurized atmosphere (e.g., of air, air enriched with oxygen, a blend of gasses, pure oxygen, etc.) a pressure of 10, 20, 30 or 40 pounds per square inch (PSI) up to, 200, 300, 400 or 500 PSI or more, may be used. For fabrication of large irregular objects higher pressures may be less preferred as compared to slower fabrication times due to the cost of a large high pressure vessel. In such an embodiment, both the feed surface and the polymerizable liquid can be in fluid contact with the same compressed gas (e.g., one comprising from 20 to 95 percent by volume of oxygen, the oxygen serving as the polymerization inhibitor.

On the other hand, when smaller items are fabricated, or a rod or fiber is fabricated that can be removed or exited from the pressure vessel as it is produced through a port or orifice therein, then the size of the pressure vessel can be kept smaller relative to the size of the product being fabricated and higher pressures can (if desired) be more readily utilized.

As noted above, the irradiating step is in some embodiments carried out with patterned irradiation. The patterned irradiation may be a fixed pattern or may be a variable pattern created by a pattern generator (e.g., a DLP) as discussed above, depending upon the particular item being fabricated.

When the patterned irradiation is a variable pattern rather than a pattern that is held constant over time, then each irradiating step may be any suitable time or duration depending on factors such as the intensity of the irradiation, the presence or absence of dyes in the polymerizable material, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or said gradient of polymerization zone and said dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

The method may further comprise the step of disrupting said gradient of polymerization zone for a time sufficient to form a cleavage line in said three-dimensional object (e.g., at a predetermined desired location for intentional cleavage, or at a location in said object where prevention of cleavage or reduction of cleavage is non-critical), and then reinstating said gradient of polymerization zone (e.g. by pausing, and resuming, the advancing step, increasing, then decreasing, the intensity of irradiation, and combinations thereof In some embodiments the build surface is flat; in other the build surface is irregular such as convexly or concavely curved, or has walls or trenches formed therein. In either case the build surface may be smooth or textured.

Curved and/or irregular build plates or build surfaces can be used in fiber or rod formation, to provide different materials to a single object being fabricated (that is, different polymerizable liquids to the same build surface through channels or trenches formed in the build surface, each associated with a separate liquid supply, etc.

Carrier Feed Channels for Polymerizable Liquid.

While polymerizable liquid may be provided directly to the build plate from a liquid conduit and reservoir system, in some embodiments the carrier include one or more feed channels therein. The carrier feed channels are in fluid communication with the polymerizable liquid supply, for example a reservoir and associated pump. Different carrier feed channels may be in fluid communication with the same supply and operate simultaneously with one another, or different carrier feed channels may be separately controllable from one another (for example, through the provision of a pump and/or valve for each). Separately controllable feed channels may be in fluid communication with a reservoir containing the same polymerizable liquid, or may be in fluid communication with a reservoir containing different polymerizable liquids. Through the use of valve assemblies, different polymerizable liquids may in some embodiments be alternately fed through the same feed channel, if desired.

5. Reciprocating Feed of Polymerizable Liquid.

In an embodiment of the present invention, the carrier is vertically reciprocated with respect to the build surface (that is, the two are vertically reciprocated with respect to one another) to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the speed of the upstroke gradually accelerates (that is, there is provided a gradual start and/or gradual acceleration of the upstroke, over a period of at least 20, 30, 40, or 50 percent of the total time of the upstroke, until the conclusion of the upstroke, or the change of direction which represents the beginning of the downstroke. Stated differently, the upstroke begins, or starts, gently or gradually.

In some embodiments, the speed of the downstroke gradually decelerates (that is, there is provided a gradual termination and/or gradual deceleration of the downstroke, over a period of at least 20, 30, 40, or 50 percent of the total time of the downstroke. Stated differently, the downstroke concludes, or ends, gently or gradually.

While in some embodiments there is an abrupt end, or abrupt deceleration, of the upstroke, and an abrupt beginning or deceleration of the downstroke (e.g., a rapid change in vector or direction of travel from upstroke to downstroke), it will be appreciated that gradual transitions may be introduced here as well (e.g., through introduction of a "plateau" or pause in travel between the upstroke and downstroke). It will also be appreciated that, while each reciprocating step may be consist of a single upstroke and downstroke, the reciprocation step may comprise a plurality of 2, 3, 4 or 5 or more linked set of reciprocations, which may e the same or different in frequent and/or amplitude In some embodiments, the vertically reciprocating step is carried out over a total time of from 0.01 or 0.1 seconds up to 1 or 10 seconds (e.g., per cycle of an upstroke and a downstroke).

In some embodiments, the upstroke distance of travel is from 0.02 or 0.2 millimeters (or 20 or 200 microns) to 1 or 10 millimeters (or 1000 to 10,000 microns). The distance of travel of the downstroke may be the same as, or less than, the distance of travel of the upstroke, where a lesser distance of travel for the downstroke serves to achieve the advancing of the carrier away from the build surface as the three-dimensional object is gradually formed. Where a reciprocation step comprises multiple linked reciprocations, the sum distance of travel of all upstrokes in that set is preferably greater than the sum distance of travel of all downstrokes in that set, to achieve the advancing of the carrier away from the build surface as the three-dimensional object is gradually formed.

Preferably the vertically reciprocating step, and particularly the upstroke thereof, does not cause the formation of gas bubbles or a gas pocket in the build region, but instead the build region remains filled with the polymerizable liquid throughout the reciprocation steps, and the gradient of polymerization zone or region remains in contact with the "dead zone" and with the growing object being fabricated throughout the reciprocation steps. As will be appreciated, a purpose of the reciprocation is to speed or enhance the refilling of the build region, particularly where larger build regions are to be refilled with polymerizable liquid, as compared to the speed at which the build region could be refilled without the reciprocation step.

In some embodiments, the advancing step is carried out intermittently at a rate of 1, 2, 5 or 10 individual advances per minute up to 300, 600, or 1000 individual advances per minute, each followed by a pause during which an irradiating step is carried out. It will be appreciated that one or more reciprocation steps (e.g., upstroke plus downstroke) may be carried out within each advancing step. Stated differently, the reciprocating steps may be nested within the advancing steps.

In some embodiments, the individual advances are carried out over an average distance of travel for each advance of from 10 or 50 microns to 100 or 200 microns (optionally including the total distance of travel for each vertically reciprocating step, e.g., the sum of the upstroke distance minus the downstroke distance).

Apparatus for carrying out the invention in which the reciprocation steps described herein are implemented substantially as described above, with the drive associated with the carrier, and/or with an additional drive operatively associated with the transparent member, and with the controller operatively associated with either or both thereof and configured to reciprocate the carrier and transparent member with respect to one another as described above.

In the alternative, vertical reciprocation may be carried out by configuring the build surface (and corresponding build plate) so that it may have a limited range of movement up and down in the vertical or "Z" dimension, while the carrier advances (e.g., continuously or step-wise) away from the build plate in the vertical or "Z" dimension. In some embodiments, such limited range of movement may be passively imparted, such as with upward motion achieved by partial adhesion of the build plate to the growing object through a viscous polymerizable liquid, followed by downward motion achieved by the weight, resiliency, etc. of the build plate (optionally including springs, buffers, shock absorbers or the like, configured to influence either upward or downward motion of the build plate and build surface). In another embodiment, such motion of the build surface may be actively achieved, by operatively associating a separate drive system with the build plate, which drive system is also operatively associated with the controller, to separately achieve vertical reciprocation. In still another embodiment, vertical reciprocation may be carried out by configuring the build plate, and/or the build surface, so that it flexes upward and downward, with the upward motion thereof being achieved by partial adhesion of the build surface to the growing object through a viscous polymerizable liquid, followed by downward motion achieved by the inherent stiffness of the build surface biasing it or causing it to return to a prior position.

It will be appreciated that illumination or irradiation steps, when intermittent, may be carried out in a manner synchronized with vertical reciprocation, or not synchronized with vertical reciprocation, depending on factors such as whether the reciprocation is achieved actively or passively.

It will also be appreciated that vertical reciprocation may be carried out between the carrier and all regions of the build surface simultaneously (e.g., where the build surface is rigid), or may be carried out between the carrier and different regions of the build surface at different times (e.g., where the build surface is of a flexible material, such as a tensioned polymer film).

6. Increased Speed of Fabrication by Increasing Light Intensity.

In general, it has been observed that speed of fabrication can increase with increased light intensity. In some embodiments, the light is concentrated or "focused" at the build region to increase the speed of fabrication. This may be accomplished using an optical device such as an objective lens.

The speed of fabrication may be generally proportional to the light intensity. For example, the build speed in millimeters per hour may be calculated by multiplying the light intensity in milliWatts per square centimeter and a multiplier. The multiplier may depend on a variety of factors, including those discussed below. A range of multiplers, from low to high, may be employed. On the low end of the range, the multiplier may be about 10, 15, 20 or 30. On the high end of the mutipler range, the multiplier may be about 150, 300, 400 or more.

The relationships described above are, in general, contemplated for light intensities of from 1, 5 or 10 milliWatts per square centimeter, up to 20 or 50 milliWatts per square centimeter.

Certain optical characteristics of the light may be selected to facilitate increased speed of fabrication. By way of example, a band pass filter may be used with a mercury bulb light source to provide 365±10 nm light measured at Full Width Half Maximum (FWHM). By way of further example, a band pass filter may be used with an LED light source to provide 375±15 nm light measured at FWHM.

As noted above, poymerizable liquids used in such processes are, in general, free radical polymerizable liquids with oxygen as the inhibitor, or acid-catalyzed or cationically polymerizable liquids with a base as the inhibitor. Some specific polymerizable liquids will of course cure more rapidly or efficiently than others and hence be more amenable to higher speeds, though this may be offset at least in part by further increasing light intensity.

At higher light intensities and speeds, the "dead zone" may become thinner as inhibitor is consumed. If the dead zone is lost then the process will be disrupted. In such case, the supply of inhibitor may be enhanced by any suitable means, including providing an enriched and/or pressurized atmosphere of inhibitor, a more porous semipermeable member, a stronger or more powerful inhibitor (particularly where a base is employed), etc.

In general, lower viscosity polymerizable liquids are more amenable to higher speeds, particularly for fabrication of articles with a large and/or dense cross section (although this can be offset at least in part by increasing light intensity). Polymerizable liquids with viscosities in the range of 50 or 100 centipoise, up to 600, 800 or 1000 centipoise or more (as measured at room temperature and atmospheric pressure with a suitable device such as a HYDRAMOTION REACTAVISC™ Viscometer (available from Hydramotion Ltd, 1 York Road Business Park, Malton, York YO17 6YA England). In some embodiments, where necessary, the viscosity of the polymerizable liquid can advantageously be reduced by heating the polymerizable liquid, as described above.

In some embodiments, such as fabrication of articles with a large and/or dense cross-section, speed of fabrication can be enhanced by introducing reciprocation to "pump" the polymerizable liquid, as described above, and/or the use of feeding the polymerizable liquid through the carrier, as also described above, and/or heating and/or pressurizing the polymerizable liquid, as also described above.

7. Tiling.

It may be desirable to use more than one light engine to preserve resolution and light intensity for larger build sizes. Each light engine may be configured to project an image (e.g., an array of pixels) into the build region such that a plurality of "tiled" images are projected into the build region. As used herein, the term "light engine" can mean an assembly including a light source, a DLP device such as a digital micromirror device and/or an optical device such as an objective lens. The "light engine" may also include electronics such as a controller that is operatively associated with one or more of the other components.

Figure 17A:
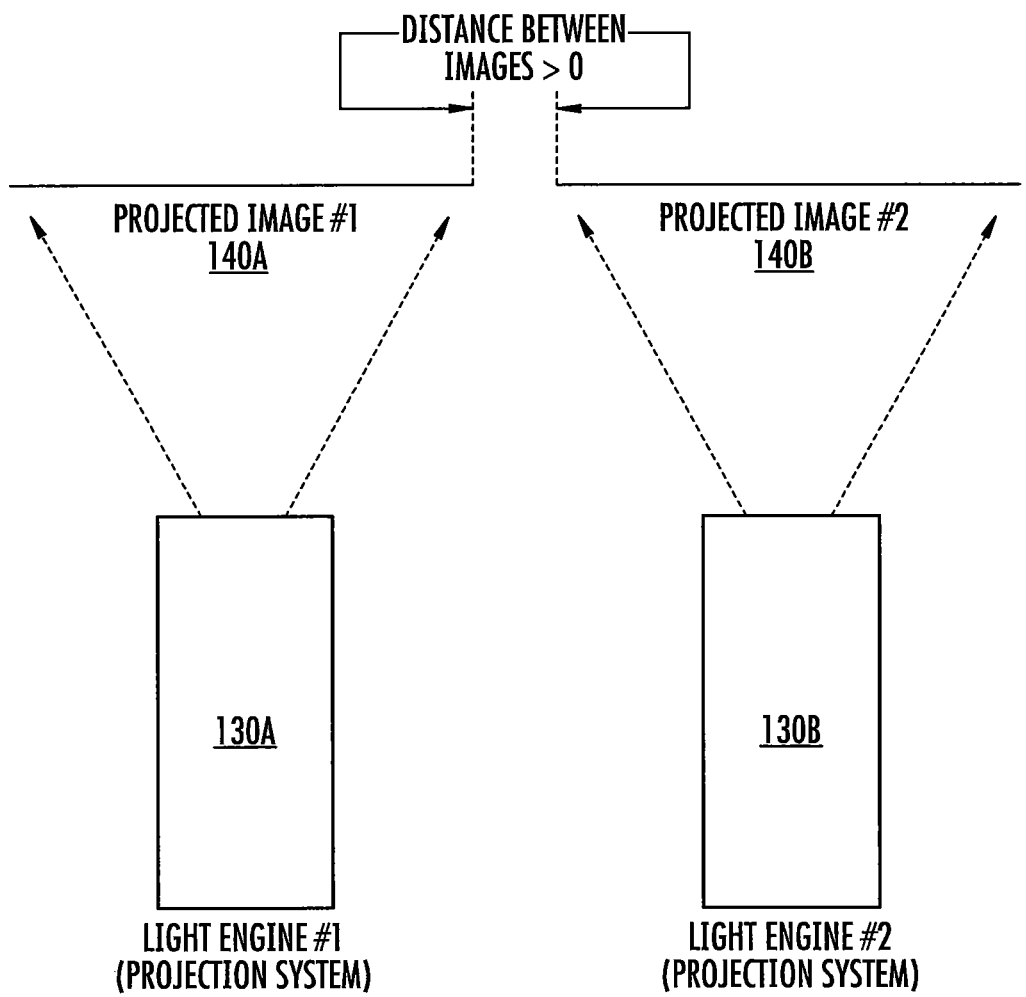
FIGS. 17A-17C are schematic diagrams illustrating tiled images.
Figure 17B:
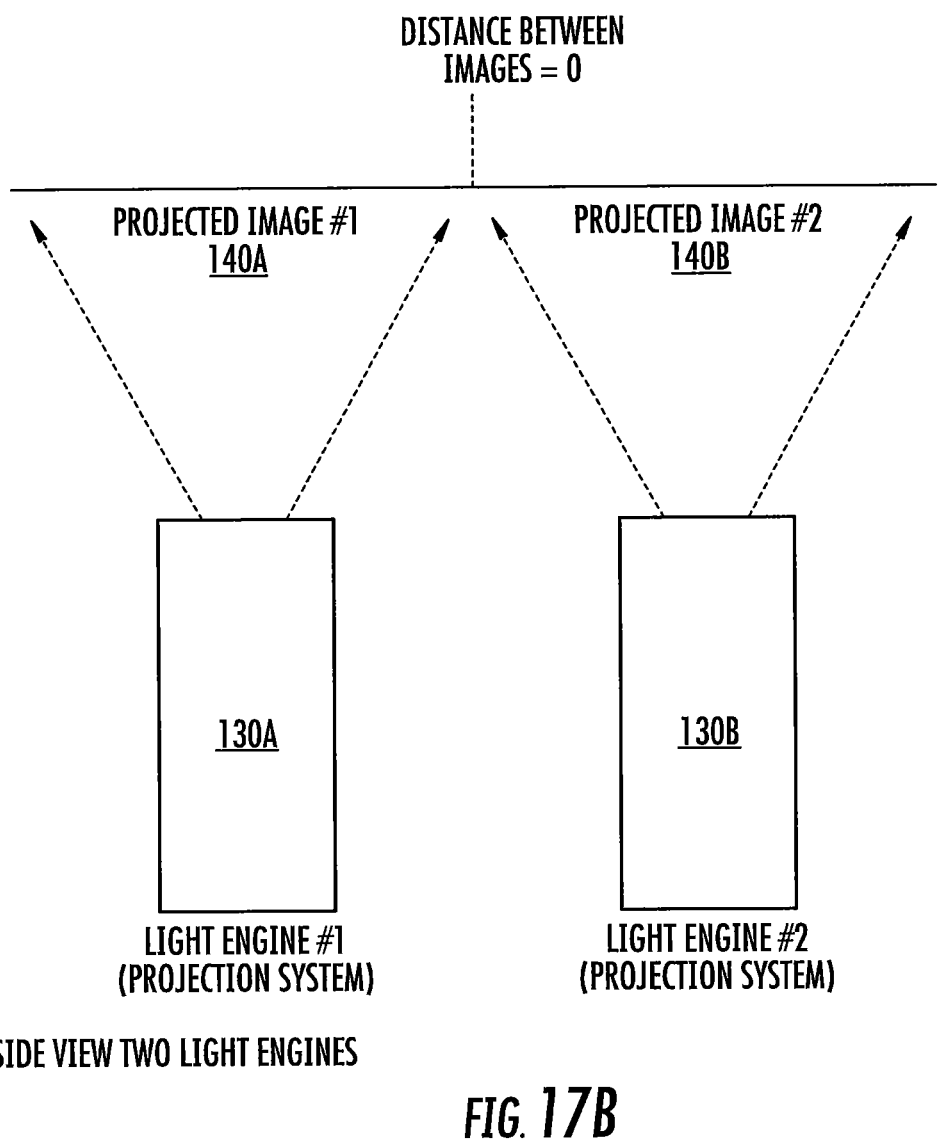
Figure 17C:
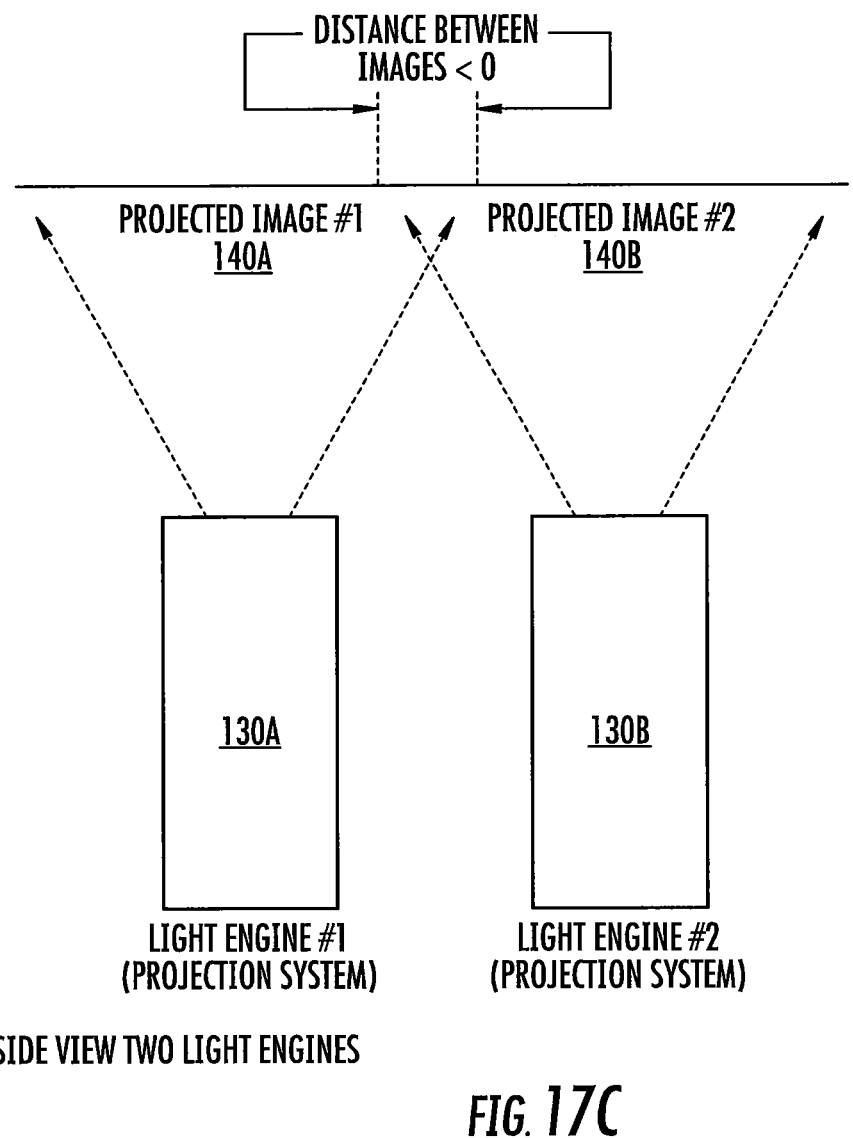

This is shown schematically in FIGS. 17A-17C. The light engine assemblies 130A, 130B produce adjacent or "tiled" images 140A, 140B. In FIG. 17A, the images are slightly misaligned; that is, there is a gap between them. In FIG. 17B, the images are aligned; there is no gap and no overlap between them. In FIG. 17C, there is a slight overlap of the images 140A and 140B.

In some embodiments, the configuration with the overlapped images shown in FIG. 17C is employed with some form of "blending" or "smoothing" of the overlapped regions as generally discussed in, for example, U.S. Pat. Nos. 7,292,207, 8,102,332, 8,427,391, 8,446,431 and U.S. Patent Application Publication Nos. 2013/0269882, 2013/0278840 and 2013/0321475, the disclosures of which are incorporated herein in their entireties.

The tiled images can allow for larger build areas without sacrificing light intensity, and therefore can facilitate faster build speeds for larger objects. It will be understood that more than two light engine assemblies (and corresponding tiled images) may be employed. Various embodiments of the invention employ at least 4, 8, 16, 32, 64, 128 or more tiled images.

8. Fabrication in Multiple Zones.

As noted above, embodiments of the invention may carry out the formation of the three-dimensional object through multiple zones or segments of operation. Such a method generally comprises:

(a) providing a carrier and an optically transparent member having a build surface, the carrier and the build surface defining a build region therebetween, with the carrier positioned adjacent and spaced apart from the build surface at a start position; then
  (b) forming an adhesion segment of the three-dimensional object by:
    (i) filling the build region with a polymerizable liquid,
    (ii) irradiating the build region with light through the optically transparent member (e.g., by a single exposure), while
    (iii) maintaining the carrier stationary or advancing the carrier away from the build surface at a first cumulative rate of advance, to thereby form from the polymerizable liquid a solid polymer adhesion segment of the object adhered to the carrier; then
  (c) optionally but preferably forming a transition segment of the three dimensional object by
    (i) filling the build region with a polymerizable liquid,
    (ii) continuously or intermittently irradiating the build region with light through the optically transparent member, and
    (iii) continuously or intermittently advancing (e.g., sequentially or concurrently with the irradiating step) the carrier away from the build surface at a second cumulative rate of advance to thereby form from the polymerizable liquid a transition segment of the object between the adhesion segment and the build surface;
    wherein the second cumulative rate of advance is greater than the first cumulative rate of advance; and then
  (d) forming a body segment of the three dimensional object by:
    (i) filling the build region with a polymerizable liquid,
    (ii) continuously or intermittently irradiating the build region with light through the optically transparent, and
    (iii) continuously or intermittently advancing (e.g., sequentially or concurrently with the irradiating step) the carrier away from the build surface at a third cumulative rate of advance, to thereby form from the polymerizable liquid a body segment of the object between the transition segment and the build surface;
    wherein the third cumulative rate of advance is greater than the first and/or the second cumulative rate of advance.

Note that the start position can be any position among a range of positions (e.g., a range of up to 5 or 10 millimeters or more), and the irradiating step (b)(ii) is carried out at an intensity sufficient to adhere the solid polymer to the carrier when the carrier is at any position within that range of positions. This advantageously reduces the possibility of failure of adhesion of the three-dimensional object to the carrier due to variations in uniformity of the carrier and/or build surfaces, variations inherent in drive systems in positioning the carrier adjacent the build surface, etc.

9. Fabrication with Intermittent (or Strobe") Illumination.

As noted above, in some embodiments the invention may be carried out with the illumination in intermittent periods or burst. In one embodiment, such a method comprises:
  providing a carrier and an optically transparent member having a build surface, the carrier and the build surface defining a build region therebetween;
  filling the build region with a polymerizable liquid,
  intermittently irradiating the build region with light through the optically transparent member to form a solid polymer from the polymerizable liquid,
  continuously advancing the carrier away from the build surface to form the three-dimensional object from the solid polymer.

Another embodiment of such a mode of operation comprises:
  providing a carrier and an optically transparent member having a build surface, the carrier and the build surface defining a build region therebetween;
  filling the build region with a polymerizable liquid,
  intermittently irradiating the build region with light through the optically transparent member to form a solid polymer from the polymerizable liquid,
  continuously or intermittently advancing (e.g., sequentially or concurrently with the irradiating step) the carrier away from the build surface to form the three-dimensional object from the solid polymer.

In some embodiments, the intermittently irradiating comprises alternating periods of active and inactive illumination, where the average duration of the periods of active illumination is less than the average duration of the periods of inactive illumination (e.g., is not more than 50, 60, or 80 percent thereof).

In other embodiments, the intermittently irradiating comprises alternating periods of active and inactive illumination, where the average duration of the periods of active illumination is the same as or greater than the average duration of the periods of inactive illumination (e.g., is at least 100, 120, 160, or 180 percent thereof).

Examples of such modes of operation are given further below. These features may be combined with any of the other features and operating steps or parameters described herein.

10. Fabrication Products.

Three-dimensional products produced by the methods and processes of the present invention may be final, finished or substantially finished products, or may be intermediate products subject to further manufacturing steps such as surface treatment, laser cutting, electric discharge machining, etc., is intended. Intermediate products include products for which further additive manufacturing, in the same or a different apparatus, may be carried out). For example, a fault or cleavage line may be introduced deliberately into an ongoing "build" by disrupting, and then reinstating, the gradient of polymerization zone, to terminate one region of the finished product, or simply because a particular region of the finished product or "build" is less fragile than others.

Numerous different products can be made by the methods and apparatus of the present invention, including both large-scale models or prototypes, small custom products, miniature or microminiature products or devices, etc. Examples include, but are not limited to, medical devices and implantable medical devices such as stents, drug delivery depots, functional structures, microneedle arrays, fibers and rods such as waveguides, micromechanical devices, microfluidic devices, etc.

Thus in some embodiments the product can have a height of from 0.1 or 1 millimeters up to 10 or 100 millimeters, or more, and/or a maximum width of from 0.1 or 1 millimeters up to 10 or 100 millimeters, or more. In other embodiments, the product can have a height of from 10 or 100 nanometers up to 10 or 100 microns, or more, and/or a maximum width of from 10 or 100 nanometers up to 10 or 100 microns, or more. These are examples only: Maximum size and width depends on the architecture of the particular device and the resolution of the light source and can be adjusted depending upon the particular goal of the embodiment or article being fabricated.

In some embodiments, the ratio of height to width of the product is at least 2:1, 10:1, 50:1, or 100:1, or more, or a width to height ratio of 1:1, 10:1, 50:1, or 100:1, or more.

In some embodiments, the product has at least one, or a plurality of, pores or channels formed therein, as discussed further below.

The processes described herein can produce products with a variety of different properties. Hence in some embodiments the products are rigid; in other embodiments the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single polymerizable liquid); in some embodiments, the products are composites (that is, formed of two or more different polymerizable liquids). Particular properties will be determined by factors such as the choice of polymerizable liquid(s) employed.

In some embodiments, the product or article made has at least one overhanging feature (or "overhang"), such as a bridging element between two supporting bodies, or a cantilevered element projecting from one substantially vertical support body. Because of the unidirectional, continuous nature of some embodiments of the present processes, the problem of fault or cleavage lines that form between layers when each layer is polymerized to substantial completion and a substantial time interval occurs before the next pattern is exposed, is substantially reduced. Hence, in some embodiments the methods are particularly advantageous in reducing, or eliminating, the number of support structures for such overhangs that are fabricated concurrently with the article.

11. Build Plates with Supporting Members

In some embodiments, build plates (such as the build plate 15 in FIG. 2) include an optically transparent member having a polymeric portion that is optically transparent at the relevant wavelengths (e.g., UV transparent or transparent in the visible range, depending on the radiation source and polymerizable fluid) and a support enhancing portion. The support enhancing portion may be formed of a material that is stiffer or stronger than the optically transparent member, e.g., with a Young's modulus that is greater than a Young's modulus of the polymeric portion, such as a Young's modulus that is at least 2, 10, 20, 30, 40, 50, 60, 70, 80, 90 or 100 times the Young's modulus of the transparent member. The support enhancing portion may facilitate the formation of larger build plates, such as build plates having a build surface with an area of at least 0.01, 0.05, 0.1, 0.5, 1 or 5 square meters or more, while, in some embodiments, maintaining a relatively thin and/or gas permeable build region. In some embodiments, the build plate may be mechanically rigid and/or generally planar (flat), oxygen permeable, resistant to fouling, cleanable, user replaceable and its oxygen permeability, resistance to fouling, and its optically transparent characteristics generally remain stable over time. The support enhancing portion of the build plate may extend over all of or a portion of one or both longitudinal sides of the build plate.

Figure 30:
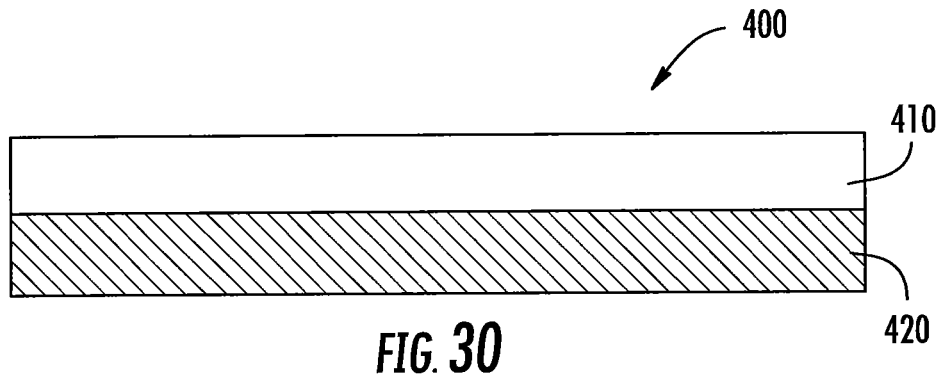
FIGS. 30-36 are schematic cross-sectional views of build plates having strengthening members according to some embodiments.
Figure 31:
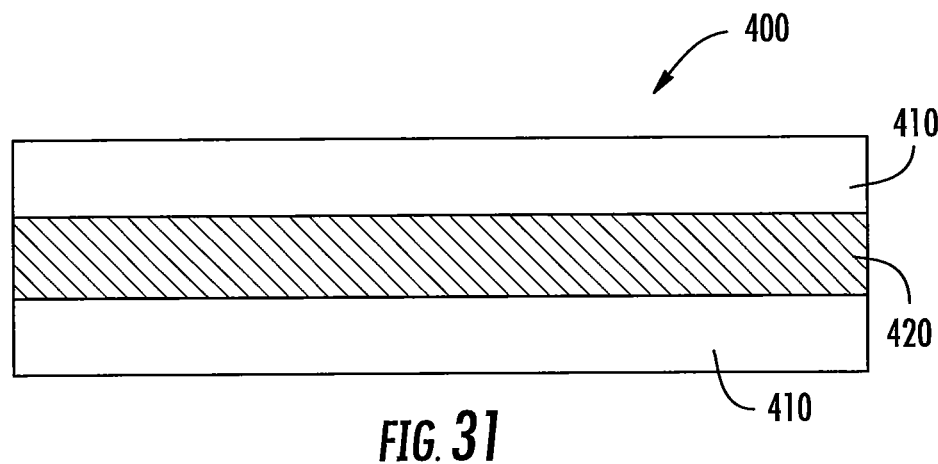
Figure 32:
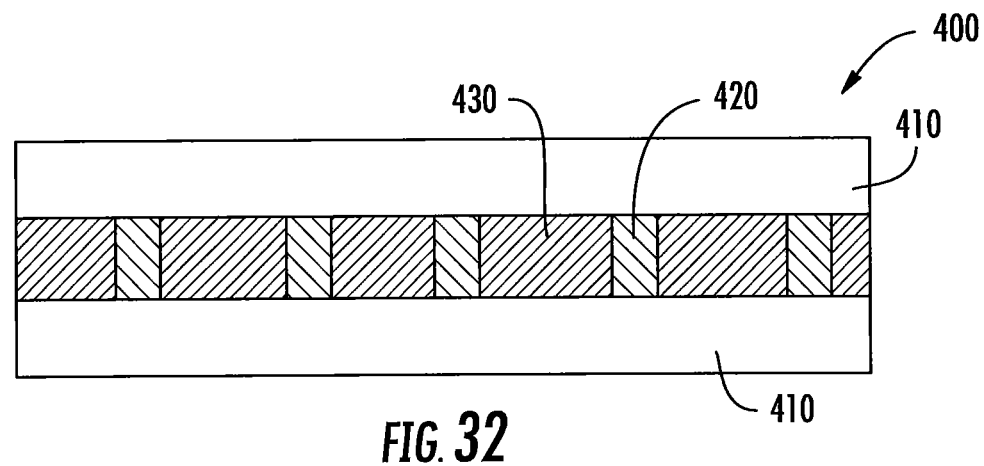

For example, as illustrated in FIG. 30, a build plate 400 includes a generally planer polymer layer 410, which may be bonded to a stiffener or support enhancing member 420, such as porous glass, quartz or UV-transparent polymers ((e.g., Cyclic-olefin copolymer, such as Topas® cyclic-olefin copolymer (Topas Advanced Polymers, Inc. Florence, Ky., USA)) that are stiffer than the polymer layer. As shown in FIG. 31, the support enhancing member 420 may be sandwiched between two layers of the polymer 410, for example, to enhance the environmental resistance of the build plate 400. As shown in FIG. 32, the support enhancing member 420 may be a layer having apertures therein (e.g., macro-scale apertures, e.g., greater than 1 mm) to increase gas permeability. A fluid 430 is optionally added to fill the aperture, e.g., to improve optical transmissions through the build plate 400, and the fluid 430 may have an index of refraction that is index-matched to the polymer 410. "Index matched" is used herein to describe materials (generally optically transparent materials abutting one another at an interface) having indices of refraction that are sufficiently close to one another so that light is transmitted through, rather than reflected at, an interface between the materials. Preferably, the materials have indices of refraction within between 5, 10 to 20 or 30 percent of one another, where each index of refraction is measured with light at the wavelength of the light source of the apparatus, at room temperature and atmospheric pressure. Accordingly, optical distortion may be reduced or eliminated. Optically transparent, oxygen-carrying fluid, oil (including immersion oils), oxygen-carrying perfluorochemicals, oxygen-carrying perfluoro-oils, perfluoropolyether, silicon oil, water, or a slurry of optically transparent particles in an optically transparent fluid, such as silica dispersed in silicon oil may be used to maintain or increase gas permeability and maintain or improve optical transmissions. In this configuration, permeability may be permitted by the apertures in the support enhancing member 420, and the need for a support enhancing member 420 that is gas permeable may be reduced such that impermeable materials may be used for the support enhancing member 420.

Figure 33:
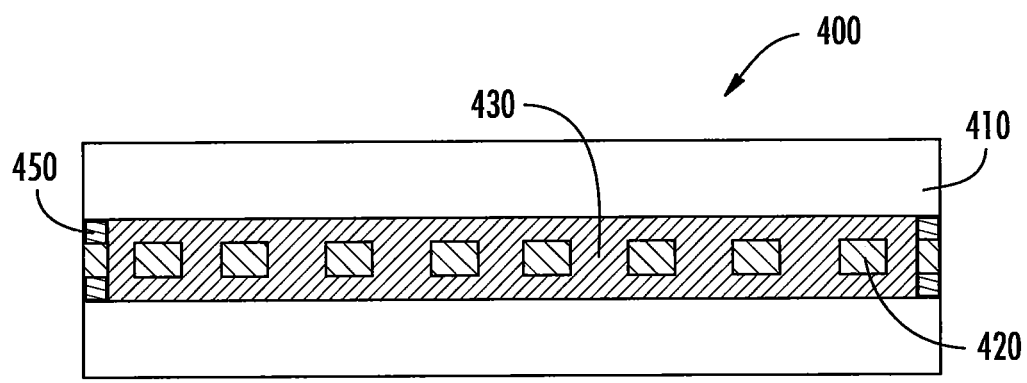
Figure 34:
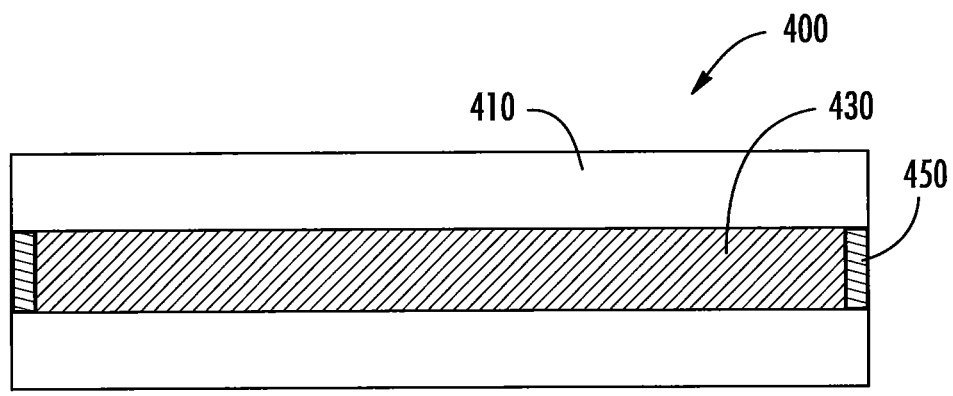
Figure 35:
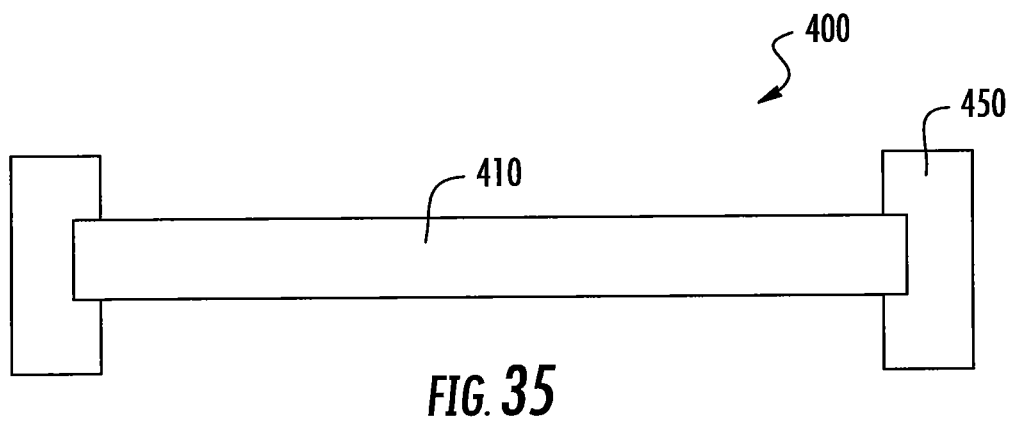
Figure 36:
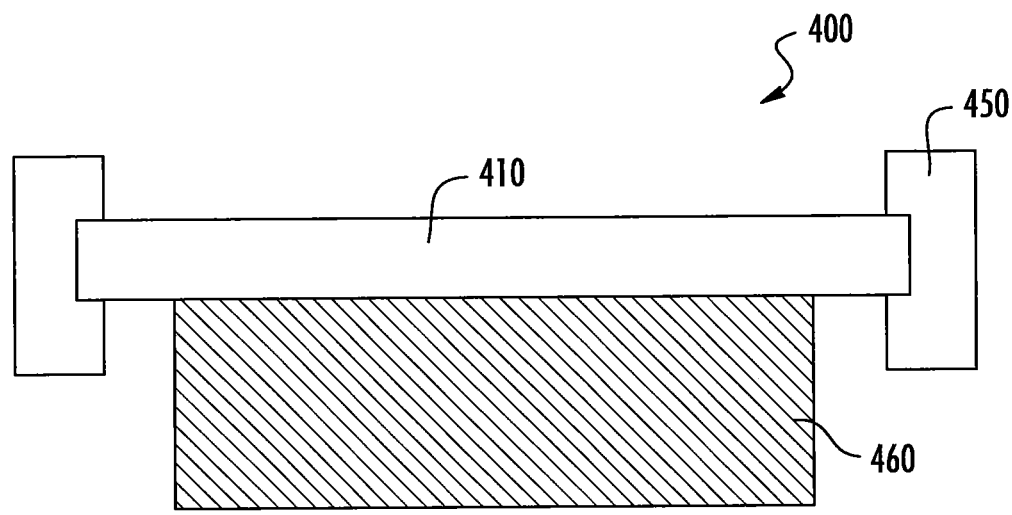

As shown in FIG. 33, the support enhancing member 420 may be held in position by an opaque subframe 450 and the thickness of the support enhancing member 420 may be reduced so that the requirements for a gas permeable support enhancing member may be further reduced, and even impermeable materials may be used for portions of the support enhancing member 420. The permeable fluid 430 may fill void regions around the support enhancing member 420 and the subframe 450. In particular embodiments, the thickness of the support enhancing member 420 is variable (non-uniform). As shown in FIG. 34, two layers of the polymer 410 may be separated by a fluid 430, and the support enhancing member 420 may be provided by a rigid, optionally opaque frame 450, such that the fluid extends substantially across the build region. The fluid 430 of FIGS. 32-34 may be optically transparent, gas permeable and/or refraction index-matched to the polymer 410. In some embodiments, the various additional fluids may be applied to the support enhancing member 420, such as an index-matched fluid to improve optical clarity and/or a gas-permeable fluid to inhibit fouling. The fluid may be an optically transparent fluid such as an oil (including immersion oils), oxygen-carrying perfluorochemicals, oxygen-carrying perfluoro-oils, perfluoropolyether, silicon oil, water, or a slurry of optically transparent particles in an optically transparent fluid, such as silica dispersed in silicon oil. As shown in FIG. 35, a support enhancing member may be provided by a rigid and optionally opaque frame 450 that supports the polymer 410. In some embodiments, the frame 450 may contact and support the edge portion of the polymer 410 and stretch the polymer radially outward so that the polymer 410 is taut.

As illustrated in FIG. 31, an optically transparent support 460 is provided in a center region of the polymer 410. The optically transparent support need not be hermetically sealed to the transparent, rigid support 460. The optically transparent support 460 may be separated from or portions of the support 460 may be separated from the optically transparent member by a small gap (e.g., a millimeter or smaller sized gap). In this configuration, the support 460 provides mechanical stability to the polymer 410 without necessarily inhibiting the gas permeability of the polymer 410. Any suitable polymer may be used for the polymer 410 as described herein.

12. Laminated and Patterned Build Plates

In some embodiments, build plates (such as the build plate 15 in FIG. 2) may be formed by laminating a solvent between a polymeric sheet and a substrate to thereby form the polymeric sheet with the substrate and/or decrease a roughness of at least one surface of the polymeric sheet. The build plate is provided by the polymeric sheet after optionally removing the substrate or the build plate is provided by the polymeric sheet and the substrate.

Many amorphous fluoropolymers, which may be used as the polymeric sheet, have only limited solubility (1-3%), even in highly fluorinated solvents. As such, these materials are frequently melt-extruded to form the resin into shapes, such as films, rods, and windows. Melt extrusion, especially on thin films can result in unwanted surface roughness. Teflon® AF 2400 is an example of a material with very desirable qualities, but only modest solubility and therefore is generally melt extruded.

Figure 37:
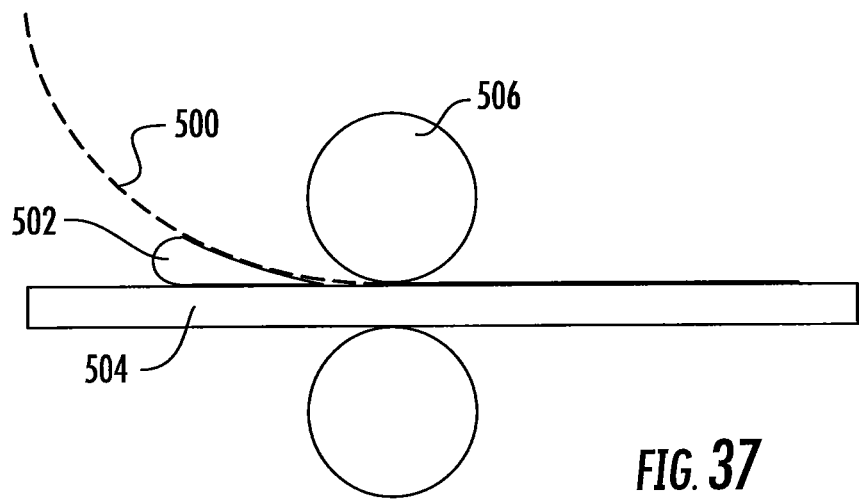
FIGS. 37-38 are schematic diagrams of a lamination method to form a build plate according to some embodiments.

As illustrated in FIG. 37, a method of reducing or eliminating surface roughness from an already extruded film 500 is to laminate a solvent 502 in between the melt extruded film 500 and a very smooth surface of a substrate 504, such as a glass or acrylic plate using rollers 506 or other lamination techniques. Because of the low solubility of the film 500, the solvent 502 can soften the surface of the film 500, which allows it to "mold" against the smooth surface of the substrate 504. The film 500 prior to lamination may have a surface roughness that is greater than that of the substrate 504, which may result in increased optical distortion. The film 500 may then be dried at temperatures greater than ambient temperature and/or a decreased pressure (e.g., less than atmospheric pressure) to substantially remove the solvent 502. The temperature and/or pressure used to remove the solvent may depend on the thickness of the film 500, the amount of solvent used, and the area of the film 500. Upon peeling the film 500 from the substrate 504, a surface that is smoother than the initial surface may be obtained. The polymer film 500 may then be used as a build plate as described herein. In addition, this method may be used to recover a damaged build plate after scratching or other mechanical damage, for example, as illustrated in FIG. 37. The polymer film 500 after lamination may have a higher optical grade, such as less than 15 nm surface roughness (RA).

Figure 38:
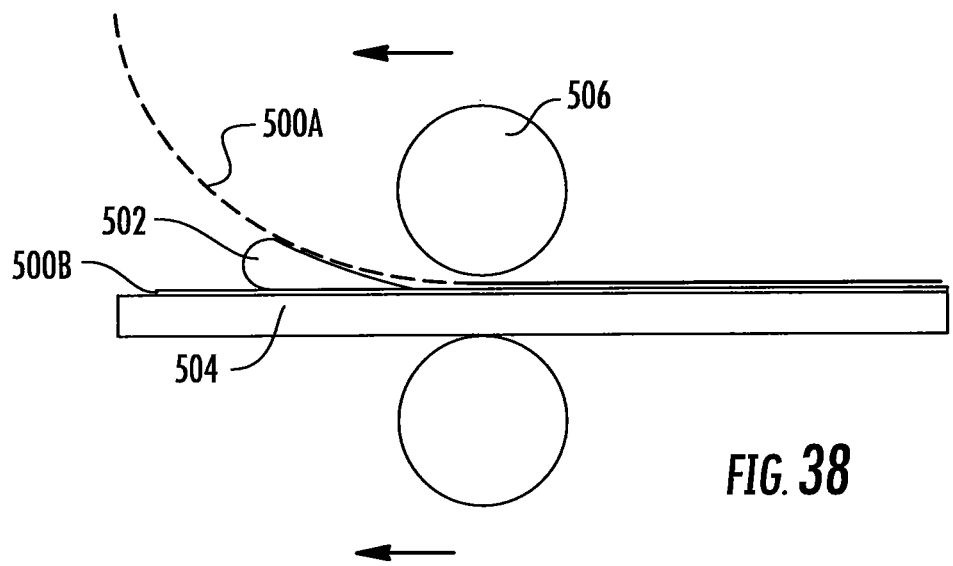

As illustrated in FIG. 38, two or more polymeric films 500A, 500B may be bonded together using a solvent 502 to laminate the films 500A, 500B to the substrate 504, such as a glass plate. Accordingly, a thickness of the resulting multi-ply film may be increased. This process may be repeated, even in a continuous manner, to generate a build plate or window of a desired thickness. Moreover, different types of materials may be laminated together, e.g., using a common solvent. For example, a melt-extruded film of Teflon® AF 1600 may be adhered to a melt-extruded film of Teflon® AF 2400. Materials with different properties may be used to form a multi-ply composite laminate useful for some applications. Any suitable solvent may be used to partially solubilize a sufficient portion of the polymer sheet to reduce or eliminate surface roughness and/or to bond polymer sheets to one another, including fluorocarbons and perfluorocarbons (e.g., Florinert® 770, Flutec® Galden® and Vertrel®).

Figure 39:
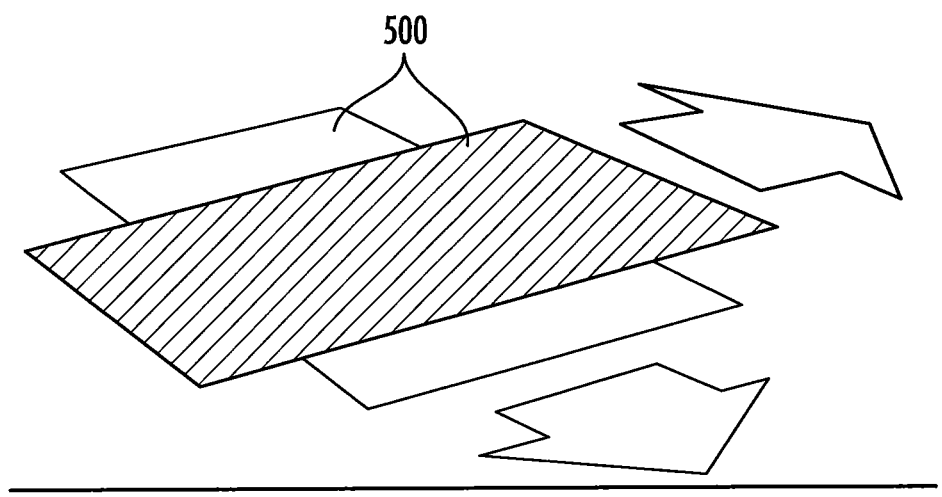
FIG. 39 is a schematic diagram illustrating alternating orientations during lamination to form build plates according to some embodiments.

In some embodiments as illustrated in FIG. 39, the polymeric films 500 have an orientation as a result of the extrusion direction used during formation, and the films 500 may be bonded to one another in such a way that the extrusion direction of each layer is not aligned with the extrusion direction of adjacent layers. For example, as illustrated in FIG. 39, the extrusion directions may be perpendicular to one another.

Figure 40:
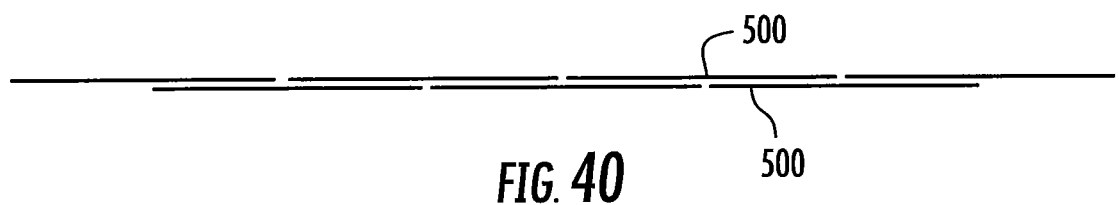
FIG. 40 is a schematic diagram illustrating staggered, bonded films to form build plates according to some embodiments.

In some embodiments as illustrated in FIG. 40, laminated, solvent-bonded films 500 may be positioned in a staggered configuration such that edge portions of different polymeric sheet films 500 are not aligned with one another. The multi-ply and/or staggered configurations shown in FIGS. 39 and 40 may result in improved mechanical properties, such as increased strength and/or stiffness and may facilitate the construction of larger build plates. In some embodiments, a thickness of the film or build plate is between about 200 microns and about 3 centimeters. If the substrate 504 is removed as discussed above and does not form part of the build plate, then the substrate 504 may be formed of a non-transparent, impermeable material, although transparent, permeable materials may also be used.

As illustrated in FIGS. 41A-41C, in some embodiments, a substrate 550 may be bonded to a polymeric film 560, and the substrate 550 together with the polymeric film 560 may be used to form a build plate (i.e., the substrate 550 is not removed from the polymeric film 560 in use). When the substrate 550 forms part of the build plate, the substrate 550 is optically transparent. The substrate 550 may also be permeable. For example, the substrate 550 may include a porous material (e.g., porous glass) and may be mechanically interlocked together with the polymer sheet(s) 560. As shown in FIG. 41A, a polymeric film 560 is laminated to a porous glass substrate 550 to provide a mechanically interlocked composite as shown in FIG. 41B. Although the substrate 550 is illustrated as a porous glass substrate, it should be understood that other substrates may be used, such as porous polymers, quartz and/or optically transparent polymers. In some embodiments, the substrate 550 may include fused hollow capillaries, such as "capillary array plates." Such plates may be formed using a variety of materials, including polymers and glass, and are available, e.g., from Paradigm Optics, Inc. (Vancouver, Wash., USA) and Collimated Holes, Inc. (Campbell, Calif., USA). The substrate 550 may optionally be filled with an optically transparent, oxygen-carrying fluid, including oil (including immersion oils), oxygen-carrying perfluorochemicals, oxygen-carrying perfluoro-oils, perfluoropolyether, silicon oil, water, or a slurry of optically transparent particles in an optically transparent fluid, such as silica dispersed in silicon oil, to facilitate optical transmission through the resulting build plate as shown in FIG. 41C. The filling fluid may be optically index-matched with the material(s) of the substrate 550.

Figure 43A:
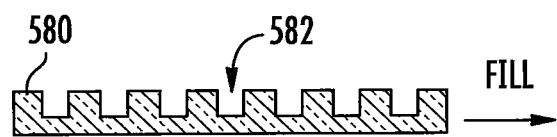
FIGS. 43A-43B are schematic diagrams illustrating a filled patterned build plate according to some embodiments.
Figure 43B:
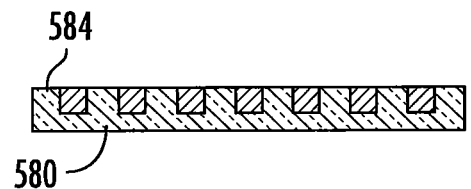

In some embodiments, a patterned substrate may be used as the build plate or surface. Patterned substrates may be formed using any suitable method. For example, as illustrated in FIGS. 42A-42C, a patterned wafer 570 may be used to laminate a solvent-softened build plate film 580 (FIGS. 42A and 42B). The polymeric sheet or film 580 is released from the patterned wafer 570 to form a three-dimensionally patterned build plate film 580 as shown in FIG. 42C. As shown in FIG. 43A-43B, the patterned substrate 580 includes at least one recess 582, and the at least one recess 582 is filled with an optically transparent liquid 584. The patterned substrate 580 may have recesses having dimensions of 0.5, 5.0, 10, 15, 50, 80 or 100 nanometers to 1, 10, 20, 50, 100, 500, 1000 microns. As used herein, the term "dimensions" refers to the height, width and/or length dimensions.

As illustrated in FIG. 42C, the patterned substrate 580 may be configured to repel a wetting of a resin 590 deposited thereon such that the resin 590 does not wet the patterned substrate 580 and does not fill a pattern of the patterned substrate 580. Without wishing to be bound by any particular theory, when the resin 590 is applied to such a patterned film 580 to form a three-dimensional object, the resin 590 may not wet into the pattern due to a Cassie-Baxter state. The patterned substrate 580 may provide increased gas flow to the build surface and/or resin during formation of a three-dimensional object. However, in some embodiments, the patterned substrate is configured to receive a resin deposited thereon such that the resin wets and fills a pattern of the patterned substrate.

Figure 44:
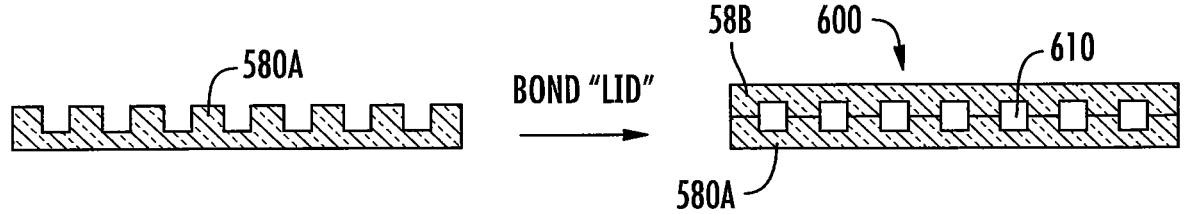
FIG. 44 is a schematic diagram illustrating a build plate with channels therein according to some embodiments.

As illustrated in FIG. 44, a build plate 600 having channels 610 therein may be formed. Although the channels 610 may be formed using any suitable technique, as shown in FIG. 44, a planar top or cover member 580B may be affixed to a patterned build plate film 580A (e.g., formed using a patterned substrate 580 as described in FIGS. 42A-42C). The channels 610 may have dimensions of about 0.5, 5.0, 10, 15, 50, 80 or 100 nanometers to 1, 10, 20, 50, 100, 500, 1000 microns. In some embodiments, the channels 610 may increase air/gas flow while providing a mechanically strong build plate/surface. Accordingly, build plates having an area of at least 0.01, 0.05, 0.1, 0.5, 1 or 5 square meters may be fabricated.

13. Alternate Methods and Apparatus.

While the present invention is preferably carried out by continuous liquid interphase polymerization, as described in detail above and in further detail below, in some embodiments alternate methods and apparatus for bottom-up three-dimension fabrication may be used, including layer-by-layer fabrication. Examples of such methods and apparatus include, but are not limited to, those described in U.S. Pat. No. 5,236,637 to Hull, U.S. Pat. No. 7,438,846 to John and U.S. Pat. No. 8,110,135 to El-Siblani, and in U.S. Patent Application Publication Nos. 2013/0292862 to Joyce and 2013/0295212 to Chen et al. The disclosures of these patents and applications are incorporated by reference herein in their entirety.

The present invention is explained in greater detail in the following non-limiting Examples, and features which may be incorporated in carrying out the present invention are further explained in PCT Applications Nos. PCT/US2014/015486 (also published as US 2015/0102532); PCT/US2014/015506 (also published as US 2015/0097315), PCT/US2014/015497 (also published as US 2015/0097316), and in J. Tumbleston, D. Shirvanyants, N. Ermoshkin et al., *Continuous liquid interface production of 3D Objects*, Sciencexpress (16 Mar. 2015).

Example 1

High Aspect Ratio Adjustable Tension Build Plate Assembly

Figure 6:
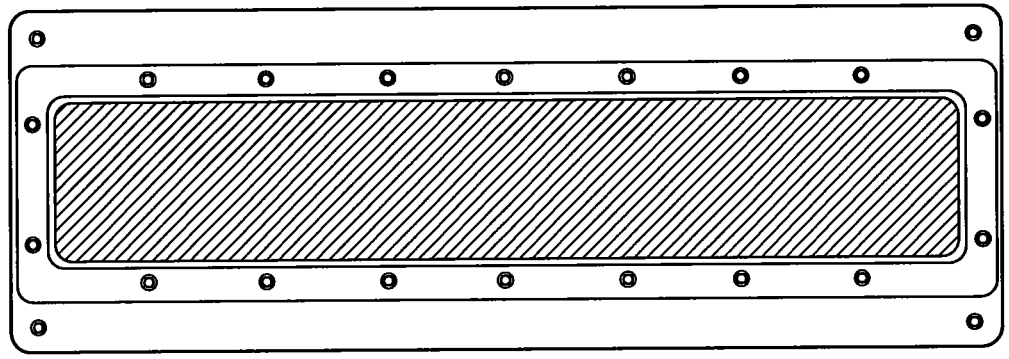
FIG. 6 is a top view of a 3 inch by 16 inch "high aspect" rectangular build plate (or "window") assembly of the present invention, where the film dimensions are 3.5 inch by 17 inch.
Figure 7:
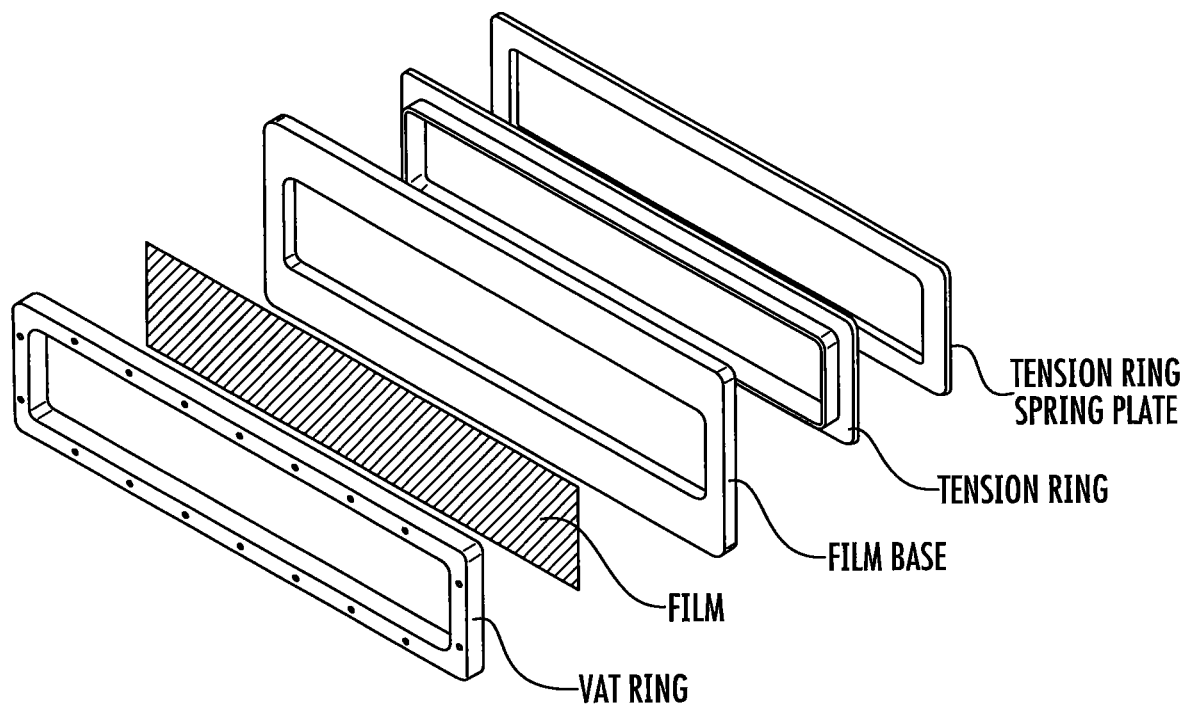
FIG. 7 is an exploded view of the build plate of FIG. 6, showing the tension ring and tension ring spring plate.

FIG. 6 is a top view and FIG. 7 is an exploded view of a 3 inch by 16 inch "high aspect" rectangular build plate (or "window") assembly of the present invention, where the film dimensions are 3.5 inches by 17 inches. The greater size of the film itself as compared to the internal diameter of vat ring and film base provides a peripheral or circumferential flange portion in the film that is clamped between the vat ring and the film base, as shown in side-sectional view in FIG. 8. One or more registration holes (not shown) may be provided in the polymer film in the peripheral or circumferential flange portion to aid in aligning the polymer film between the vat ring and film base, which are fastened to one another with a plurality of screws (not shown) extending from one to the other (some or all passing through holes in the peripheral edge of the polymer film) in a manner that rigidly and securely clamps the polymer film therebetween, while optionally allowing some flexibility to contribute to embodiments employing vertical reciprocation, as noted above.

Figure 8:
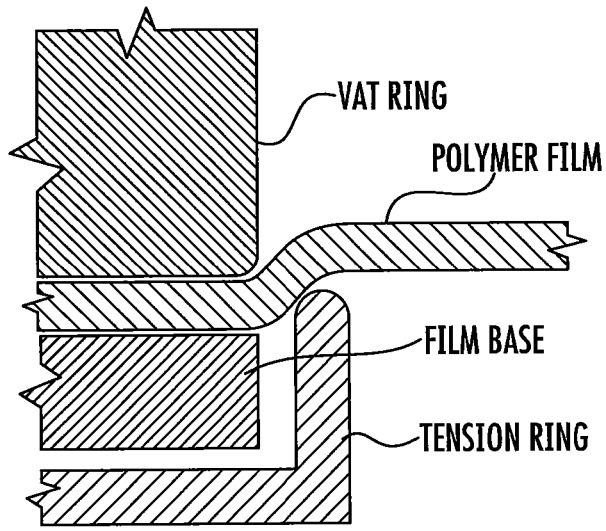
FIG. 8 is a side sectional view of the build plates of FIGS. 6-9, showing how the tension member tensions and fixes or rigidifies the polymer film.

As shown in FIGS. 7-8 a tension ring is provided that abuts the polymer film and stretches the film to fix or rigidify the film. The tension ring may be provided as a pre-set member, or may be an adjustable member. Adjustment may be achieved by providing a spring plate facing the tension ring, with one or more compressible elements such as polymer cushions or springs (e.g., flat springs, coil springs, wave springs etc.) therebetween, and with adjustable fasteners such as screw fasteners or the like passing from the spring plate through (or around) the tension ring to the film base.

Polymer films are preferably fluoropolymer films, such as an amorphous thermoplastic fluoropolymer, in a thickness of 0.01 or 0.05 millimeters to 0.1 or 1 millimeters, or more. In some embodiments we use Biogeneral Teflon AF 2400 polymer film, which is 0.0035 inches (0.09 millimeters) thick, and Random Technologies Teflon AF 2400 polymer film, which is 0.004 inches (0.1 millimeters) thick.

Tension on the film is preferably adjusted with the tension ring to about 10 to 100 pounds, depending on operating conditions such as fabrication speed.

The vat ring, film base, tension ring, and tension ring spring plate may be fabricated of any suitable, preferably rigid, material, including metals (e.g., stainless steel, aluminum and aluminum alloys), carbon fiber, polymers, and composites thereof.

Registration posts and corresponding sockets may be provided in any of the vat ring, film base, tension ring and/or spring plate, as desired.

Example 2

Round Adjustable Tension Round Build Plate Assembly

Figure 9:
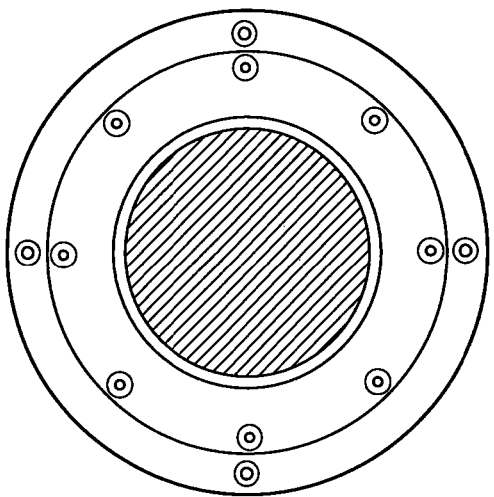
FIG. 9 is a top view of a 2.88 inch diameter round build plate of the invention, where the film dimension may be 4 inches in diameter.
Figure 10:
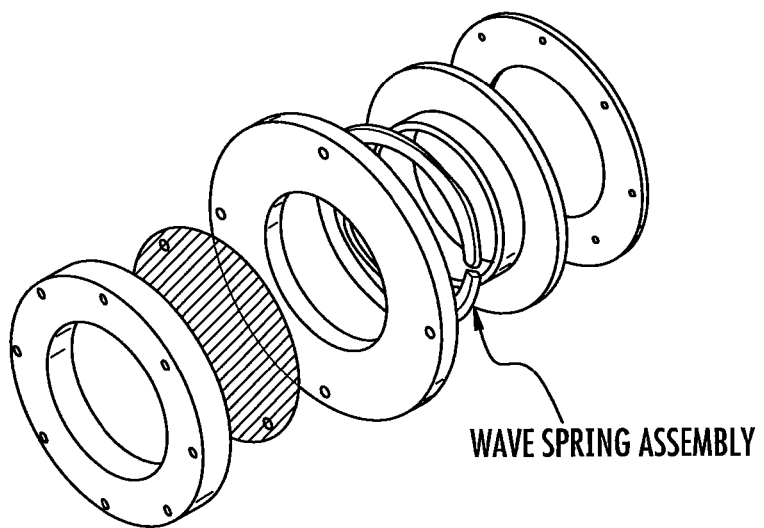
FIG. 10 is an exploded view of the build plate of FIG. 8.

FIG. 9 is a top view and FIG. 10 is an exploded view of a 2.88 inch diameter round build plate of the invention, where the film dimension may be 4 inches in diameter. Construction is in like manner to that given in Example 1 above, with a circumferential wave spring assembly shown in place. Tension on the film preferably adjusted to a like tension as given in Example 1 above (again depending on other operating conditions such as fabrication speed).

FIG. 10 is an exploded view of the build plate of FIG. 8.

Example 3

Additional Embodiments of Adjustable Build Plates

FIG. 11 shows various alternate embodiments of the build plates of FIGS. 7-10. Materials and tensions may be in like manner as described above.

Example 4

Example Embodiment of an Apparatus

Figure 12:
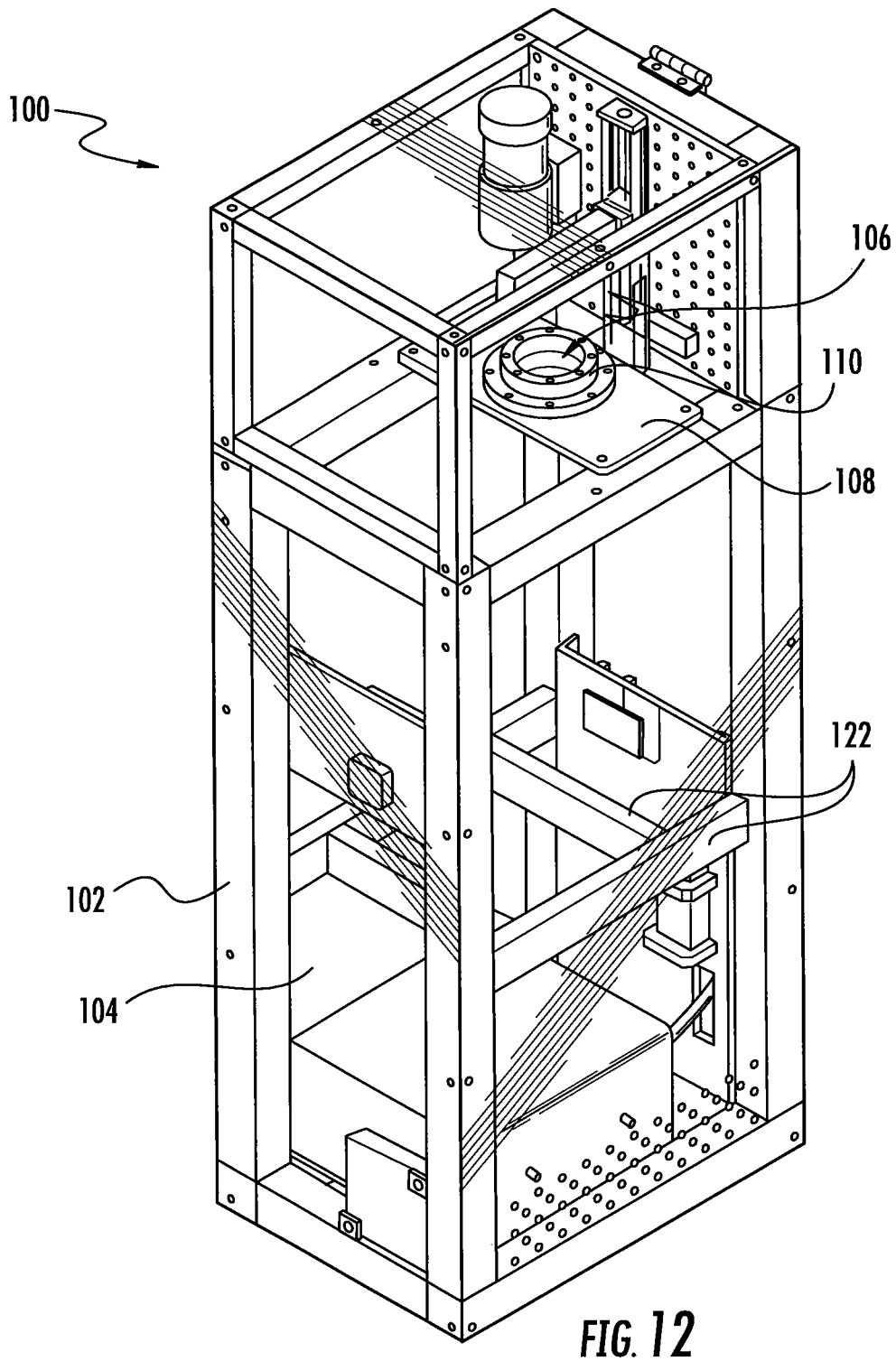
FIG. 12 is a front perspective view of an apparatus according to an exemplary embodiment of the invention.
Figure 13:
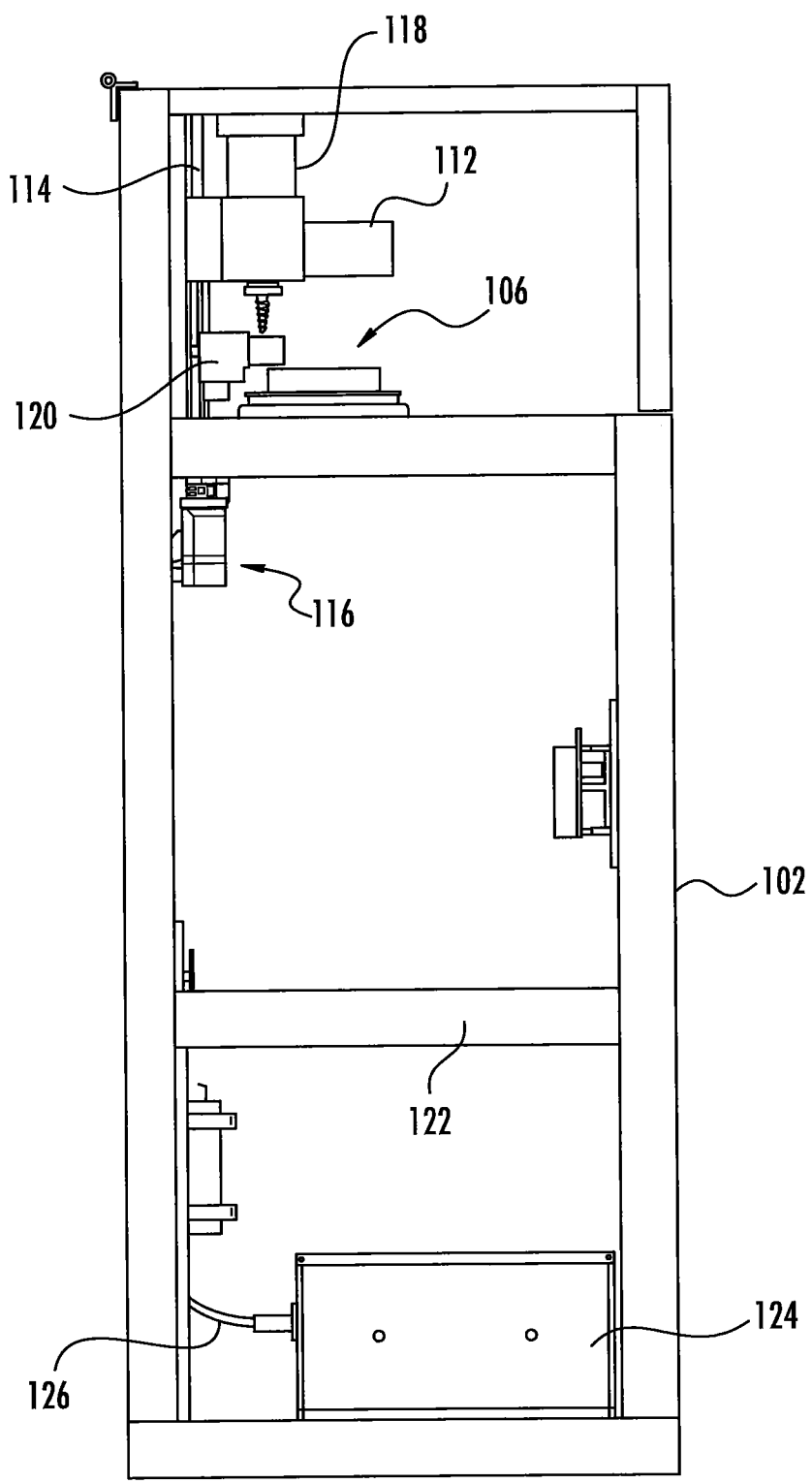
FIG. 13 is a side view of the apparatus of FIG. 12.
Figure 14:
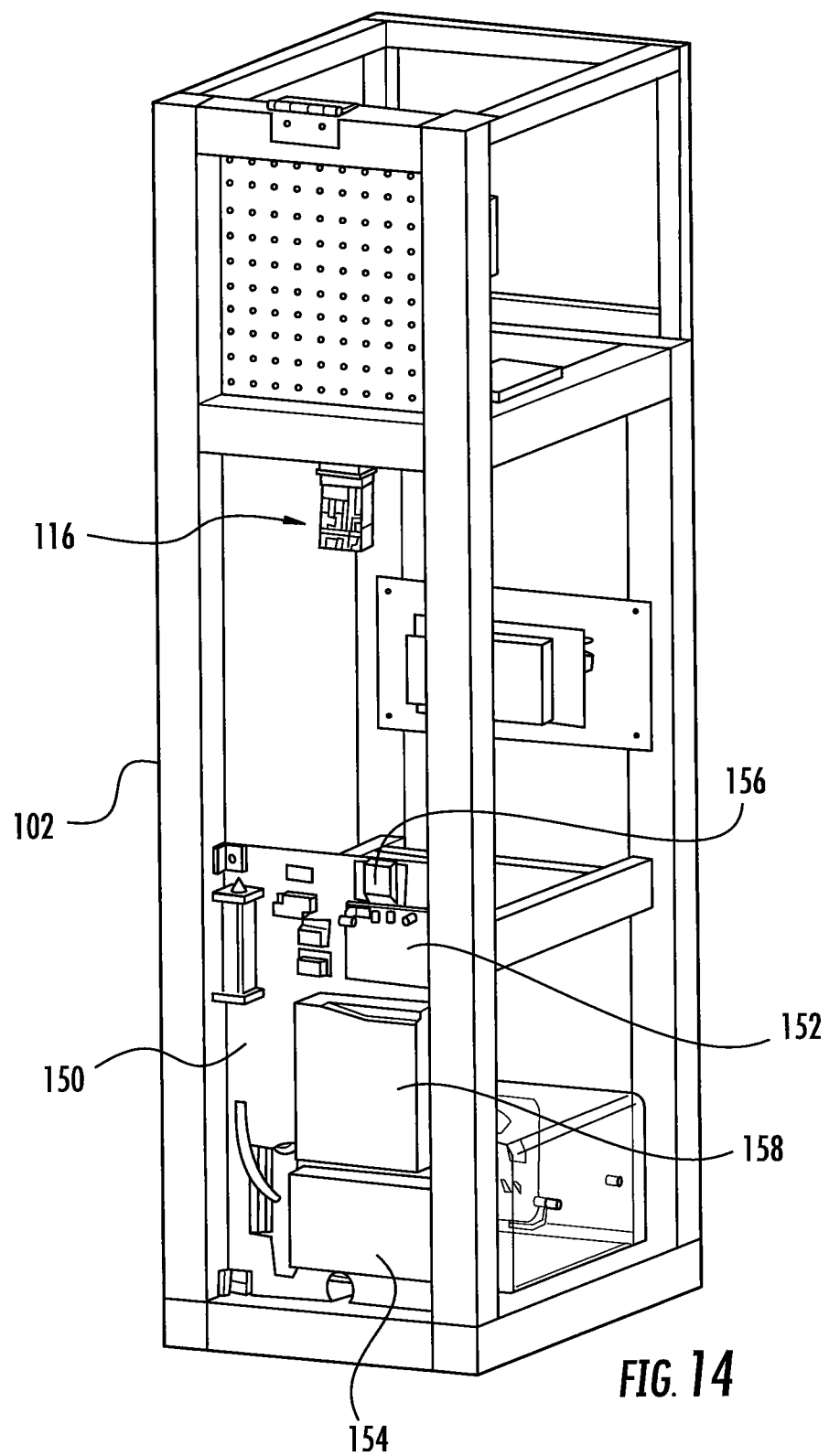
FIG. 14 is a rear perspective view of the apparatus of FIG. 12.

FIG. 12 is a front perspective view, FIG. 13 is a side view and FIG. 14 is a rear perspective view of an apparatus 100 according to an exemplary embodiment of the invention. The apparatus 100 includes a frame 102 and an enclosure 104. Much of the enclosure 104 is removed or shown transparent in FIGS. 12-14.

The apparatus 100 includes several of the same or similar components and features as the apparatus described above in reference to FIG. 2. Referring to FIG. 12, a build chamber 106 is provided on a base plate 108 that is connected to the frame 102. The build chamber 106 is defined by a wall or vat ring 110 and a build plate or "window" such as one of the windows described above in reference to FIGS. 2 and 6-11.

Turning to FIG. 13, a carrier 112 is driven in a vertical direction along a rail 114 by a motor 116. The motor may be any suitable type of motor, such as a servo motor. An exemplary suitable motor is the NXM45A motor available from Oriental Motor of Tokyo, Japan.

A liquid reservoir 118 is in fluid communication with the build chamber 106 to replenish the build chamber 106 with liquid resin. For example, tubing may run from the liquid reservoir 118 to the build chamber 106. A valve 120 controls the flow of liquid resin from the liquid reservoir 118 to the build chamber 106. An exemplary suitable valve is a pinch-style aluminum solenoid valve for tubing available from McMaster-Carr of Atlanta, Ga.

The frame 102 includes rails 122 or other some other mounting feature on which a light engine assembly 130 (FIG. 15) is held or mounted. A light source 124 is coupled to the light engine assembly 130 using a light guide entrance cable 126. The light source 124 may be any suitable light source such as a BlueWave® 200 system available from Dymax Corporation of Torrington, Conn.

Figure 15:
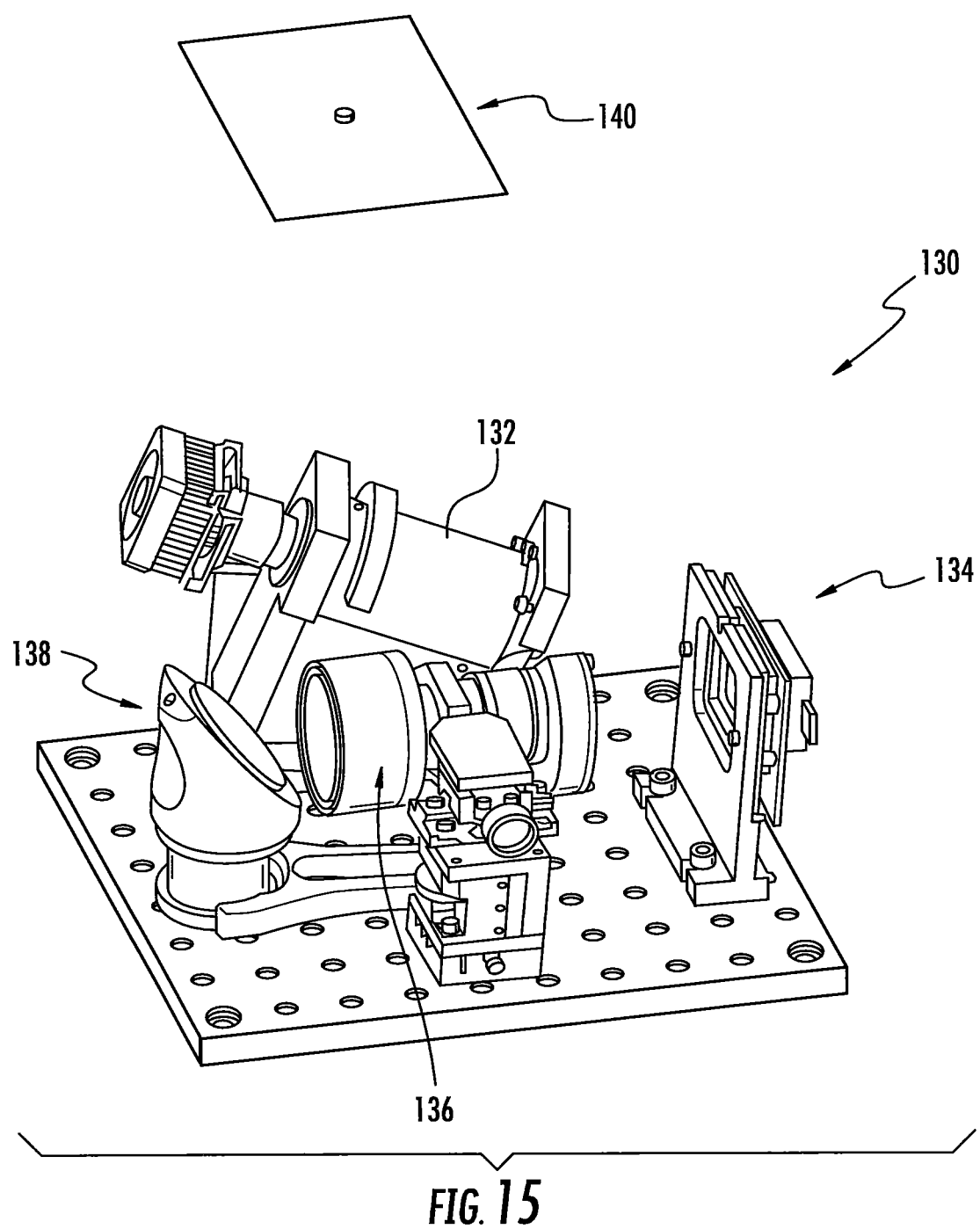
FIG. 15 is a perspective view of a light engine assembly used with the apparatus of FIG. 12.

Turning to FIG. 15, the light engine or light engine assembly 130 includes condenser lens assembly 132 and a digital light processing (DLP) system including a digital micromirror device (DMD) 134 and an optical or projection lens assembly 136 (which may include an objective lens). A suitable DLP system is the DLP Discovery™ 4100 system available from Texas Instruments, Inc. of Dallas, Tex. Light from the DLP system is reflected off a mirror 138 and illuminates the build chamber 106. Specifically, an "image" 140 is projected at the build surface or window.

Referring to FIG. 14, an electronic component plate or breadboard 150 is connected to the frame 102. A plurality of electrical or electronic components are mounted on the breadboard 150. A controller or processor 152 is operatively associated with various components such as the motor 116, the valve 120, the light source 124 and the light engine assembly 130 described above. A suitable controller is the Propeller Proto Board available from Parallax, Inc. of Rocklin, Calif.

Other electrical or electronic components operatively associated with the controller 152 include a power supply 154 and a motor driver 158 for controlling the motor 116. In some embodiments, an LED light source controlled by pulse width modulation (PWM) driver 156 is used instead of a mercury lamp (e.g., the Dymax light source described above).

A suitable power supply is a 24 Volt, 2.5 A, 60 W, switching power supply (e.g., part number PS1-60W-24 (HF60W-SL-24) available from Marlin P. Jones & Assoc, Inc. of Lake Park, Fla.). If an LED light source is used, a suitable LED driver is a 24 Volt, 1.4 A LED driver (e.g., part number 788-1041-ND available from Digi-Key of Thief River Falls, Minn.). A suitable motor driver is the NXD20-A motor driver available from Oriental Motor of Tokyo, Japan.

The apparatus of FIGS. 12-15 has been used to produce an "image size" of about 75 mm by 100 mm with light intensity of about 5 mW/cm$^2$. The apparatus of FIGS. 12-15 has been used to build objects at speeds of about 100 to 500 mm/hr. The build speed is dependent on light intensity and the geometry of the object.

Example 5

Another Example Embodiment of an Apparatus

Figure 16:
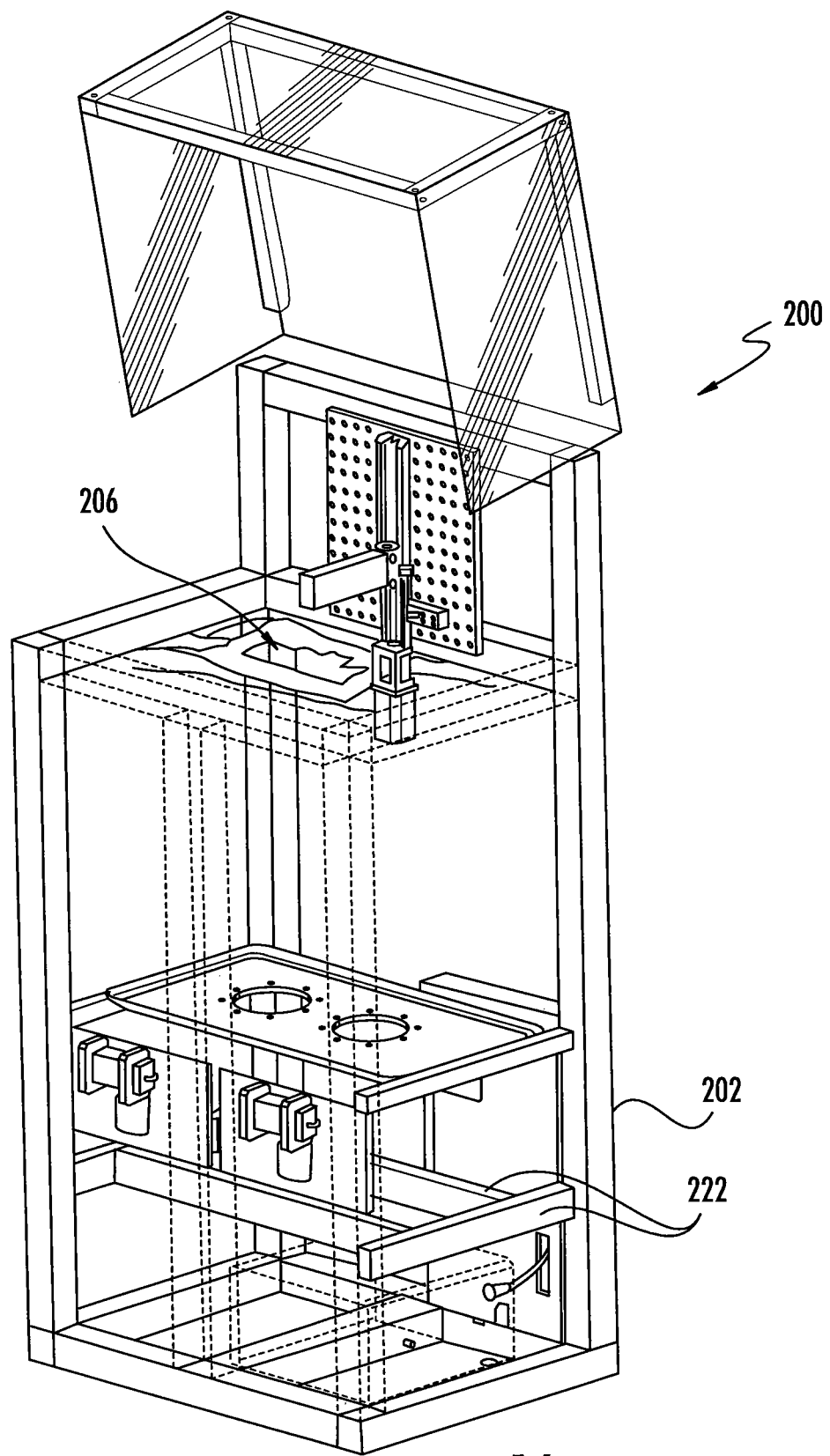
FIG. 16 is a front perspective view of an apparatus according to another exemplary embodiment of the invention.

FIG. 16 is a front perspective view of an apparatus 200 according to another exemplary embodiment of the invention. The apparatus 200 includes the same components and features of the apparatus 100 with the following differences.

The apparatus 200 includes a frame 202 including rails 222 or other mounting feature at which two of the light engine assemblies 130 shown in FIG. 15 may be mounted in a side-by-side relationship. The light engine assemblies 130 are configured to provide a pair of "tiled" images at the build station 206. The use of multiple light engines to provide tiled images is described in more detail above.

The apparatus of FIG. 16 has been used to provide a tiled "image size" of about 150 mm by 200 mm with light intensity of about 1 mW/cm$^2$. The apparatus of FIG. 16 has been used to build objects at speeds of about 50 to 100 mm/hr. The build speed is dependent on light intensity and the geometry of the object.

Example 6

Another Example Embodiment of an Apparatus

Figure 18:
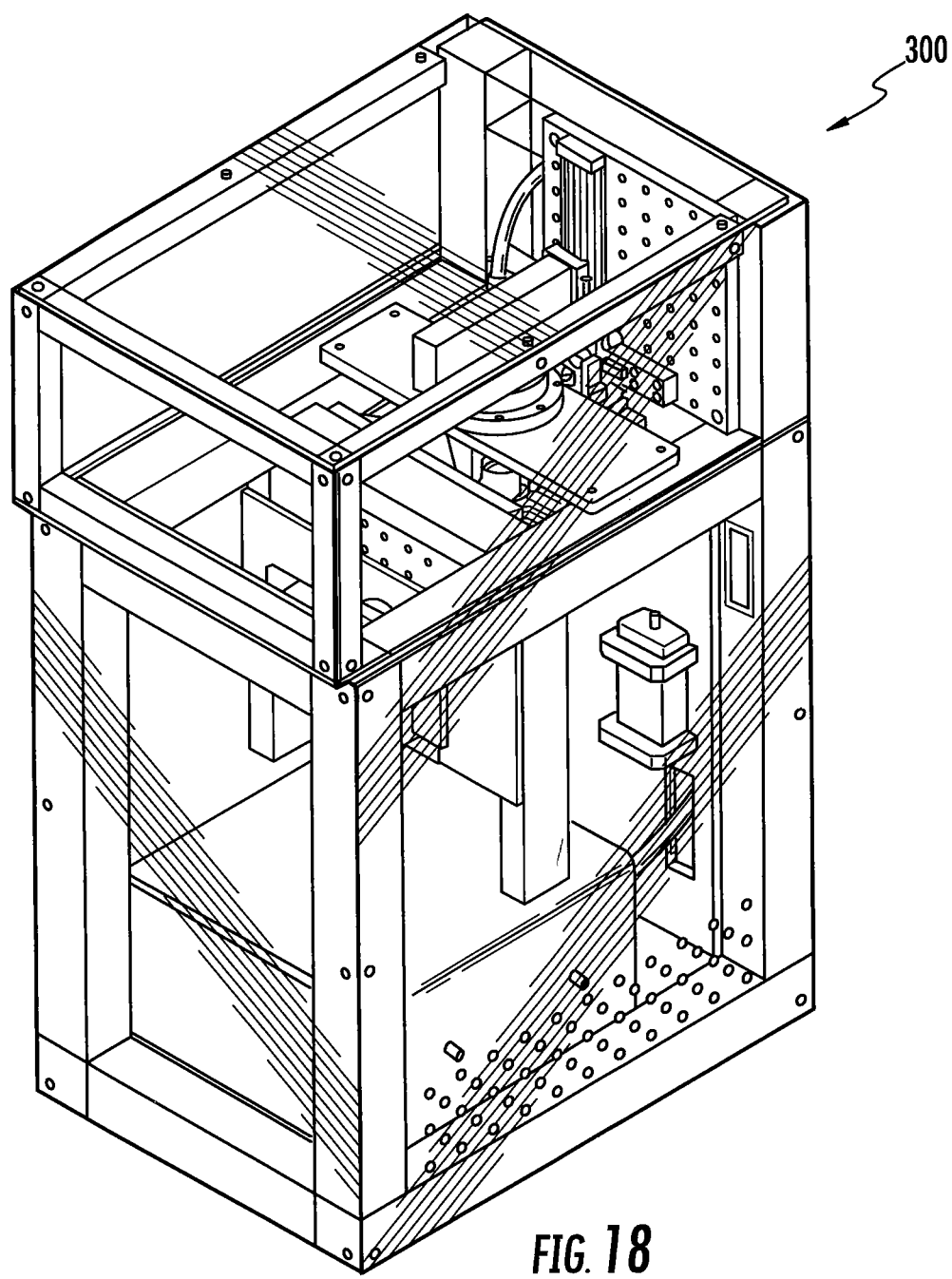
FIG. 18 is a front perspective view of an apparatus according to another exemplary embodiment of the invention.
Figure 19:
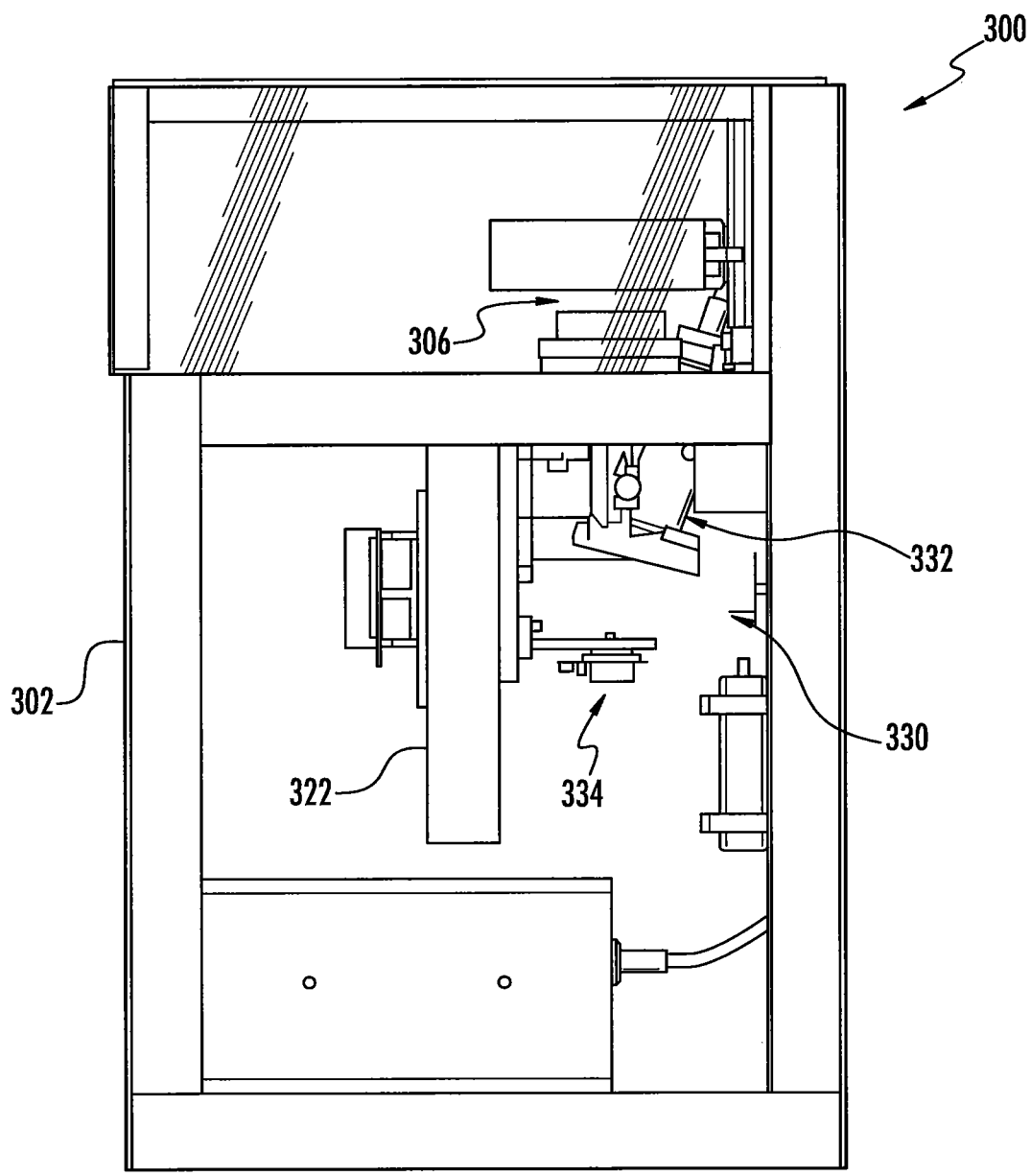
FIG. 19 is a side view of the apparatus of FIG. 18.

FIG. 18 is a front perspective view and FIG. 19 is a side view of an apparatus 300 according to another exemplary embodiment of the invention. The apparatus 300 includes the same components and features of the apparatus 100 with the following differences.

Figure 20:
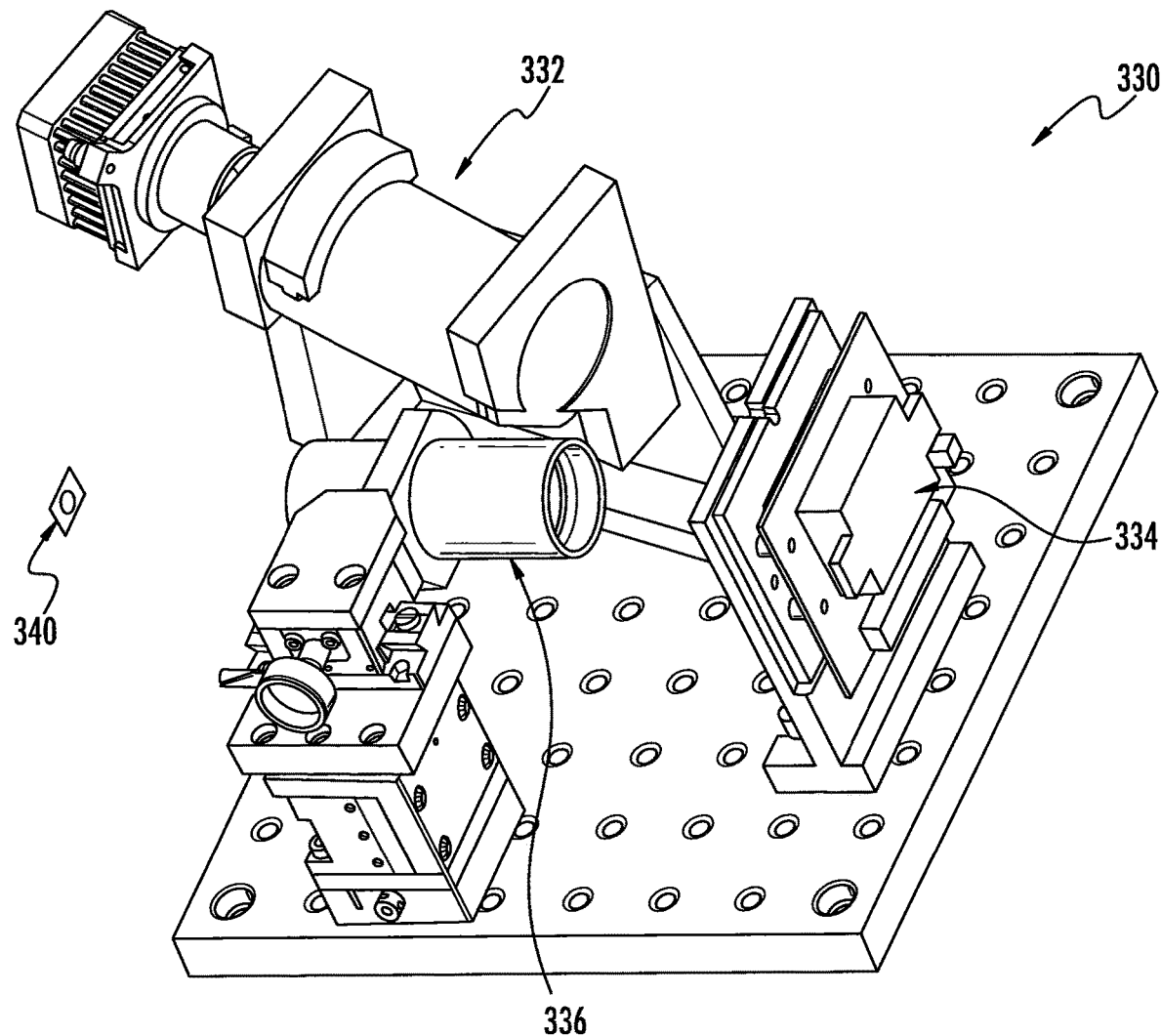
FIG. 20 is a perspective view of a light engine assembly used with the apparatus of FIG. 18.

The apparatus 300 includes a frame 302 including rails 322 or other mounting feature at which a light engine assembly 330 shown in FIG. 20 may be mounted in a different orientation than the light assembly 130 of the apparatus 100. Referring to FIGS. 19 and 20, the light engine assembly 330 includes a condenser lens assembly 332 and a digital light processing (DLP) system including a digital micromirror device (DMD) 334 and an optical or projection lens assembly 336 (which may include an objective lens). A suitable DLP system is the DLP Discovery™ 4100 system available from Texas Instruments, Inc. of Dallas, Tex. Light from the DLP system illuminates the build chamber 306. Specifically, an "image" 340 is projected at the build surface or window. In contrast to the apparatus 100, a reflective mirror is not used with the apparatus 300.

The apparatus of FIGS. 18-20 has been used to provide "image sizes" of about 10.5 mm by 14 mm and about 24 mm by 32 mm with light intensity of about 200 mW/cm$^2$ and 40 mW/cm$^2$ The apparatus of FIGS. 18-20 has been used to build objects at speeds of about 10,000 and 4,000 mm/hr. The build speed is dependent on light intensity and the geometry of the object.

Example 7

Control Program with Lua Scripting

Current printer technology requires low level control in order to ensure quality part fabrication. Physical parameters such as light intensity, exposure time and the motion of the carrier should all be optimized to ensure the quality of a part. Utilizing a scripting interface to a controller such as the Parallax PROPELLER™ microcontroller using the programming language "Lua" provides the user with control over all aspects of the printer on a low level. See generally R. Ierusalimschy, *Programming in Lua* (2013) (ISBN-10: 859037985X; ISBN-13: 978-8590379850).

This Example illustrates the control of a method and apparatus of the invention with an example program written utilizing Lua scripting. Program code corresponding to such instructions, or variations thereof that will be apparent to those skilled in the art, is written in accordance with known techniques based upon the particular microcontroller used.

Concepts.

A part consists of slices of polymer which are printed continuously. The shape of each slice is defined by the frame that is being displayed by the light engine.

Frame.

The frame represents the final output for a slice. The frame is what manifests as the physical geometry of the part. The data in the frame is what is projected by the printer to cure the polymer.

Slice.

All the 2D geometry that will be outputted to a frame should be combined in a Slice. Slices can consist of procedural geometry, Slices of a 3D model or any combination of the two. The slice generating process allows the user to have direct control over the composition of any frame.

Slice of a 3D Model.

A slice is a special type of 2D geometry derived from a 3D model of a part. It represents the geometry that intersects a plane that is parallel to the window. Parts are usually constructed by taking 3D models and slicing them at very small intervals. Each slice is then interpreted in succession by the printer and used to cure the polymer at the proper height.

Procedural Geometry.

Procedurally generated geometry can also be added to a slice. This is accomplished by invoking shape generation functions, such as "addcircle", "addrectangle", and others. Each function allows projection of the corresponding shape onto the printing window. A produced part appears as a vertically extruded shape or combination of shapes.

Coordinate Spaces: Stage.

The coordinate system that the stage uses is usually calibrated such that the origin is 1-20 microns above the window.

Coordinate Spaces: Slice.

Coordinate system of the projected slice is such that origin is located at the center of the print window.

Quick Start.

The following is the most basic method of printing a part from a sliced 3D model. Printing a sliced model consists of 4 main parts: Loading the data, preparing the printer, printing, and shutdown.

Loading Data.

In this section of the code the sliced model data is loaded into memory. The file path to the model is defined in the Constants section of the code. See the full code below for details.

—Loading Model
modelFilePath="Chess King.svg"
numSlices=loadslices(modelFilePath)

Preparing the printer it is important to do two things before printing. You must first turn on the light engine with the relay function, and if applicable, the desired fluid height should be set.

—Prepare Printer
relay(true)—turn light on
showframe(-1)—ensure nothing is exposed durring setup
setlevels(0.55, 0.6)—if available, printer set fluid pump to maintain about 55% fill Printing.

The first step of the printing process is to calibrate the system and set the stage to its starting position by calling gotostart. Next we begin a for loop in which we print each slice. The first line of the for loop uses the infoline command to display the current slice index in the sidebar. Next we determine the height at which the next slice should be cured. That value is stored to nextHeight. Following this we move the stage to the height at which the next slice needs to be cured. To ensure a clean print it can sometimes be necessary to wait for oxygen to diffuse into the resin. Therefore we call sleep for a half second (the exact time for preExposureTime is defined in the constants section as well). After this it's time to actually cure the resin so we call showframe and pass it the index of the slice we want to print, which is stored in sliceIndex by the for loop. We sleep again after this for exposureTime seconds in order to let the resin cure. Before moving on to the next frame, we call showframe(-1) in order to prevent the light engine from curing any resin while the stage is moving to the next height.

—Execute Print
gotostart( )—move stage to starting position
for sliceIndex=0,numSlices-1 do
 infoline(5, string.format("Current Slice: % d", sliceIndex))
 nextHeight=sliceheight(sliceIndex)—calculate the height that the stage should be at to expose this frame
 moveto(nextHeight, stageSpeed)—move to nextHeight
 sleep(preExposureTime)—wait a given amount of time for oxygen to diffuse into resin, prepExposureTime is predefined in the Constants section
 showframe(sliceIndex)—show frame to expose
 sleep(exposureTime)—wait while frame exposes, exposureTime is predefined in the Constants section
 showframe(-1)—show nothing to ensure no exposure while stage is moving to next position
end Shutdown.

The final step in the printing process is to shut down the printer. Call relay(false) to turn the light engine off. If you are using fluid control, call setlevels(0,0) to ensure the valve is shut off. Finally it is a good idea to move the stage up a bit after printing to allow for easy removal of the part.

—Shutdown
relay(false)
setlevels(0,0)
—Lift stage to remove part
moveby(25, 16000)

Fully completed code implementing instructions based on the above is set forth below.

—Constants
exposureTime=1.5—in seconds
preExposureTime=0.5—in seconds
stageSpeed=300—in mm/hour
—Loading Model
modelFilePath="Chess King.svg"
numSlices=loadslices(modelFilePath)
—calculating parameters
maxPrintHeight=sliceheight(numSlices−1)—find the highest point in the print, this is the same as the height of the last slice. Slices are 0 indexed, hence the −1.
infoline(1, "Current Print Info:")
infoline(2, string.format("Calculated Max Print Height: % dmm", maxPrintHeight))
infoline(3, string.format("Calculated Est. Time: % dmin", (maxPrintHeight/stageSpeed)*60+(preExposureTime+exposureTime)*numSlices/60))
infoline(4, string.format("Number of Slices: % d", numSlices))
—Prepare Printer
relay(true)—turn light on
showframe(−1)—ensure nothing is exposed durring setup
setlevels(0.55, 0.6)—if available, printer set fluid pump to maintain about 55% fill
—Execute Print
gotostart( )—move stage to starting position
for sliceIndex=0,numSlices−1 do
   infoline(5, string.format("Current Slice: % d", sliceIndex))
   nextHeight=sliceheight(sliceIndex)—calculate the height that the stage should be at to expose this frame
   moveto(nextHeight, stageSpeed)—move to nextHeight
   sleep(preExposureTime)—wait a given amount of time for oxygen to diffuse into resin, prepExposureTime is predefined in the Constants section
   showframe(sliceIndex)—show frame to expose
   sleep(exposureTime)—wait while frame exposes, exposureTime is predefined in the Constants section
   showframe(−1)—show nothing to ensure no exposure while stage is moving to next position
end
—Shutdown
relay(false)
setlevels(0,0)
—Lift stage to remove part
moveby(25, 16000)
   Gotostart.
   The main purpose of gotostart is to calibrate the stage. This function resets the coordinate system to have the origin at the lowest point, where the limit switch is activated. Calling this command will move the stage down until the limit switch in the printer is activated; this should occur when the stage is at the absolute minimum height.
gotostart( ) moves stage to start at the maximum speed which varies from printer to printer.
gotostart( )—moving to origin at default speed
gotostart(number speed) moves stage to start at speed given in millimeters/hour.
gotostart(15000)—moving stage to origin at 15000 mm/hr
—speed: speed, in mm/hour, at which the stage will move to the start position.
Moveto
   moveto allows the user to direct the stage to a desired height at a given speed.
Safe upper and lower limits to speed and acceleration are ensured internally.
moveto(number targetHeight, number speed)
moveto(25, 15000)—moving to 25 mm at 15,000 mm/hr
moveto(number targetHeight, number speed, number acceleration)
This version of the function allows an acceleration to be defined as well as speed. The stage starts moving at initial speed and then increases by acceleration.
moveto(25, 20000, 1e7)—moving the stage to 25 mm at 20,000 mm/hr while accelerating at 1 million mm/hr^2
moveto(number targetHeight, number speed, table controlPoints, function callback)
This function behaves similar to the basic version of the function. It starts at its initial speed and position and moves to the highest point on the control point table. callback is called when the stage passes each control point.
   function myCallbackFunction(index)—defining the callback function
   print("hello")
   end
   moveto(25, 20000, slicecontrolpoints( ), myCallbackFunction)—moving the stage to 25 mm at 20,000 mm/hr while calling myCallbackFunction at the control points generated by slicecontrolpoints( )
   moveto(number targetHeight, number speed, number acceleration, table controlPoints, function callback) This function is the same as above except the user can pass an acceleration. The stage accelerates from its initial position continuously until it reaches the last control point.
   function myCallbackFunction(index)—defining the callback function
   print("hello")
   end
   moveto(25, 20000, 0.5e7, slicecontrolpoints( ), myCallbackFunction)—moving the stage to 25 mm at 20,000 mm/hr while accelerating at 0.5 million mm/hr^2 and also calling myCallbackFunction at the control points generated by slicecontrolpoints( )
—targetHeight: height, in mm from the origin, that the stage will move to.
—initialSpeed: initial speed, in mm/hour, that the stage will start moving at.
—acceleration: rate, in mm/hour$^2$, that the speed of the stage will increase from initial speed.
—controlPoints: a table of target heights in millimeters. After the stage reaches a target height, it calls the function callback.
—callback: pointer to a function that will be called when the stage reaches a control point. The callback function should take one argument which is the index of the control point the stage has reached.
moveby
   moveby allows the user to change the height of the stage by a desired amount at a given speed. Safe upper and lower limits to speed and acceleration are ensured internally.
moveby(number dHeight, number initalSpeed)
   1 moveby(−2, 15000)—moving down 2 mm at 15,000 mm/hr
   moveby(number dHeight, number initialSpeed, number acceleration) This version of the function allows an acceleration to be defined as well as speed. The stage starts moving at initial speed and then increases by acceleration until it reaches its destination.
   1 moveby(25, 15000, 1e7)—moving up 25 mm at 15,000 mm/hr while accelerating 1e7 mm/hr^2
   moveby(number dHeight, number initialSpeed, table controlPoints, function callback) This function usage allows the user to pass the function a table of absolute height coordinates. After the stage reaches one of these target heights, it calls the function 'callback.' Callback should take one argument which is the index of the control point it has reached.

function myCallbackFunction(index)—defining the callback function
      print("hello")
    end
    moveby(25, 20000, slicecontrolpoints( ), myCallbackFunction)—moving the stage up 25 mm at 20,000 mm/hr while calling myCallbackFunction at the control points generated by slicecontrolpoints( )

moveby(number dHeight, number initialSpeed, number acceleration, table controlPoints, function callback) This function is the same as above except the user can pass an acceleration. The stage accelerates from its initial position continuously until it reaches the last control point.

function myCallbackFunction(index)—defining the callback function
      print("hello")
    end
  moveby(25, 20000, 1e7,slicecontrolpoints( ), myCallbackFunction)—moving the stage up 25 mm at 20,000 mm/hr while calling myCallbackFunction at the control points generated by slicecontrolpoints( ) and accelerating at 1e7 mm/hr^2
- dHeight: desired change in height, in millimeters, of the stage.
- initialSpeed: initial speed, in mm/hour, at which the stage moves.
- acceleration: rate, in mm/hour$^2$, that the speed of the stage will increase from initial speed.
- controlPoints: a table of target heights in millimeters. After the stage reaches a target height, it calls the function callback.
- callback: pointer to a function that will be called when the stage reaches a control point. The callback function should take one argument which is the index of the control point the stage has reached.

Light Engine Control
light
  relay is used to turn the light engine on or off in the printer. The light engine must be on in order to print. Make sure the relay is set to off at the end of the script
  relay(boolean lightOn)
    relay(true)—turning light on
- lightOn: false turns the light engine off, true turns the light engine on.

Adding Procedural Geometry
  Functions in this section exist to project shapes without using a sliced part file.
  Every function in this section has an optional number value called figureIndex.
  Each figure in a slice has its own index. The figures reside one on top of another.
  Figures are drawn so that the figure with the highest index is 'on top' and will therefore not be occluded by anything below it. By default indexes are assigned in the order that they are created so the last figure created will be rendered on top.
  One can, however, change the index by passing the desired index into figureIndex.
  Every function in this section requires a sliceIndex argument. This value is the index of the slice that the figure will be added to.
  Note that generating this procedural geometry does not guarantee that it will be visible or printable. One must use one of the functions such as fillmask or linemask outlined below.

addcircle
  addcircle(number x, number y, number radius, number sliceIndex) addcircle draws a circle in the specified slice.
  addCircle(0, 0, 5, 0)—creating a circle at the origin of the first slice with a radius of 5 mm
- x: is the horizontal distance, in millimeters, from the center of the circle to the origin
- y: is the vertical distance, in millimeters, from the center of the circle to the origin.
- radius: is the radius of the circle measured in millimeters.
- sliceIndex: index of the slice to which the figure will be added.

Returns: figure index of the figure.

addrectangle
  addrectangle(number x, number y, number width, number height number sliceIndex) addrectangle draws a rectangle in the specified slice.
  addrectangle(0, 0, 5, 5, 0)—creating a 5 mm×5 mm square with its top left corner at the origin.
- x: horizontal coordinate, in millimeters, of the top left corner of the rectangle.
- y: vertical coordinate, in millimeters, of the top left corner of the rectangle.
- width: width of the rectangle in millimeters.
- height: height of the rectangle in millimeters.
- sliceIndex: index of the slice to which the figure will be added.

Returns: figure index of the figure.

addline
  addline(number x0, number y0, number x1, number y1, number sliceIndex) addline draws a line segment.
  addLine(0, 0, 20, 20, 0)—creating a line from the origin to 20 mm along the x and y axis on the first slice.
- x0: horizontal coordinate of the first point in the segment, measured in millimeters.
- y0: vertical coordinate of the first point in the segment, measured in millimeters.
- x1: horizontal coordinate of the second point in the segment, measured in millimeters.
- y2: vertical coordinate of the second point in the segment, measured in millimeters.
- sliceIndex: index of the slice to which the figure will be added. Returns: figure index of the figure.

addtext
  text(number x, number y, number scale, string text, number sliceIndex) addtext draws text on the specified slice starting at position 'x, y' with letters of size 'scale'.
  addtext(0, 0, 20, "Hello world", 0)—writing Hello World at the origin of the first slice
- x: horizontal coordinate, measured in millimeters, of the top left corner of the bounding box around the text.
- y: vertical coordinate, measured in millimeters, of the top left corner of the bounding box around the text.
- scale: letter size in millimeters, interpretation may vary depending on the underlying operating system (Windows, OSX, Linux, etc).
- text: the actual text that will be drawn on the slice.
- sliceIndex: index of the slice to which the figure will be added. Returns: figure index of the figure.

2.4 Fill & Line Control

2.4.1 Fillmask fillmask(number color, number sliceIndex, number figureIndex) fillmask is used to control how the procedural geometry is drawn. fillmask tells the figure in question to fill the entirety of its interior with color.
- —color: can be any number on the range 0 to 255. Where 0 is black and 255 is white, any value in between is a shade of grey interpolated linearly between black and white based on the color value. Any value less than 0 will produce a transparent color.
  - myCircle=addCircle(0, 0, 5, 0)—creating the circle to fill
  - fillmask(255, 0, myCircle)—Creating a white filled circle
- —sliceIndex:the index of the slice that should be modified.
- —figureIndex:the is used to determine which figure on the slice should be filled. Each figure has its own unique index. If no figureIndex is passed, the fill applies to all figures in the slice.

2.4.2 Linemask linemask(number color, number sliceIndex, number figureIndex) linemask is used to control how the procedural geometry is drawn. linemask tells a figure to draw its outline in a specific color. The width of the outline is defined by the function linewidth.
- myCircle=addCircle(0, 0, 20, 0)—creating the circle to fill
- linemask(255, 0, myCircle)—setting the outline of the circle to be white
- fillmask(150,0, myCircle)—setting the fill of the circle to be grey
- —color: can be any number on the range 0 to 255. Where 0 is black and 255 is white, any value in between is a shade of grey interpolated linearly between black and white based on the color value. Any value less than 0 will produce a transparent color.
- —sliceIndex: the index of the slice that should be modified.
- —figureIndex: is used to determine which figure on the slice should be filled. Each figure has its own unique index. If no figureIndex is passed, the fill applies to all figures in the slice.

2.4.3 Linewidth linewidth(number width, number sliceIndex, number figureIndex) linewidth is used to set the width of the line that linemask will use to outline the figure.
- linewidth(2,0)—setting the line width for every figure on the first slice to 2 mm
- —sliceIndex: the index of the slice that should be modified.
- —figureIndex: is used to determine which figure on the slice should have its outline changed. Each figure has its own unique index, see section 2.3 (Pg. 10) for more details. If no figureIndex is passed, the fill applies to all figures in the slice.

loadmask
  loadmask(string filepath) loadmask allows for advanced fill control. It enables the user to load a texture from a bitmap file and use it to fill the entirety of a figure with the texture.
    texture=loadmask("voronoi_noise.png")—loading texture. voronoi_noise.png is in the same directory as the script.
    myCircle=addCircle(0, 0, 20, 0)—creating the circle to fill
    fillmask(texture, 0, myCircle)—filling the circle with voronoi noise
    —filepath: file path to image file
    Returns: a special data type which can be passed into a fillmask or linemask function as the color argument.

Frames
showframe
  showframe(number sliceIndex) showframe is essential to the printing process. This function sends the data from a slice to the printer. Call showframes on a frame that doesn't exist to render a black frame e.g. showframe (−1).
    showframe(2)—showing the 3rd slice
    —sliceIndex: the index of the slice to send to the printer.
framegradient
  framegradient(number slope) framegradient is designed to compensate for differences in light intensity.
calcframe
  calcframe( )
  calcframe is designed to analyze the construction of a slice calculates the last frame shown.
  showframe(0)
  calcframe( )
  Returns: the maximum possible distance between any point in the figure and the edge.

2.5.4 Loadframe loadframe(string filepath)
loadframe is used to load a single slice from a supported bitmap file.
  loadframe("slice.png")—slice.png is in the same directory as the script
  —filepath: file path to slice image.

Slices
  Addslice
    addslice(number sliceHeight) addslice creates a new slice at a given height at the end of the slice stack.
      addslice(0.05)—adding a slice at 0.05 mm
    addslice(number sliceHeight, number sliceIndex)
      addslice(0.05, 2)—adding a slice at 0.05 mm and at index 2. this pushes all layers 2 and higher up an index.
      addslice creates a new slice at a given height and slice index.
      —sliceHeight: height, in millimeters, of the slice.
      —sliceIndex: index at which the slice should be added. Returns: slice index.
  Loadslices
    loadslices(string filepath) loadslices is used to load all the slices from a 2D slice file.
      loadslices("Chess King.svg")—loading all the slices from the Chess King.svg file
      —filepath: file path to the sliced model. Acceptable formats are .cli and .svg. Returns: number of slices.
  Sliceheight
    sliceheight(number sliceIndex) sliceheight is used to find the height of a slice in mm off the base.
      addslice(0.05,0)—setting the first slice to 0.05 mm
      sliceheight(0)—checking the height of slice 0, in this example it should return 0.05
      —sliceIndex: index of the slice to check. Returns: slice height in mm.

2.6.4 Slicecontrolpoints slicecontrolpoints( ) slicecontrolpoints is a helper function which creates a control point for each slice of a model. These control points can be passed to the moveto or moveby function to set it to callback when the stage reaches the height of each slice. Make sure loadslices has been called prior to calling this function.

loadslices("Chess King.svg")
controlPoints=slicecontrolpoints( )

Returns: Lua table of control points.

Timing

Sleep sleep(number seconds) sleep allows the user to pause the execution of the program for a set number of seconds.

sleep(0.5)—sleeping for a half second

—seconds: number of seconds to pause script execution.

Clock clock( ) clock returns the current time in seconds. It is accurate at least up to the millisecond and should therefore be used instead of Lua's built in clock functionality. clock should be used as a means to measure differences in time as the start time for the second count varies from system to system.

t1=clock( )
loadslices("Chess King.svg")
deltaTime=clock( )−t1

Returns: system time in seconds.

Fluid Control

This set of functions can be used with printer models that support fluid control. Before the script finishes executing, setlevels(0,0) should be called to ensure that the pump stops pumping fluid into the vat.

getcurrentlevel getcurrentlevel( ) getcurrentlevel returns the percentage of the vat that is full.

print(string.format("Vat is % d percent full.", getcurrentlevel( )*100))

Returns: a floating point number on the range 0 to 1 that represents the percentage of the vat that is full.

setlevels setlevels(number min, number max) setlevels allows the user to define how much fluid should be in the vat. The fluid height will be automatically regulated by a pump. The difference between min and max should be greater than 0.05 to ensure that the valve is not constantly opening and closing.

setlevels(0.7,0.75)—keeping vat about 75 percent full

—min: the minim percentage of the vat that should be full. Entered as a floating point number from 0 to 1.

—max: the max percentage of the vat that should be full. Entered as a floating point number from 0 to 1.

User Feedback

2.9.1 Infoline infoline(int lineIndex, string text) infoline allows the user to display up to 5 lines of text in a constant position on the sidebar of the Programmable Printer Platform. This function is often used to allow the user to monitor several changing variables at once.

infoline(1, string.format("Vat is % d percent full.", getcurrentlevel( )*100))

—lineIndex: the index of the line. Indexes should be in the range 1 to 5, 1 being the upper most line.

—text: text to be displayed at line index.

Global Configuration Table.

Before a print script is executed, all global variables are loaded into a configuration table called cfg. Most of the data in this table has already been read by the Programmable Printer Platform by the time the users script executes, therefore, changing them will have no effect. However, writing to the xscale, yscale, zscale, xorig and yorig fields of the cfg, will effect all the loadslices and addlayer calls that are made afterwards. If the users script is designed to be run at a specific scale and/or position, it is good practice to override the cfg with the correct settings to ensure the scale and position can't be accidentally changed by the Programmable Printer Platform.

cfg.xscale=3—overriding global settings to set scale on the x axis to 3 cfg.yscale=2—overriding global settings to set scale on the y axis to 2 cfg.zscale=1—overriding global settings to set scale on the z axis to 1 cfg.xorig=−2.0—overriding global settings to set the origin on the x axis 2 mm left cfg.yorig=0.25—overriding global settings to set the origin on the y axis 0.25 mm in the positive direction Fields in cfg:

—serial port: name of serial port (changing this variable wont effect code)

—xscale: x scale–yscale: y scale

—zscale: z scale

—xorig: x origin–yorig: y origin

—hw xscale: pixel resolution in x direction (changing this variable won't effect code)

—hw yscale: pixel resolution in y direction (changing this variable won't effect code)

Useful Lua Standard Libraries.

The math standard library contains several different functions that are useful in calculating geometry. The string object is most useful in printing for manipulating info strings. For details contact LabLua at Departamento de Informática, PUC-Rio, Rua Marquês de São Vicente, 225; 22451-900 Rio de Janeiro, RJ, Brazil

Example 8

Lua Script Program for Continuous Print

This example shows a Lua script program corresponding to Example 7 above for continuous three dimension printing.

```
—Constants
sliceDepth = .05—in millimeters
exposureTime = .225— in seconds
—Loading Model
modelFilePath = "Chess King.svg"
numSlices = loadslices(modelFilePath)
controlPoints = slicecontrolpoints( )—Generate Control Points
—calculating parameters
exposureTime = exposureTime/(60*60)—converted to hours
stageSpeed = sliceDepth/exposureTime—required
distance/required time
maxPrintHeight = sliceheight(numSlices-1)—find
the highest point in the print,
this is the same as the height of the last slice. Slices are
0 indexed, hence the −1.
infoline(1, "Current Print Info:")
infoline(2, string.format("Calulated Stage Speed:
%dmm/hr\n", stageSpeed))
infoline(3, string.format("Calculated Max Print Height:
%dmm", maxPrintHeight))
infoline(4, string.format("Calculated Est. Time: %dmin",
(maxPrintHeight/stageSpeed)*60))
```

-continued

```
—Create Callback Function for use with moveto
function movetoCallback(controlPointIndex)
    showframe(controlPointIndex)
end
—Prepare Printer
relay(true)—turn light on
setlevels(.55, .6)—if available, printer set fluid
pump to maintain about 50% fill
—Execute Print
gotostart( )—move stage to starting position
moveto(maxPrintHeight, stageSpeed,
controlPoints, movetoCallback)
```

-continued

```
—Shutdown
relay(false)
setlevels(0,0)
—Lift stage to remove part
moveby(25, 160000)
```

Example 9

Lua Script Program for Cylinder and Buckle

This example shows a Lua script program for two fitted parts that use procedural geometry.

Cylinder:

```
—Constants
    exposureTime = 1.5— in seconds
    preExposureTime = 1 — in seconds
    stageSpeed = 300 —in mm/hour
    sliceDepth = .05
    numSlices = 700
—Generating Model
    radius = 11
    thickness = 4
    smallCircleRad = 1.4
    for sliceIndex = 0,numSlices-1 do
        addlayer(sliceDepth*(sliceIndex+1), sliceIndex)–the depth of a slice*its index =
            height of slice
        largeCircle = addcircle(0,0,radius, sliceIndex)
        linewidth(thickness, sliceIndex, largeCircle)
        linemask(255, sliceIndex, largeCircle)
        for i=0,2*math.pi, 2*math.pi/8 do
            addcircle(math.cos(i)*radius, math.sin(i)*radius, smallCircleRad,
                sliceIndex)
        end
        fillmask(0,sliceIndex)
end
    —calculating parameters
    maxPrintHeight = sliceheight(numSlices-1)—find the highest point in the print, this is
the
        same as the height of the last slice. Slices are 0 indexed, hence the −1.
    infoline(1, "Current Print Info:")
    infoline(2, string.format("Calculated Max Print Height: %dmm", maxPrintHeight))
    infoline(3, string.format("Calculated Est. Time: %dmin",
        (maxPrintHeight/stageSpeed)*60 +
        (preExposureTime+exposureTime)*numSlices/60))
infoline(4, string.format("Number of Slices: %d", numSlices))
        —Prepare Printer
        relay(true)—turn light on
        showframe(-1) —ensure nothing is exposed durring setup
        setlevels(.55, .6)—if available, printer set fluid pump to maintain about 55% fill
        —Execute Print
        gotostart( )—move stage to starting position
        for sliceIndex =0,numSlices-1 do
            infoline(5, string.format("Current Slice: %d", sliceIndex))
            nextHeight = sliceheight(sliceIndex)—calculate the height that the stage
            should be at to expose this frame
            moveto(nextHeight, stageSpeed)—move to nextHeight
            sleep(preExposureTime)—wait a given amount of time for oxygen to diffuse
into
            resin , prepExposureTime is predefined in the Constants section
            showframe(sliceIndex)—show frame to expose
            sleep(1.5)—wait while frame exposes, exposureTime is predefined in the
            Constants section
            showframe(-1)— show nothing to ensure no exposure while stage is moving to
            next position
        end
        —Shutdown
        relay(false)
        setlevels(0,0)
        —Lift stage to remove part
        moveby(25, 160000)
```

Buckle:

```
—Constants
exposureTime = 1.5— in seconds
preExposureTime = 0.5 — in seconds
stageSpeed = 300 —in mm/hour
sliceDepth = .05
numSlices = 900
    —Generating Model
    baseRadius = 11
    thickness = 3
    innerCircleRad = 7.5
for sliceIndex = 0,numSlices-1 do
     addlayer(sliceDepth*(sliceIndex+1))—the depth of a slice*its index = height
of slice
        if(sliceIndex <100) then —base
            addcircle(0,0, baseRadius, sliceIndex)
            fillmask(255, sliceIndex)
        else — inner circle
            innerCircle = addcircle(0,0, innerCircleRad, sliceIndex)
            linewidth(thickness, sliceIndex, innerCircle)
            linemask(255, sliceIndex, innerCircle)
        for i = 0,4*2*math.pi/8, 2*math.pi/8 do
            x = math.cos(i)*(innerCircleRad+thickness)
            y = math.sin(i)*(innerCircleRad+thickness)
            cutLine = addline(x,y, -x,-y, sliceIndex)
            linewidth(3, sliceIndex, cutLine)
            linemask(0, sliceIndex, cutLine)
        end
        if (sliceIndex > 800) then —tips
            r0 = innerCircleRad +2
            if(sliceIndex < 850) then
r0 = innerCircleRad + (sliceIndex-800)*(2/50)
        end
        for i = 0,4*2*math.pi/8, 2*math.pi/8 do
ang = i + (2*math.pi/8)/2
x = math.cos(ang)*(r0)
y = math.sin(ang)*(r0)
nubLine = addline(x,y, -x,-y, sliceIndex)
linewidth(2, sliceIndex, nubLine)
linemask(255, sliceIndex, nubLine)
            end
            fillmask(0,sliceIndex, addcircle(0,0, innerCircleRad-(thickness/2),
        sliceIndex))
    end
end
showframe(sliceIndex)
sleep(.02)
end
—calculating parameters
maxPrintHeight = sliceheight(numSlices-1)—find the highest point in the print, this is the
same as the height of the last slice. Slices are 0 indexed, hence the −1.
infoline(1, "Current Print Info:")
infoline(2, string.format("Calculated Max Print Height: %dmm", maxPrintHeight))
infoline(3, string.format("Calculated Est. Time: %dmin", (maxPrintHeight/stageSpeed)*60
+ (preExposureTime+exposureTime)* numSlices/60))
infoline(4, string.format("Number of Slices: %d", numSlices))
—Prepare Printer
relay(true)—turn light on
showframe(-1) —ensure nothing is exposed durring setup
setlevels(.55, .6)—if available, printer set fluid pump to maintain about 55% fill
—Execute Print
gotostart( )—move stage to starting position
for sliceIndex =0,numSlices-1 do
    infoline(5, string.format("Current Slice: %d", sliceIndex))
    nextHeight = sliceheight(sliceIndex)—calculate the height that the stage
    should be at to expose this frame
    moveto(nextHeight, stageSpeed)—move to nextHeight
    sleep(preExposureTime)—wait a given amount of time for oxygen to diffuse into
    resin, prepExposureTime is predefined in the Constants section
    showframe(sliceIndex)—show frame to expose
    sleep(1.5)—wait while frame exposes, exposureTime is predefined in the Constants
section
```

```
    showframe(-1)— show nothing to ensure no exposure while stage is moving to
next
position
end
—Shutdown
relay(false)
setlevels(0,0)
—Lift stage to remove part
moveby(25, 160000)
```

Example 10

Continuous Fabrication with Intermittent Irradiation and Advancing

Figure 21:
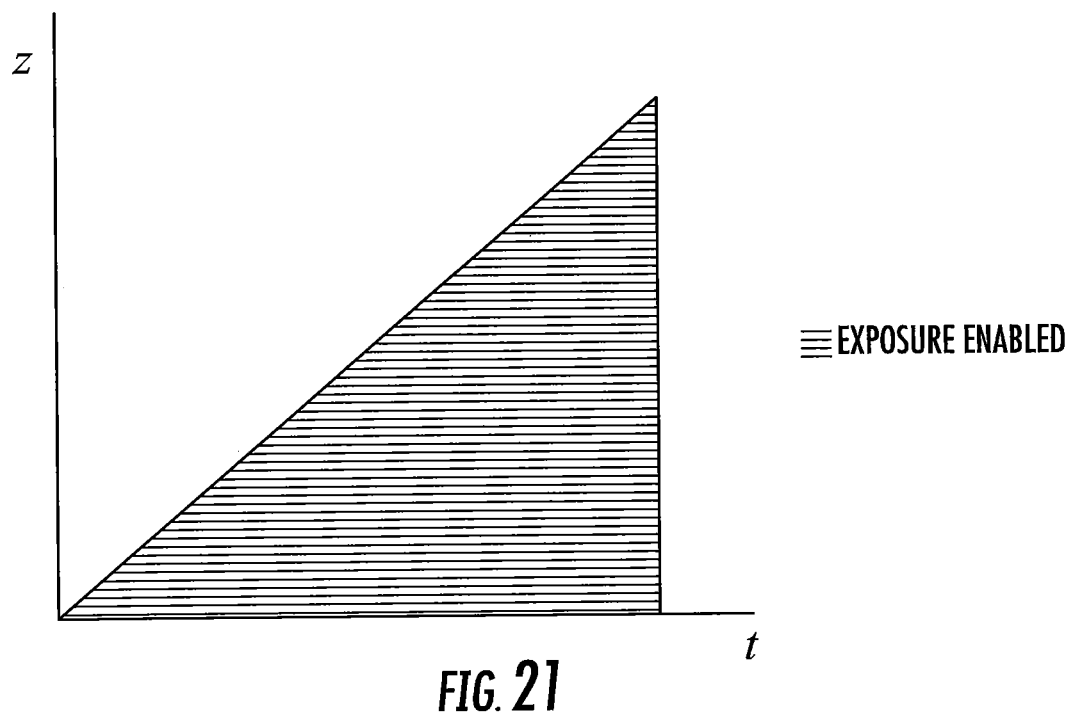
FIG. 21 is a graphic illustration of a process of the invention indicating the position of the carrier in relation to the build surface or plate, where both advancing of the carrier and irradiation of the build region is carried out continuously. Advancing of the carrier is illustrated on the vertical axis, and time is illustrated on the horizontal axis.

A process of the present invention is illustrated in FIG. 21, where the vertical axis illustrates the movement of the carrier away from the build surface. In this embodiment, the vertical movement or advancing step (which can be achieved by driving either the carrier or the build surface, preferably the carrier), is continuous and unidirectional, and the irradiating step is carried out continuously. Polymerization of the article being fabricated occurs from a gradient of polymerization or active surface, and hence creation of "layer by layer" fault lines within the article is minimized.

Figure 22:
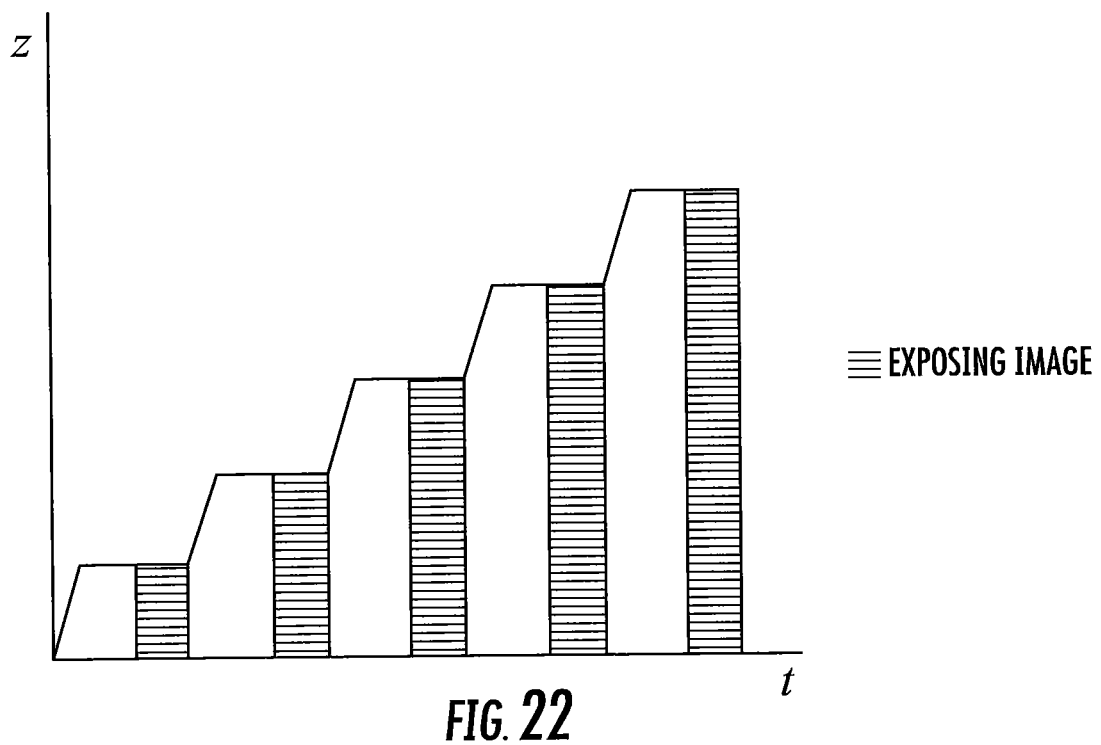
FIG. 22 is a graphic illustration of another process of the invention indicating the position of the carrier in relation to the build surface or plate, where both advancing of the carrier and irradiation of the build region is carried out stepwise, yet the dead zone and gradient of polymerization are maintained. Advancing of the carrier is again illustrated on the vertical axis, and time is illustrated on the horizontal axis.

An alternate embodiment of the present invention is illustrated in FIG. 22. In this embodiment, the advancing step is carried out in a step-by-step manner, with pauses introduced between active advancing of the carrier and build surface away from one another. In addition, the irradiating step is carried out intermittently, in this case during the pauses in the advancing step. We find that, as long as the inhibitor of polymerization is supplied to the dead zone in an amount sufficient to maintain the dead zone and the adjacent gradient of polymerization or active surface during the pauses in irradiation and/or advancing, the gradient of polymerization is maintained, and the formation of layers within the article of manufacture is minimized or avoided. Stated differently, the polymerization is continuous, even though the irradiating and advancing steps are not. Sufficient inhibitor can be supplied by any of a variety of techniques, including but not limited to: utilizing a transparent member that is sufficiently permeable to the inhibitor, enriching the inhibitor (e.g., feeding the inhibitor from an inhibitor-enriched and/or pressurized atmosphere), etc. In general, the more rapid the fabrication of the three-dimensional object (that is, the more rapid the cumulative rate of advancing), the more inhibitor will be required to maintain the dead zone and the adjacent gradient of polymerization.

Example 11

Figure 23:
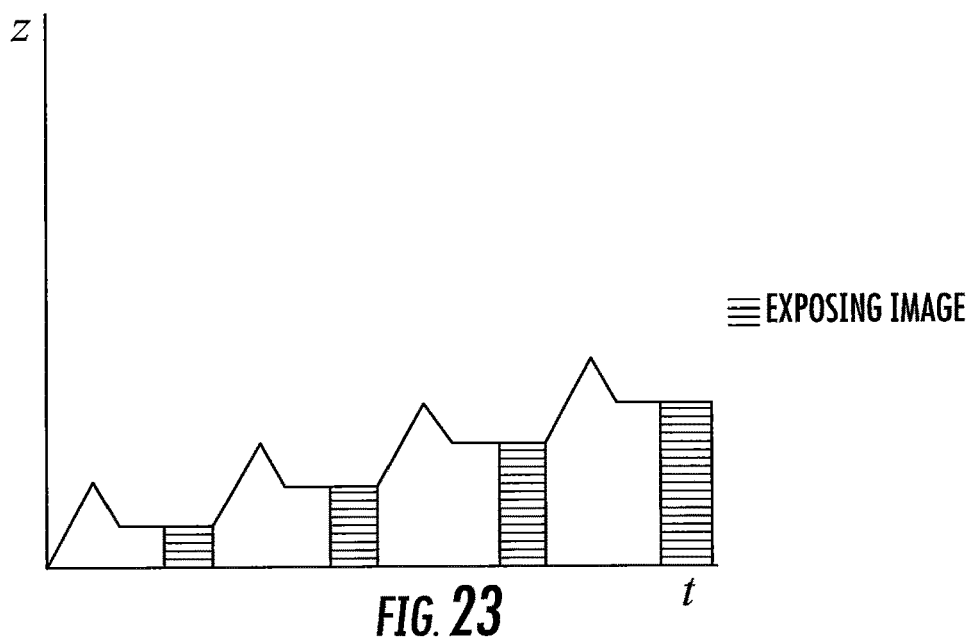
FIG. 23 is a graphic illustration of still another process of the invention indicating the position of the carrier in relation to the build surface or plate, where both advancing of the carrier and irradiation of the build region is carried out stepwise, the dead zone and gradient of polymerization are maintained, and a reciprocating step is introduced between irradiation steps to enhance the flow of polymerizable liquid into the build region. Advancing of the carrier is again illustrated on the vertical axis, and time is illustrated on the horizontal axis.

Continuous Fabrication with Reciprocation During Advancing to Enhance Filling of Build Region with Polymerizable Liquid A still further embodiment of the present invention is illustrated in FIG. 23. As in Example 10 above, this embodiment, the advancing step is carried out in a step-by-step manner, with pauses introduced between active advancing of the carrier and build surface away from one another. Also as in Example 10 above, the irradiating step is carried out intermittently, again during the pauses in the advancing step. In this example, however, the ability to maintain the dead zone and gradient of polymerization during the pauses in advancing and irradiating is taken advantage of by introducing a vertical reciprocation during the pauses in irradiation.

We find that vertical reciprocation (driving the carrier and build surface away from and then back towards one another), particularly during pauses in irradiation, serves to enhance the filling of the build region with the polymerizable liquid, apparently by pulling polymerizable liquid into the build region. This is advantageous when larger areas are irradiated or larger parts are fabricated, and filling the central portion of the build region may be rate-limiting to an otherwise rapid fabrication.

Reciprocation in the vertical or Z axis can be carried out at any suitable speed in both directions (and the speed need not be the same in both directions), although it is preferred that the speed when reciprocating away is insufficient to cause the formation of gas bubbles in the build region.

While a single cycle of reciprocation is shown during each pause in irradiation in FIG. 23, it will be appreciated that multiple cycles (which may be the same as or different from one another) may be introduced during each pause.

As in Example 10 above, as long as the inhibitor of polymerization is supplied to the dead zone in an amount sufficient to maintain the dead zone and the adjacent gradient of polymerization during the reciprocation, the gradient of polymerization is maintained, the formation of layers within the article of manufacture is minimized or avoided, and the polymerization/fabrication remains continuous, even though the irradiating and advancing steps are not.

Example 12

Figure 24:
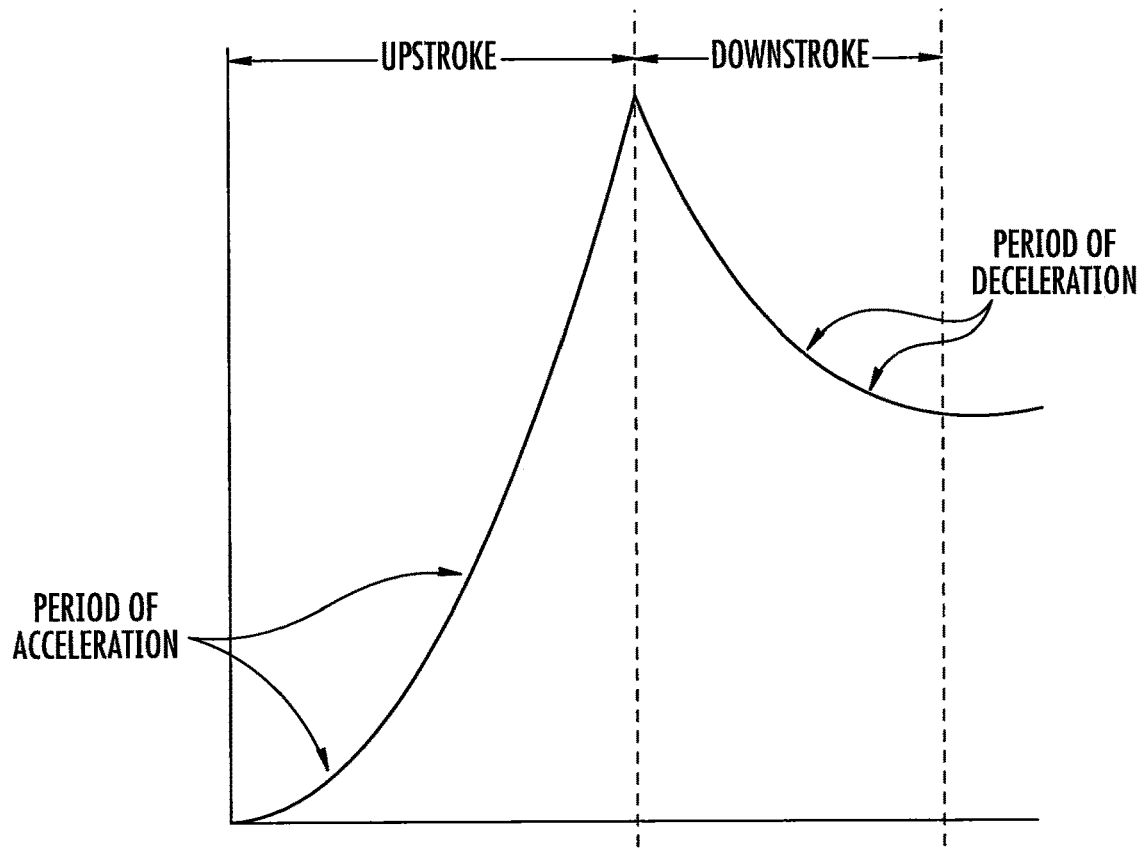
FIG. 24 is a detailed illustration of a reciprocation step of FIG. 23, showing a period of acceleration occurring during the upstroke (i.e., a gradual start of the upstroke) and a period of deceleration occurring during the downstroke (i.e., a gradual end to the downstroke).

Acceleration During Reciprocation Upstroke and Deceleration During Reciprocation Downstroke to Enhance Part Quality We observe that there is a limiting speed of upstroke, and corresponding downstroke, which if exceeded causes a deterioration of quality of the part or object being fabricated (possibly due to degradation of soft regions within the gradient of polymerization caused by lateral shear forces a resin flow). To reduce these shear forces and/or enhance the quality of the part being fabricated, we introduce variable rates within the upstroke and downstroke, with gradual acceleration occurring during the upstroke and gradual deceleration occurring during the downstroke, as schematically illustrated in FIG. 24.

Example 13

Fabrication in Multiple Zones

Figure 25:
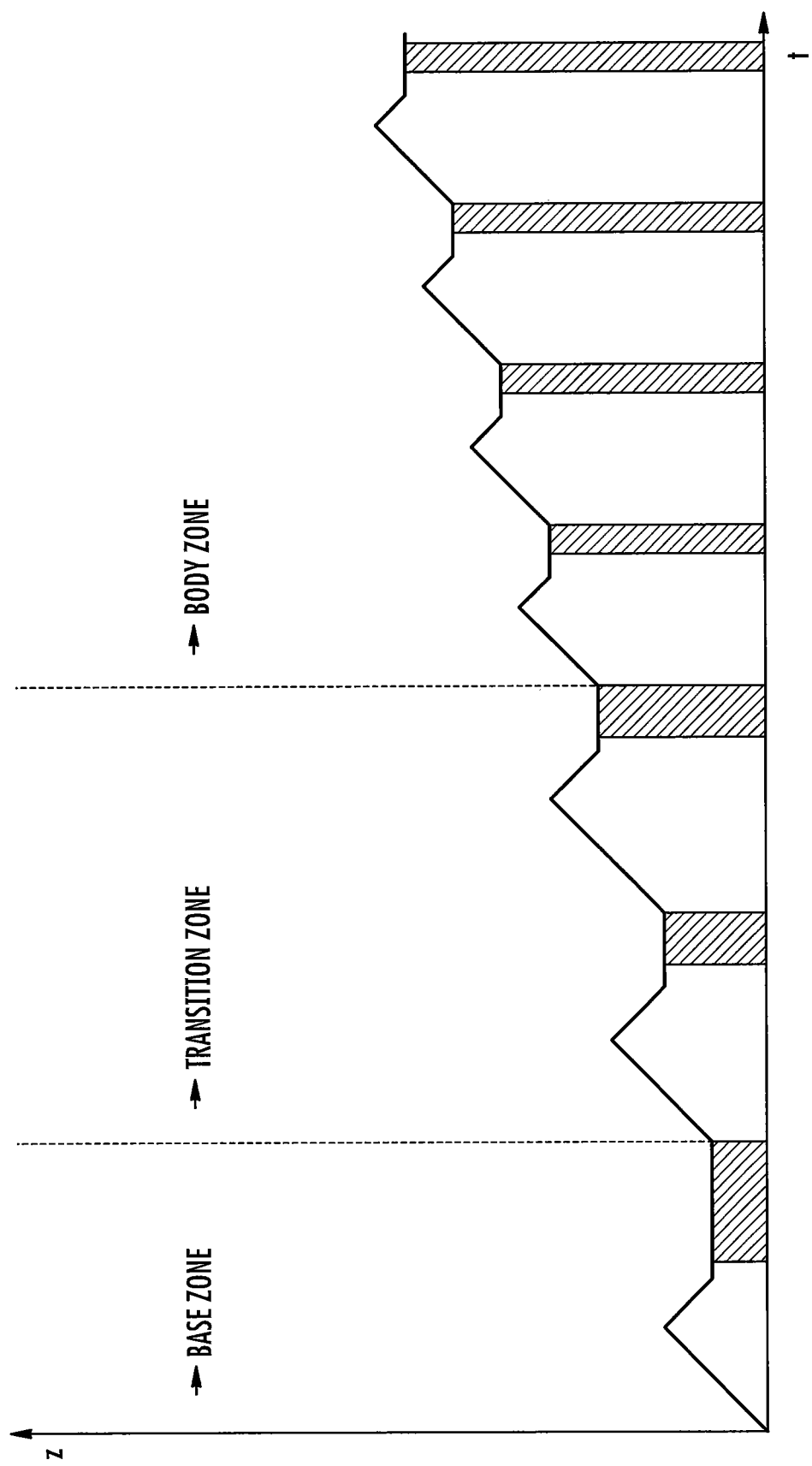
FIG. 25 schematically illustrates the movement of the carrier (z) over time (t) in the course of fabricating a three-dimensional object by processes of the present invention through a first base (or "adhesion") zone, a second transition zone, and a third body zone.

FIG. 25 schematically illustrates the movement of the carrier (z) over time (t) in the course of fabricating a three-dimensional object by methods as described above, through a first base (or "adhesion") zone, an optional second transition zone, and a third body zone. The overall process of forming the three-dimensional object is thus divided into three (or two) immediately sequential segments or zones. The zones are preferably carried out in a continuous sequence without pause substantial delay (e.g., greater than 5 or 10 seconds) between the three zones, preferably so that the gradient of polymerization is not disrupted between the zones.

The first base (or "adhesion") zone includes an initial light or irradiation exposure at a higher dose (longer duration and/or greater intensity) than used in the subsequent transition and/or body zones. This is to obviate the problem of the carrier not being perfectly aligned with the build surface, and/or the problem of variation in the positioning of the carrier from the build surface, at the start of the process, by insuring that the resin is securely polymerized to the carrier. Note an optional reciprocation step (for initial distributing or pumping of the polymerizable liquid in or into the build region) is shown before the carrier is positioned in its initial, start, position. Note that a release layer (not shown) such as a soluble release layer may still be included between the carrier and the initial polymerized material, if desired. In general, a small or minor portion of the three-dimensional object is produced during this base zone (e.g., less than 1, 2 or 5 percent by volume). Similarly, the duration of this base zone is, in general, a small or minor portion of the sum of the durations of the base zone, the optional transition zone, and the body zone (e.g., less than 1, 2 or 5 percent).

Immediately following the first base zone of the process, there is optionally (but preferably) a transition zone. In this embodiment, the duration and/or intensity of the illumination is less, and the displacement of the oscillatory step less, compared to that employed in the base zone as described above. The transition zone may (in the illustrated embodiment) proceed through from 2 or 5, up to 50 or more oscillatory steps and their corresponding illuminations. In general, an intermediate portion (greater than that formed during the base zone, but less than that formed of during the body zone), of the three dimensional object is produced during the transition zone (e.g., from 1, 2 or 5 percent to 10, 20 or 40 percent by volume). Similarly, the duration of this transition zone is, in general, greater than that of the base zone, but less than that of the body zone (e.g., a duration of from 1, 2 or 5 percent to 10, 20 or 40 percent that of the sum of the durations of the base zone, the transition zone, and the body zone (e.g., less than 1, 2 or 5 percent).

Immediately following the transition zone of the process (or, if no transition zone is included, immediately following the base zone of the process), there is a body zone, during which the remainder of the three-dimensional object is formed. In the illustrated embodiment, the body zone is carried out with illumination at a lower dose than the base zone (and, if present, preferably at a lower dose than that in the transition zone), and the reciprocation steps are (optionally but in some embodiments preferably) carried out at a smaller displacement than that in the base zone (and, if present, optionally but preferably at a lower displacement than in the transition zone). In general, a major portion, typically greater than 60, 80, or 90 percent by volume, of the three-dimensional object is produced during the transition zone. Similarly, the duration of this body zone is, in general, greater than that of the base zone and/or transition zone (e.g., a duration of at least 60, 80, or 90 percent that of the sum of the durations of the base zone, the transition zone, and the body zone).

Note that, in this example, the multiple zones are illustrated in connection with an oscillating mode of fabrication, but the multiple zone fabrication technique described herein may also be implemented with other modes of fabrication as illustrated further in the examples below (with the transition zone illustrated as included, but again being optional).

Example 14

Fabrication with Intermittent (or "Strobe") Illumination

The purpose of a "strobe" mode of operation is to reduce the amount of time that the light or radiation source is on or active (e.g., to not more than 80, 70, 60, 50, 40, or 30 percent of the total time required to complete the fabrication of the three-dimensional object), and increase the intensity thereof (as compared to the intensity required when advancing is carried out at the same cumulative rate of speed without such reduced time of active illumination or radiation), so that the overall dosage of light or radiation otherwise remains substantially the same. This allows more time for resin to flow into the build region without trying to cure it at the same time. The strobe mode technique can be applied to any of the existing general modes of operation described herein above, including continuous, stepped, and oscillatory modes, as discussed further below.

Figure 26A:
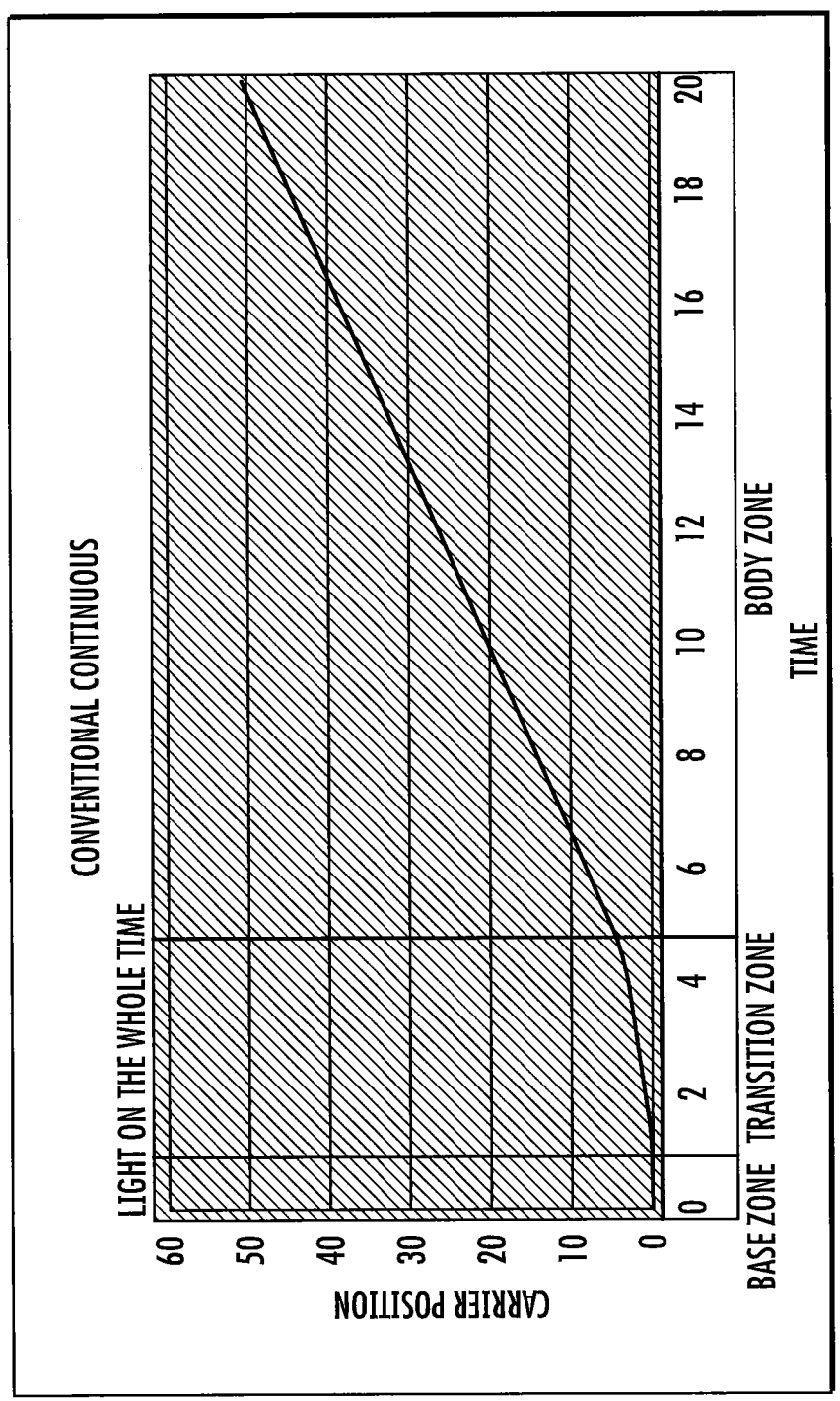
FIG. 26A schematically illustrates the movement of the carrier (z) over time (t) in the course of fabricating a three-dimensional object by continuous advancing and continuous exposure.

FIG. 26A schematically illustrates one embodiment of continuous mode. In the conventional continuous mode, an image is projected and the carrier starts to move upwards. The image is changed at intervals to represent the cross section of the three-dimensional object being produced corresponding to the height of the build platform. The speed of the motion of the build platform can vary for a number of reasons. As illustrated, often there is a base zone where the primary goal is to adhere the object to the build platform, a body zone which has a speed which is suitable for the whole object being produced, and a transition zone which is a gradual transition from the speed and/or dosages of the base zone to the speeds and/or dosages of the body zone. Note that cure is still carried out so that a gradient of polymerization, which prevents the formation of layer-by-layer fault lines, in the polymerizable liquid in the build region, is preferably retained, and with the carrier (or growing object) remaining in liquid contact with the polymerizable liquid, as discussed above.

Figure 26B:
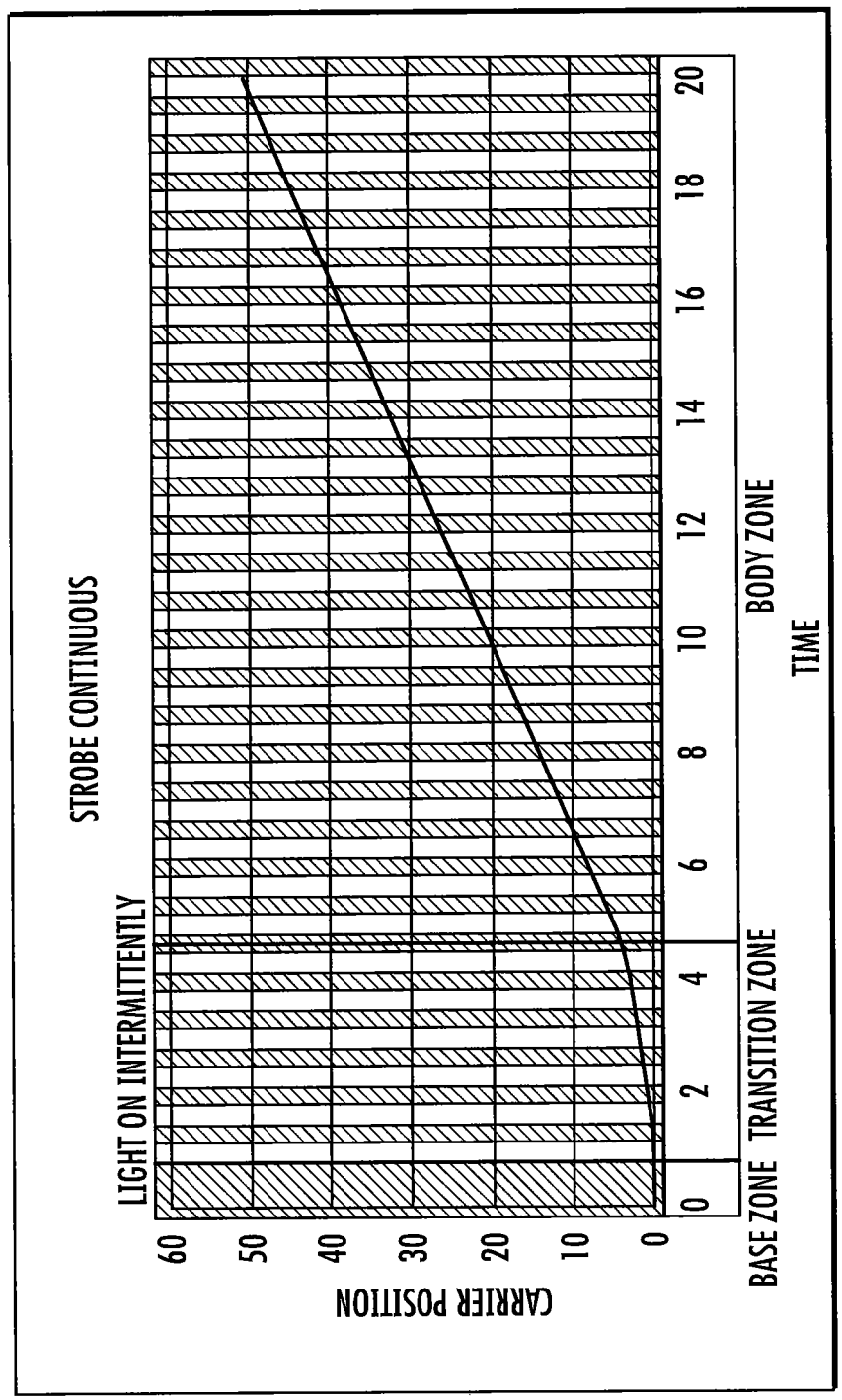
FIG. 26B illustrates the fabrication of a three-dimensional object in a manner similar to FIG. 26 A, except that illumination is now in an intermittent (or "strobe") pattern.

FIG. 26B schematically illustrates one embodiment of strobe continuous mode. In strobe continuous the light intensity is increased but the image is projected in short flashes or intermittent segments. The increased intensity allows the resin to cure more quickly so that the amount of flow during cure is minimal. The time between flashes lets resin flow without being cured at the same time. This can reduce problems caused by trying to cure moving resin, such as pitting.

In addition, the reduced duty cycle on the light source which is achieved in strobe mode can allow for use of increased intermittent power. For example: If the intensity for the conventional continuous mode was 5 mW/cm$^2$ the intensity could be doubled to 10 mW/cm$^2$ and the time that the image is projected could be reduced to half of the time, or the intensity could be increased 5-fold to 25 mW/cm$^2$ and the time could be reduced to $\frac{1}{5}^{th}$ of the previous light on time.

Figure 27A:
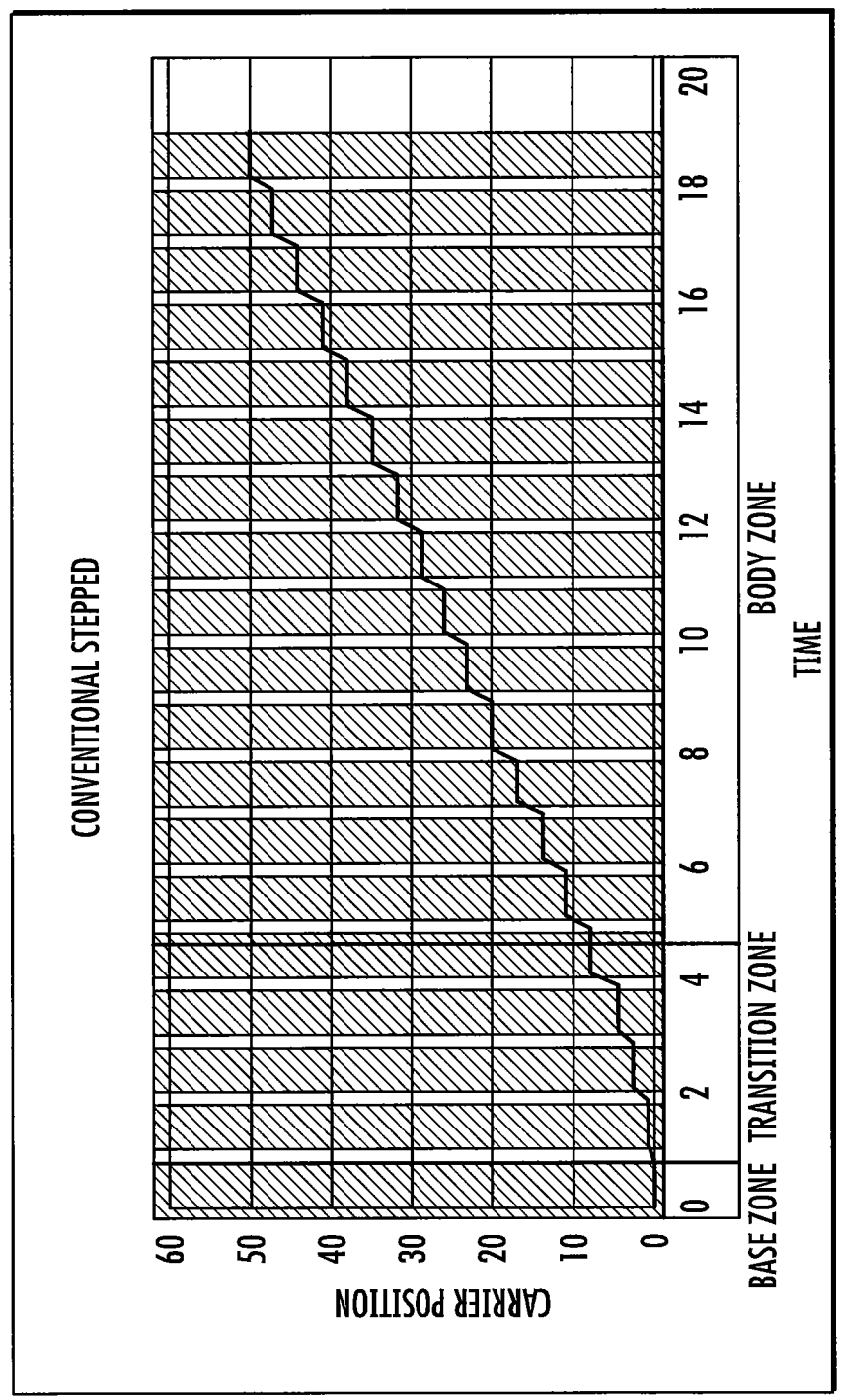
FIG. 27A schematically illustrates the movement of the carrier (z) over time (t) in the course of fabricating a three-dimensional object by intermittent (or "stepped") advancing and intermittent exposure.

FIG. 27A schematically illustrates one embodiment of stepped mode: In the conventional stepped mode an image is projected while the build platform is stationary (or moving slowly as compared to more rapid movement in between illumination). When one height increment is sufficiently exposed the image is turned off and the build platform is moved upwards by some increment. This motion can be at one speed or the speed can vary such as by accelerating from a slow speed when the thickness of uncured resin is thin to faster as the thickness of the uncured resin is thicker. Once the build platform is in the new position the image of the next cross section is projected to sufficiently expose the next height increment.

Figure 27B:
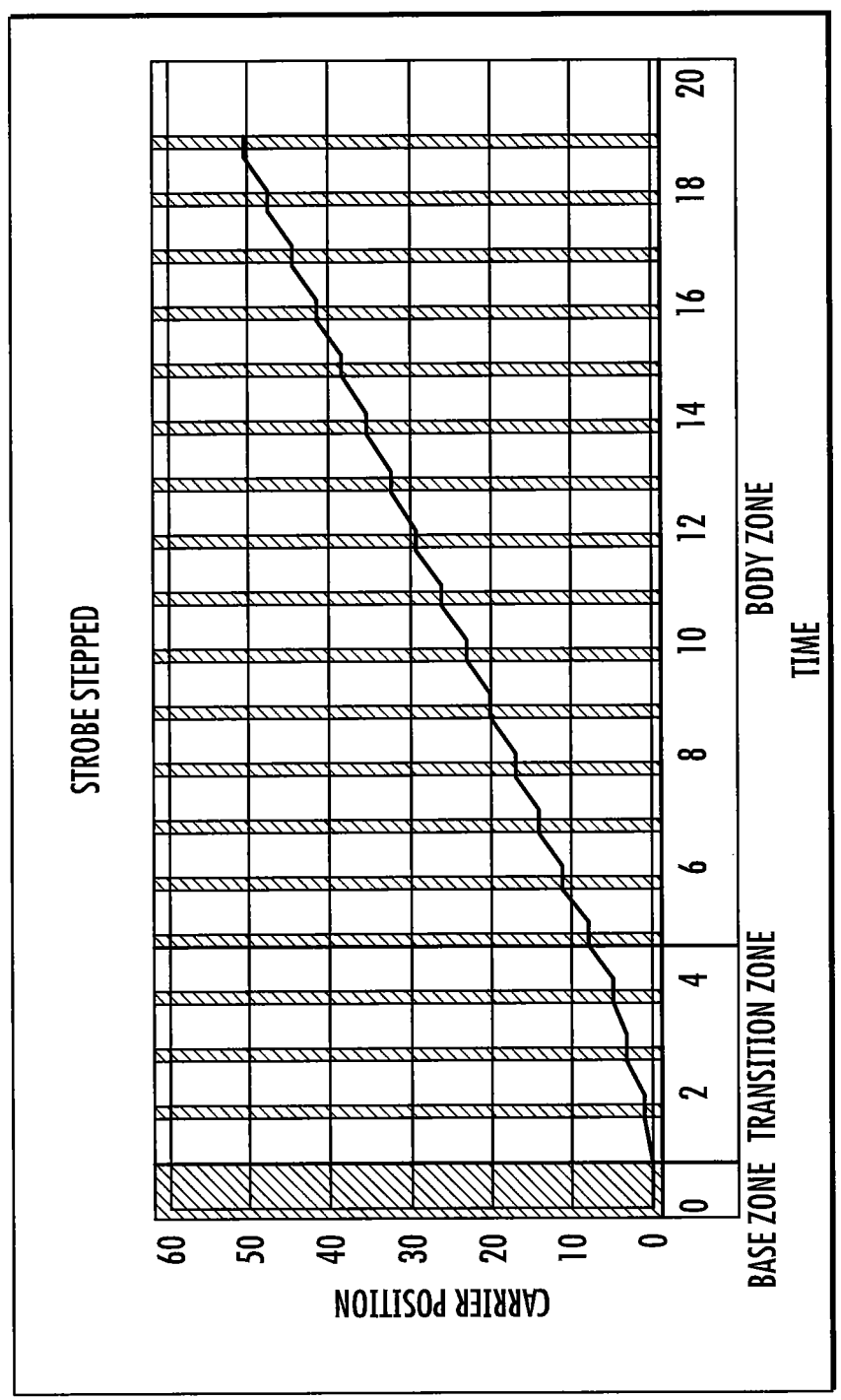
FIG. 27B illustrates the fabrication of a three-dimensional object in a manner similar to FIG. 27A, except that illumination is now in a shortened intermittent (or "strobe") pattern.

FIG. 27B schematically illustrates one embodiment of strobe stepped mode: In the strobe stepped mode the light intensity is increased and the amount of time that the image is projected is reduced. This allows more time for resin flow so the overall speed of the print can be reduced or the speed of movement can be reduced. For example: If the intensity for the conventional stepped mode was 5 mW/cm$^2$ and the build platform moves in increments of 100 um in 1 second and the image is projected for 1 second the intensity could be doubled to 10 mW/cm$^2$, the time that the image is projected could be reduced to 0.5 seconds, and the speed of movement could be reduced to 50 um/second, or the time that the stage is moving could be reduced to 0.5 seconds. The increased intensity could be as much as 5 fold or more allowing the time allotted for image projection to be reduced to $\frac{1}{5}^{th}$ or less.

Figure 28A:
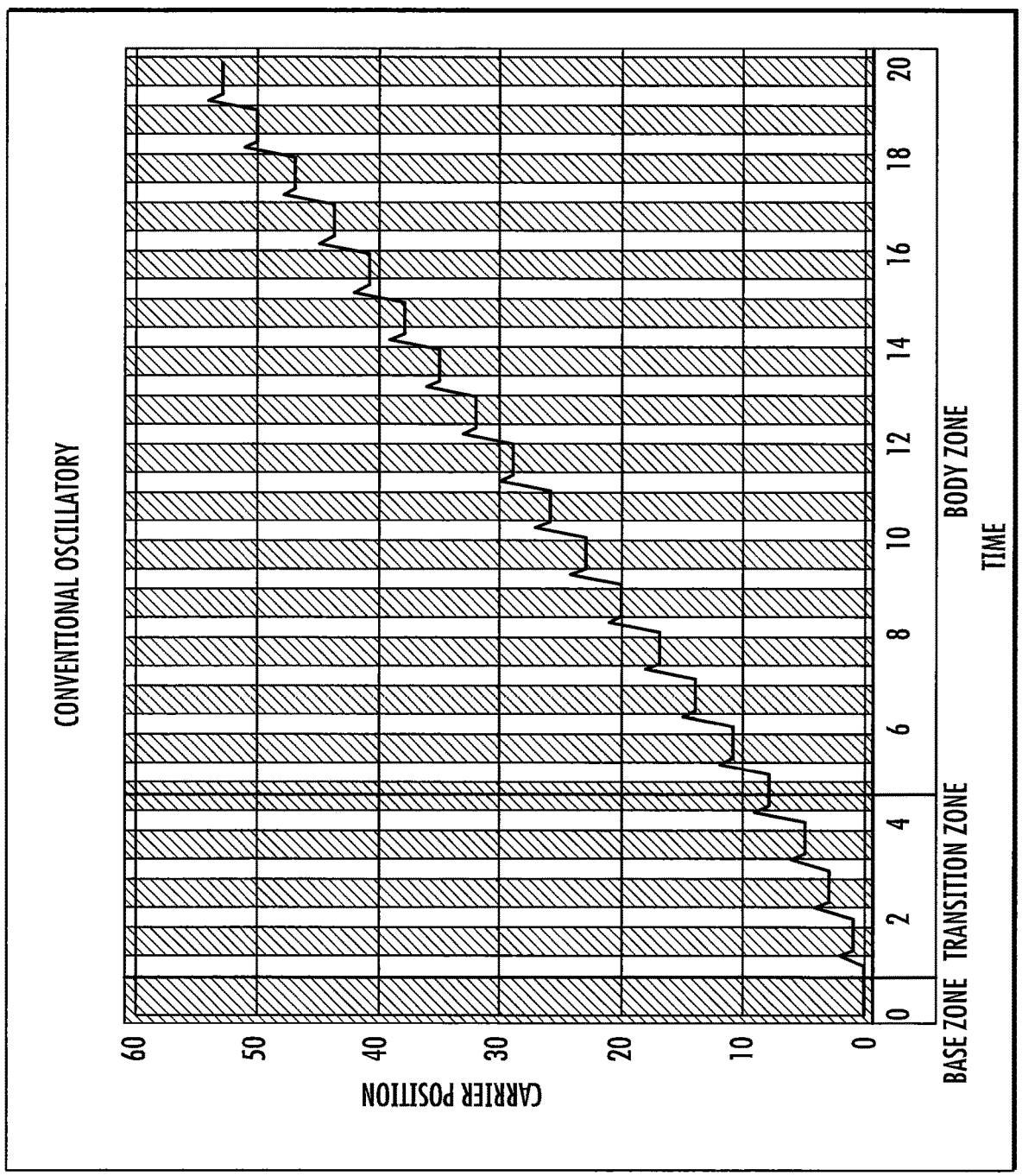
FIG. 28A schematically illustrates the movement of the carrier (z) over time (t) in the course of fabricating a three-dimensional object by oscillatory advancing and intermittent exposure.

FIG. 28A schematically illustrates one embodiment of oscillatory mode: In the oscillatory mode an image is again projected while the build platform is stationary (or moving slowly as compared to more rapid movement in-between illuminations). When one height increment is cured the image is turned off and the build platform is moved upwards to pull additional resin into the build zone and then moved back down to the next height increment above the last cured height. This motion can be at one speed or the speed can vary such as by accelerating from a slow speed when the thickness of uncured resin is thin to faster as the thickness of the uncured resin is thicker. Once the build platform is in the new position the image of the next cross section is projected to cure the next height increment.

Figure 28B:
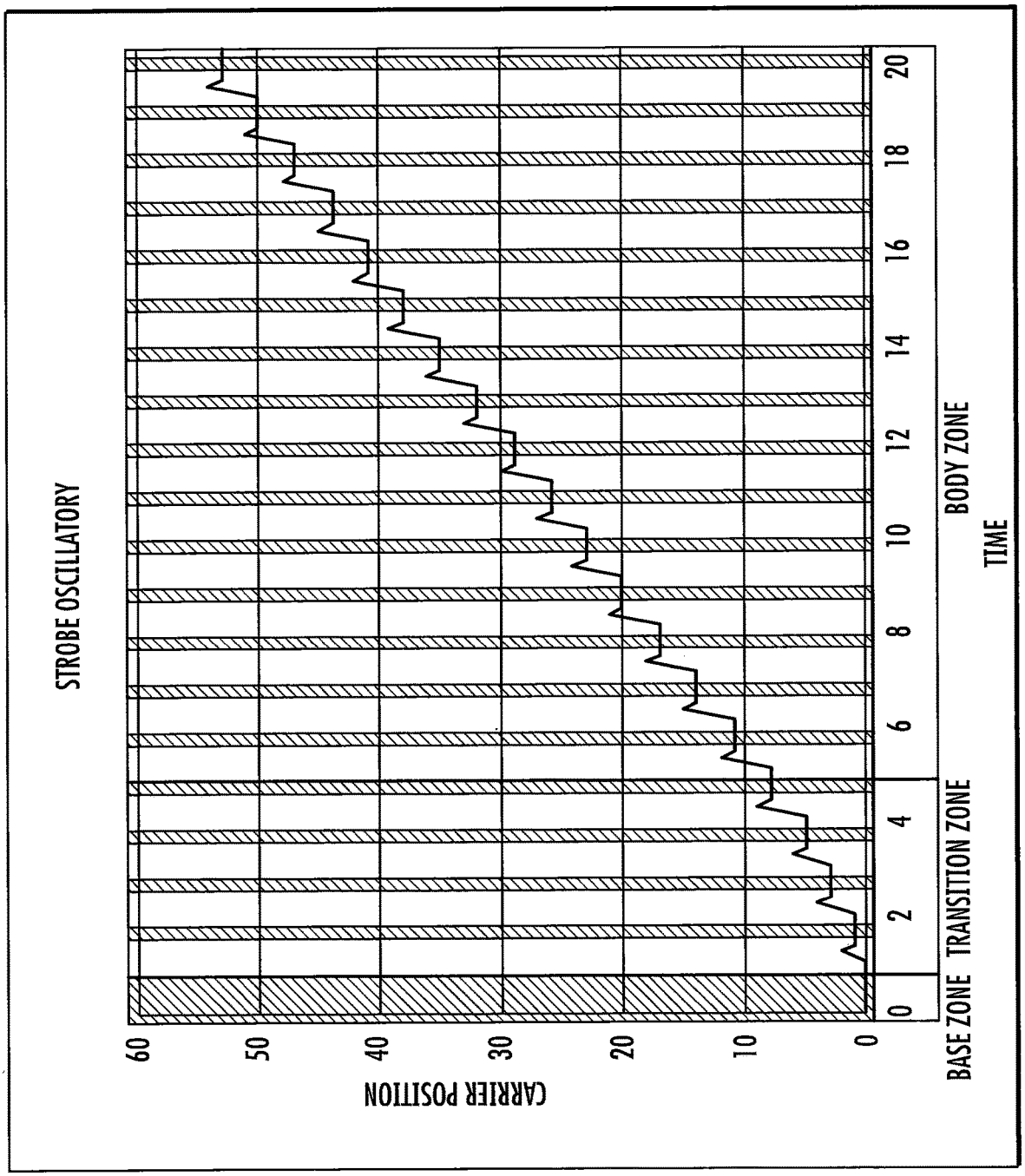
FIG. 28B illustrates the fabrication of a three-dimensional object in a manner similar to FIG. 28A, except that illumination is now in a shortened intermittent (or "strobe") pattern.

FIG. 28B illustrates one embodiment of strobe oscillatory mode. In the strobe oscillatory mode the light intensity is increased and the amount of time that the image is projected is reduced. This allows more time for resin flow so the overall speed of the print can be reduced or the speed of movement can be reduced. For example: If the intensity for the conventional oscillatory mode was 5 mW/cm$^2$ and the build platform moves up by 1 mm and back down to an increment of 100 um above the previous height in 1 second and the image is projected for 1 second the intensity could be doubled to 10 mW/cm$^2$, the time that the image is projected could be reduced to 0.5 seconds, and the speed of movement could be reduced to by half or the time that the stage is moving could be reduced to 0.5 seconds. The increased intensity could be as much as 5 fold or more allowing the time allotted for image projection to be reduced to $\frac{1}{5}^{th}$ or less. Segment "A" of FIG. 29 is discussed further below.

Figure 29A:
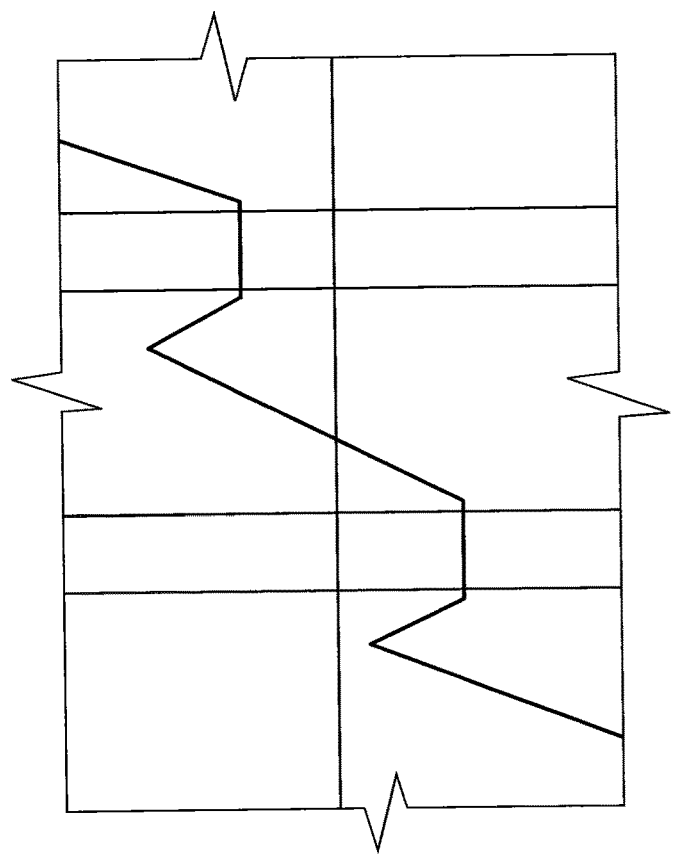
FIG. 29A schematically illustrates one segment of a "strobe" pattern of fabrication, where the duration of the static portion of the carrier has been shortened to near the duration of the "strobe" exposure

FIG. 29A illustrates a segment of a fabrication method operated in another embodiment of strobe oscillatory mode. In this embodiment, the duration of the segment during which the carrier is static is shortened to close that of the duration of the strobe illumination, so that the duration of the oscillatory segment may—if desired—be lengthened without changing the cumulative rate of advance and the speed of fabrication.

Figure 29B:
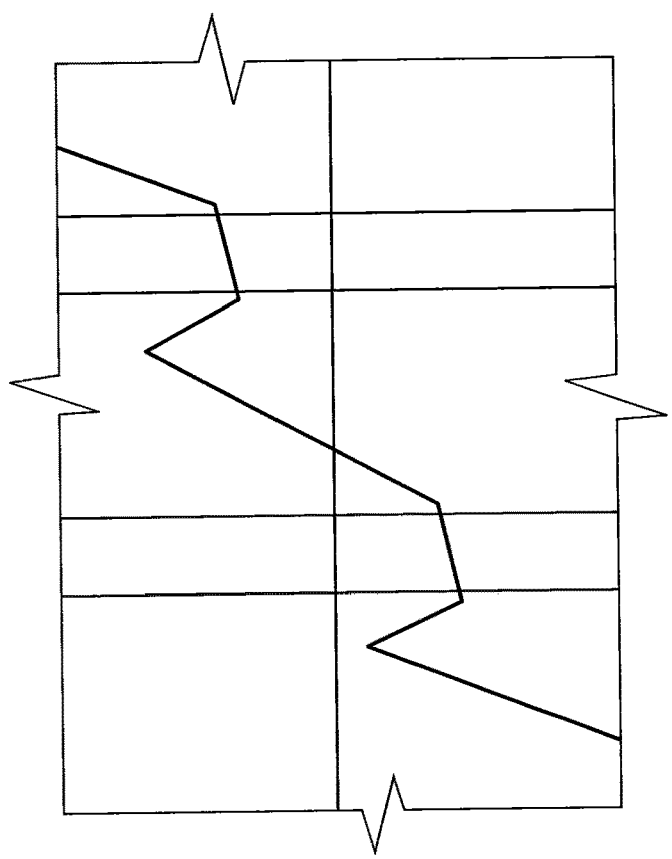
FIG. 29B is a schematic illustration of a segment of a strobe pattern of fabrication similar to FIG. 29A, except that the carrier is now moving slowly upward during the period of strobe illumination.

FIG. 29B illustrates a segment of another embodiment of strobe oscillatory mode, similar to that of FIG. 29, except that the carrier is now advancing during the illumination segment (relatively slowly, as compared to the upstroke of the oscillatory segment).

Example 15

Varying of Process Parameters During Fabrication

In the methods of Example 13-14, the operating conditions during the body zone are shown as constant throughout that zone. However, various parameters can be altered or modified in the course of the body zone, as discussed further below.

A primary reason for altering a parameter during production would be variations in the cross section geometry of the three-dimensional object; that is, smaller (easier to fill), and larger (harder to fill) segments or portions of the same three-dimensional object. For easier to fill segments (e.g., 1-5 mm diameter equivalents), the speed of upwards movement could be quick (up to 50-1000 m/hr) and/or the pump height could be minimal (e.g., as little at 100 to 300 um). For larger cross sectional segments (e.g., 5-500 mm diameter equivalents) the speed of upward movement can be slower (e.g., 1-50 mm/hr) and/or the pump height can be larger (e.g., 500 to 5000 um). Particular parameters will, of course, vary depending on factors such as illumination intensity, the particular polymerizable liquid (including constituents thereof such as dye and filler concentrations), the particular build surface employed, etc.

In some embodiments, the overall light dosage (determined by time and intensity) may be reduced as the "bulk" of the cross section being illuminated increases. Said another way, small points of light may need higher per unit dosage than larger areas of light. Without wishing to be bound to any specific theory, this may relate to the chemical kinematics of the polymerizable liquid. This effect could cause us to increase the overall light dosage for smaller cross sectional diameter equivalents.

In some embodiments, vary the thickness of each height increment between steps or pumps can be varied. This could be to increase speed with decreased resolution requirements (that is, fabricating a portion that requires less precision or permits more variability, versus a portion of the object that requires greater precision or requires more precise or narrow tolerances). For example, one could change from 100 um increments to 200 um or 400 um increments and group all the curing for the increased thickness into one time period. This time period may be shorter, the same or longer than the combined time for the equivalent smaller increments.

In some embodiments, the light dosage (time and/or intensity) delivered could be varied in particular cross sections (vertical regions of the object) or even in different areas within the same cross section or vertical region. This could be to vary the stiffness or density of particular geometries. This can, for example, be achieved by changing the dosage at different height increments, or changing the grayscale percentage of different zones of each height increment illumination.

The foregoing is illustrative of the present invention, and is not to be construed as limiting thereof. The invention is defined by the following claims, with equivalents of the claims to be included therein.

That which is claimed is:

1. A method of forming a three-dimensional object, comprising:
   providing a carrier and an optically transparent member having a build surface, said carrier and said build surface defining a build region therebetween;
   filling said build region with a polymerizable liquid;
   irradiating said build region through said optically transparent member to form a solid polymer from said polymerizable liquid while concurrently advancing said carrier away from said build surface to form said three-dimensional object from said polymerizable liquid, wherein said optically transparent member comprises at least one polymeric portion and at least one support enhancing portion, wherein said build surface comprises a patterned surface configured to repel wetting of said build surface by said polymerizable liquid and said patterned surface is configured such that said patterned surface is filled with gas, and liquid does not fill the patterned substrate due to a Cassie-Baxter state,
   wherein said patterned surface comprises a surface of said at least one polymeric portion, and said at least one polymeric portion comprises a patterned fluoropolymer film.

2. The method of claim 1, wherein said at least one polymeric portion comprises at least two substantially planar polymeric layers, and said substantially planar polymeric layers comprises a first substantially planar polymeric layer on a first side of said support enhancing portion and said polymeric layer further comprises a second substantially planar polymeric layer on a second side of said support enhancing portion that is opposite the first side of said support enhancing portion.

3. The method of claim 1, wherein said support enhancing portion has a variable thickness.

4. The method of claim 1, wherein said support enhancing portion comprises a rigid, opaque frame configured to support at least an edge portion of said polymeric portion of said optically transparent member.

5. The method of claim 1, wherein said support enhancing portion comprises a material having a Young's modulus that is greater than a Young's modulus of the polymeric portion.

6. The method of claim 1, wherein said polymeric portion comprises a substantially planar polymeric layer.

7. The method of claim 1, further comprising the step of heating said polymerizable liquid to reduce the viscosity thereof in said build region.

8. The method of claim 1, wherein said irradiating step is carried out with actinic radiation.

9. The method of claim 1, wherein said carrier has a soluble sacrificial layer thereon, and said three-dimensional object is formed on said soluble sacrificial layer.

10. The method of claim 1, wherein:
    the total surface area of the build region occupies at least seventy percent of the total surface area of the build surface; and/or
    wherein lateral movement of the carrier and object in any direction is not more than thirty percent of the width of said build region in the corresponding direction.

11. The method of claim 1, wherein the build surface is substantially fixed or stationary.

12. The method of claim 1, wherein said patterned surface that is configured such that the polymerizable liquid does not fill the patterned substrate due to a Cassie-Baxter state further provides gas flow to the build surface via said patterned surface.

13. The method of claim 1, further comprising forming said patterned surface of said substrate by laminating said substrate with a patterned wafer to thereby form said patterned substrate.

* * * * *